US012605838B2

(12) United States Patent
Staal

(10) Patent No.: US 12,605,838 B2
(45) Date of Patent: Apr. 21, 2026

(54) SYSTEMS, METHODS AND DEVICES FOR PROCESSING AND HANDLING PLASTERBOARD

(71) Applicant: EC8 Consulting Limited, Hamilton (NZ)

(72) Inventor: Christopher Jan Staal, Hamilton (NZ)

(73) Assignee: EC8 Consulting Limited, Hamilton (NZ)

( * ) Notice: Subject to any disclaimer, the term of this patent is extended or adjusted under 35 U.S.C. 154(b) by 377 days.

(21) Appl. No.: 18/554,898

(22) PCT Filed: Apr. 14, 2022

(86) PCT No.: PCT/NZ2022/050040
§ 371 (c)(1),
(2) Date: Oct. 11, 2023

(87) PCT Pub. No.: WO2022/220695
PCT Pub. Date: Oct. 20, 2022

(65) Prior Publication Data
US 2024/0181644 A1 Jun. 6, 2024

(30) Foreign Application Priority Data
Apr. 16, 2021 (NZ) ........................................ 775132

(51) Int. Cl.
*B25J 9/16* (2006.01)
*B25J 11/00* (2006.01)
(Continued)

(52) U.S. Cl.
CPC .......... *B25J 9/1679* (2013.01); *B66C 1/0212* (2013.01); *E04F 21/00* (2013.01); *G01B 21/04* (2013.01); *B25J 11/0055* (2013.01)

(58) Field of Classification Search
CPC .......... G01B 5/004; G01B 21/04; G01B 5/02; G01B 5/008; G01B 5/08; G01B 5/14;
(Continued)

(56) References Cited

U.S. PATENT DOCUMENTS 4,945,650 A 8/1990 Hird
6,785,973 B1 9/2004 Janssen
(Continued)

FOREIGN PATENT DOCUMENTS

AU 2014270078 A1 * 1/2016 ......... B05B 13/0431
CN 103193095 B * 3/2016 ......... B65H 29/241
WO 02057708 7/2002

OTHER PUBLICATIONS

International Search Report and Written Opinion in corresponding International Patent Application No. PCT/NZ2022/050040, mailed Jul. 8, 2022 (14 pages).

*Primary Examiner* — Peter J Macchiarolo
(74) *Attorney, Agent, or Firm* — Leason Ellis LLP

(57) ABSTRACT

Disclosed are systems, method and devices for the processing of plasterboard sheets to provide cut plasterboard panels which are appropriately dimensioned for installation on a building site. The technology provides devices for measuring building framing, translating the building measurements to cut instructions, equipment and processes for cutting the plasterboard sheets, systems and methods of unloading, stacking and transporting the cut plasterboard panels, as well as instructions for installation.

20 Claims, 38 Drawing Sheets

(51) Int. Cl.
    *B66C 1/02*          (2006.01)
    *E04F 21/00*       (2006.01)
    *G01B 21/04*       (2006.01)

(58) Field of Classification Search
    CPC ... G01B 5/16; G01B 9/00; G01B 9/08; G01B
               11/00; G01B 11/002; G01B 11/02; G01B
               11/14; G01B 11/28; G01B 11/285; G05B
               2219/35219; G05B 19/4093; G05B
               19/4097; G05B 19/18; B23Q 16/00;
               B23Q 17/00; B25J 9/1679; E04F 21/00;
               E04B 2/723
    USPC ...................................... 33/503, 763; 83/213
    See application file for complete search history.

(56)                  References Cited

U.S. PATENT DOCUMENTS

| | | | |
|---|---|---|---|
| 7,062,859 B1 | 6/2006 | Revnell | |
| 10,267,619 B2 * | 4/2019 | Tohme | G06T 7/70 |
| 10,437,223 B2 * | 10/2019 | Pettersson | G06F 30/00 |
| 10,577,810 B2 * | 3/2020 | Telleria | B05B 13/0431 |
| 11,745,356 B2 * | 9/2023 | Zhang | B25J 13/085 |
| | | | 414/11 |
| 11,935,261 B2 * | 3/2024 | Padiyath | G01B 11/02 |
| 12,233,559 B2 * | 2/2025 | Ames | B25J 11/005 |
| 2004/0254856 A1 * | 12/2004 | Dotson | G06Q 10/087 |
| | | | 705/26.5 |
| 2010/0089175 A1 | 4/2010 | Swanson et al. | |
| 2012/0047756 A1 | 3/2012 | Ferrari | |
| 2013/0232804 A1 | 9/2013 | Teune et al. | |
| 2020/0122336 A1 * | 4/2020 | Matsuo | B25J 11/0055 |

\* cited by examiner

Wall 3

Short Code

9wairu

Project 9 wairau

Room bed 2

First wall measured away_from_door

Installation clockwise

Sheet 2

EC8
digital
building
solutions

SYSTEMS, METHODS AND DEVICES FOR PROCESSING AND HANDLING PLASTERBOARD

1. CROSS REFERENCE TO RELATED APPLICATIONS

The present application is a U.S. National Phase Application under 35 U.S.C. § 371 of International Patent Application No. PCT/NZ2022/050040, filed on Apr. 14, 2022, which claims priority to New Zealand provisional patent application No. 775132, filed on Apr. 16, 2021, all of which are herein incorporated by reference, as if expressly set forth in their respective entireties herein.

2. TECHNICAL FIELD

This invention generally relates to systems, methods and devices for processing and handling plasterboard. The present technology may find particular application in the processing of plasterboard for use in the construction industry, however that should not be seen as limiting on the technology.

3. BACKGROUND ART

Plasterboard is known by many names in the construction industry including drywall, gypsum board, gypsum panel, and under various tradenames including Gyprock™, GIB™, and SheetRock™. Plasterboard generally comprises calcium sulphate dihydrate (gypsum) sandwiched between sheets of paper, often referred to as facing and backing paper.

Plasterboard is commonly used in the construction industry as it is low-cost, fire resistant, sound dampening, easy to install and repair and provides a surface that can be painted over without sanding. However, plasterboard is relatively fragile, dents, and marks easily, and when cutting or breaking plasterboard, the dust which is produced can cause throat and airway irritation.

When building a structure, an estimate first needs to be made of the amount of plasterboard required to line the structure. This measurement is typically performed by a highly skilled quantity surveyor. Accordingly, there are significant costs, and potentially delays in getting a quantity surveyor on site who has the necessary expertise to accurately estimate the amount of plasterboard required.

Once the amount of plasterboard required has been estimated, and order is placed and the material is shipped to the building site typically flat-packed on a pallet, or series of pallets. The builder then conducts a second measurement of the wall or ceiling where the plasterboard is going to be installed, making note of features such as power points, window and door framing, gas and water pipes. These measurements are transferred to the plasterboard sheet, and the builder manually cuts the sheet using knives or saws to work around these features.

This process is time consuming, requires careful handling to prevent damage, and often can result in significant material waste. Furthermore, the builder who is cutting the plasterboard needs to take appropriate precautions to ensure that they do not inhale the dust produced during the cutting process.

If a sheet of plasterboard is damaged during the process, or if the measurements are transcribed from the wall to the sheet incorrectly, then the builders must either repair the sheet, for example using plaster and sanding, or order replacement sheets if necessary. This adds further costs and inefficiencies to the building process which in turn increases costs for the end customer.

It is an object of a preferred form of the present technology to go at least some way towards addressing the above problems, or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present technology will become apparent from the ensuing description which is given by way of example only.

4. DISCLOSURE OF THE INVENTION

According to one aspect of the technology, there are provided systems, methods and devices for processing and handling of plasterboard.

According to a further aspect of the technology, there are provided systems, methods and devices for providing cut plasterboard panels to the construction industry.

According to a further aspect of the technology, there is provided a measurement device for determining the dimensions of plasterboard required to line the framing of a building, the measurement device comprising:

a housing which at least partially contains:
   a power source and
   a communications system,
   wherein the measurement device further comprises a measuring unit, and
   wherein the device further comprises an attachment mechanism configured to releasably attach the device to the framing of the building,
wherein the communications system is configured to communicate with an electronic device and receive a signal from the electronic device to control the measuring unit to perform one or more distance and or angle measurements.

In a preferred example of the technology, the power source may be a battery, and may comprise one or more primary or secondary (rechargeable) cells. In other examples of the technology, the measurement device may be configured to attach to an external power source, such as a DC or AC power supply.

In a preferred example, the device may further comprise a processor. For example, the processor may be a microcontroller or microprocessor. In other examples the processor may be a processor with an x86, x64, x32 or ARM architecture.

In a preferred example the communication system may comprise a wireless communication module such as Wi-Fi, Bluetooth, Zigbee, or any appropriate radio frequency communications system. Use of a wireless communications module may advantageously allow for the electronic device to be located remotely from measurement device.

In other examples of the technology the communication systems may comprise wired communication technologies, including serial, USB, or ethernet communications.

In a preferred example, the electronic device may be a positioning device, configured to in use be positioned against a point of interest in the framing. For example, the point of interest may include, a framing edge, an opening for a window or door, a socket such as an electrical socket, a pipe such as a water, or gas pipe, or a conduit such as a plumbing or drainage conduit.

In a preferred example, the positioning device may comprise an interactable element such as a button or switch, which in use sends the signal to the communications system to perform the measurement.

In a preferred example, the electronic device may also include a smartphone laptop or other electronic device. For example, the signal may be sent by interacting with a button in a UI presented on the display of an electronic device.

In one example of the technology, the measuring unit may comprise a wireless measurement system such as an optical distance measuring device. The wireless measuring unit may use any suitable wireless measurement technology known to those skilled in the art including LIDAR, laser and LED time-of-flight sensors, ultrasonics, and triangulation technologies.

In a preferred example of the technology, the wireless measurement system may be configured to perform a 360-degree scan in a two-dimensional plane in order to determine a plurality of angle and distance measurements. For example, the processor may be configured to control the wireless measurement system to perform a scan, in order to detect one or more of surfaces surrounding the measurement device in the two-dimensional plane, and/or the location of a positioning device. For example, the processor may be configured to drive a motor which spins the wireless measurement system to obtain a plurality of distance measurements at a plurality of angles.

In one example of the technology, the measuring unit may comprise a wired measurement system. For example, the wired measurement system may include an arm which is rotatably attached to the housing such that the angle of the arm relative to the housing can be determined. For example, the angle of the arm may be determined using one or more of a digital angle gauge, an inclinometer, a rotary encoder, a tilt sensor, or accelerometer.

In a preferred example, the arm may be extendable, and the length of the arm may be measured by the device. For example, the arm may comprise a telescoping section or a wire or cable. In wired applications a wire drum may be provided, in which the extension of the arm is detected by determining rotations of the wire drum. For example, using a rotary encoder.

In some examples of the technology the measurement device may comprise wired and wireless measurement systems as described herein.

In a preferred example of the technology, the housing may be configured to be attached to the framing such, that at least part of the housing is positioned within a cavity of the housing, such as between two or more studs or joists. For example, by positioning the housing within a cavity of the housing, the measurement device may be able to measure the distance and angle information in a plane which corresponds to the plane in which the plasterboard is to be installed.

According to another aspect of the technology, there is provided a method for converting measurements taken in a two-dimensional plane adjacent to building framing, to instructions for controlling a computer numerical control (CNC) router for the purposes of processing plasterboard, the method comprising the steps of:

A) categorising the measurements as relating to one or more of:
   an external outline of the framing, and
   a location of a point of interest in the framing,
B) determining a plurality of shapes which correspond to plasterboard panel shapes, the shapes being based on the categorised measurements,
C) for each shape in the plurality of shapes, determining a plasterboard sheet size from which the shape may be cut,
D) converting the shapes to cutting co-ordinates.
E) controlling the CNC router to cut a plasterboard sheet in accordance with the cutting co-ordinates.

In a preferred example, the method may further comprise the step of obtaining the plurality of datapoints using a measurement device according to one or more other aspects of the technology, or as described herein.

In a preferred example, categorising the measurements in step A) may be performed as the measurements are obtained, or after the measurements are obtained.

In a preferred example, categorising the measurements in step A) further comprises the step of selecting from a list of predefined categories. For example, a point of interest in the framing may be categorised as window, door or manhole, electrical socket, pipe, conduit or plumbing.

In a preferred example the categorisation of the measurements in step A) may further comprise the step of recording dimensional information regarding the point of interest, such as the size shape or orientation of the point of interest. For example, where a pipe is present the dimensional information may include the shape, and diameter, where an electrical socket is present the dimensional information may include the size, shape and orientation.

In a preferred example, the plasterboard sheet size may be selected from a list of common plasterboard sheet sizes, including sheets having a width of 900 mm, 1200 mm or 1350 mm, a thickness of 10 mm or 13 mm, and a length of 1800 mm, 2400 mm, 2700 mm, 3000 mm, 3300 mm, 3600 mm, 4200 mm, 4800 mm, or 6000 mm or any combination thereof.

In a preferred example, in step C) the method may further consider adjacent shapes in the plurality of shapes to determine whether multiple shapes can be provided from a single plasterboard sheet.

In a preferred example, step D) may include the steps of converting the shapes to cutting coordinates comprising a sequence of X, Y and Z location information. For example, the conversion may be performed either manually, or more preferably using known software techniques to generate G-code instructions.

In a preferred example, step D) may further comprise the step of determining an orientation of a plasterboard sheet to be cut, and if necessary, translating the cutting co-ordinates to account for any one or more of the sheet orientations, and presence of any features on the sheet such as tapered edges. For example, if the underside of a plasterboard sheet is face-up under the CNC router, the translation may comprise a mirroring of the cutting co-ordinates. If the plasterboard sheet includes a tapered edge, the cutting co-ordinates may be translated such that edges of the plasterboard sheet which are adjacent to other plasterboard sheets during installation have a tapered.

In a preferred example, step D) may further comprise the step of analysing the cut shapes to determine if the proposed cutting co-ordinates would detrimentally affect the structural integrity of the plasterboard sheet. For example, where removing sections of plasterboard results in a weakened structure, step D) may include generating partial cut co-ordinates such that the section to be removed remains attached to the plasterboard sheet.

In a preferred example, step D) may further comprise a consideration of lifting points on the plasterboard sheet, and the cutting co-ordinates may be designed so as to avoid cutting the plasterboard sheet in areas where lifting points are present. Alternatively, the cutting co-ordinates may be adjusted to do partial cuts in areas where lifting points are present.

In a preferred example, step D) may further comprise the step of generating cut co-ordinates for any waste material on the plasterboard sheet to provide spacers or backing blocks.

According to another aspect of the technology, there is provided a system for processing plasterboard sheets into cut plasterboard panels, the system comprising:

a loading area configured to receive a plasterboard sheet,
    a routing area provided with a CNC router, which is configured in use to cut the plasterboard sheet into cut plasterboard panels,
    an unloading area to facilitate removal of the cut plasterboard panels from the system, and
    a sliding bed configured to move between the loading area, routing area and unloading area, wherein, in use, the sliding bed is configured to receive a plasterboard sheet in the loading area, and once loaded, the sliding bed is configured to move along one or more rails to position the plasterboard sheet in the routing area, and wherein, once the plasterboard sheet has been cut into cut plasterboard panels, the sliding bed is configured to move from the touring area to the unloading area to facilitate removal of the cut plasterboard panels.

According to another aspect of the technology, there is provided a system for processing plasterboard sheets into cut plasterboard panels, the system comprising:

a loading area configured to receive one of a first plasterboard sheet, and a second plasterboard sheet, the first plasterboard sheet having a different length to the second plasterboard sheet.

wherein the loading area comprises:

at least one fixed stop configured to abut a first end the first plasterboard sheet, and the first end of the second plasterboard sheet in use,
    a first pivoting stop configured to abut a second end of the first plasterboard sheet, in use, and
    a second pivoting stop configured to abut a second end of the second plasterboard sheet in use, wherein, when the second plasterboard sheet is placed on the sliding bed, the first pivoting stop is configured to move downwardly relative to the bed, so as to not interfere with the positioning of the second plasterboard sheet.

In a preferred example, the at least one fixed stop, the first pivoting stop and second pivoting stop may be provided in a sliding bed in the loading area. In another example of the technology, the least one fixed stop, the first pivoting stop and second pivoting stop may be provided as part of a conveyor system in the loading area.

In a preferred example, the loading area may be configured to receive one or more plasterboard sheets from a lifting frame. For example, the lifting frame may be provided or otherwise attached to a gantry. In one example the lifting frame may comprise vacuum lift technologies, while in other examples the lifting frame may provide mechanical support to the plasterboard sheet while the sheet is being lifted.

In a preferred example, the CNC router may be specifically adapted for use in cutting plasterboard sheets. For example, the CNC router may be configured to have any one or more of:

A spindle which is set to travel at speeds of at least 30 cm per second.
    A cutting area measuring at least 2.4 m long by 1.2 m wide, or more preferably a cutting area at least 6 m long by 1.35 m wide.
    A spindle speed of at least 25,000 RPM.
    A moveable bed 912 which allows for sheets of plasterboard to be moved in and out of the cutting area without sliding or lifting.

In a preferred example, the sliding bed may comprise a plurality of stops. For example, the plurality of stops may be configured to automatically recess into the sliding bed or conveyor system to accommodate a range of different sized plasterboard sheets.

In a preferred example, the sliding bed may comprise fixed stops at one end, so as to provide a fixed reference point for each plasterboard sheet placed onto the sliding bed or conveyor system.

In a preferred example, the sliding bed may comprise one or more rollers configured to position the plasterboard sheet centrally on the sliding bed or conveyor system.

In a preferred example, the system may comprise a first set of rails configured to move the sliding bed through the system from the loading area to the unloading area, and a second set of rails configured to allow the sliding bed to return from the unloading area to the loading area, without colliding with any other sliding beds present in the system. For example, the second set of rails may run between the first set of rails, below the first set of rails, or be angled relative to the first set of rails.

According to another aspect of the technology, there is a method of stacking cut plasterboard panels for transport, the method comprising the steps of:

A) receiving a plurality of plasterboard panels;
    B) placing a first plasterboard panel onto a pallet;
    C) placing a second plasterboard panel onto the first plasterboard panel;
    D) positioning one or more spacers at the end of the first plasterboard panel, such that the spacers overlap the end of the first plasterboard panel if the second plasterboard panel is shorter than the first panel,
    E) determining the largest plasterboard panel to be received, and positioning one or more spacers on the placed plasterboard panels to ensure that the largest sheet will be supported when added to the pallet;
    F) repeating steps C) through E) for each plasterboard panel of the plurality of plasterboard panels.

In a preferred example, the spacers may be positioned such that they extend at least 50 mm past the end of the plasterboard panels.

In a preferred example, the plurality of plasterboard panels relates to the construction of a single room of a building.

In a preferred example, the spacers may be constructed from waste plasterboard material, and/or backing blocks.

In a preferred example, adjacent panels are positioned so as to cover any spacers on the proceeding panel. In other words, the panels and spacers may be positioned such that no two spacers are positioned directly on top of one another.

In a preferred example, each plasterboard panel is provided with instructions as to the installation of the panels. For example the instructions may be printed and adhered to each plasterboard panel.

The present technology may provide a range of advantages, particularly in the measurement, fabrication, shipping and installation of plasterboard sheets and cut panels. Potential advantages include:

Faster construction, removing the need to triple measure before installing plasterboard panels.

Reduced waste, and the ability to repurpose off-cuts into backing blocks.

Fast, accurate measurement of plasterboard requirements, without the need of a skilled quantity surveyor.

Precisely cut plasterboard panels, preconfigured for installation with instructions.

Improved methods of transporting cut plasterboard products ensuring less damage during delivery and transport.

A fully automated plasterboard production system.

The ability to automatically translate measurements to cut instructions in a CNC router, taking into consideration plasterboard sheet sizes, plasterboard features such as tapered edges, lifting locations, sheet orientation etc.

These and other features, objects and advantages of the present invention will be readily apparent to persons of ordinary skill in the art upon reading the entirety of this disclosure, which includes the accompanying drawings.

5. BRIEF DESCRIPTION OF THE DRAWINGS

Further aspects of the present technology will become apparent from the ensuing description which is given by way of example only and with reference to the accompanying drawings in which.

8

Figure 7:
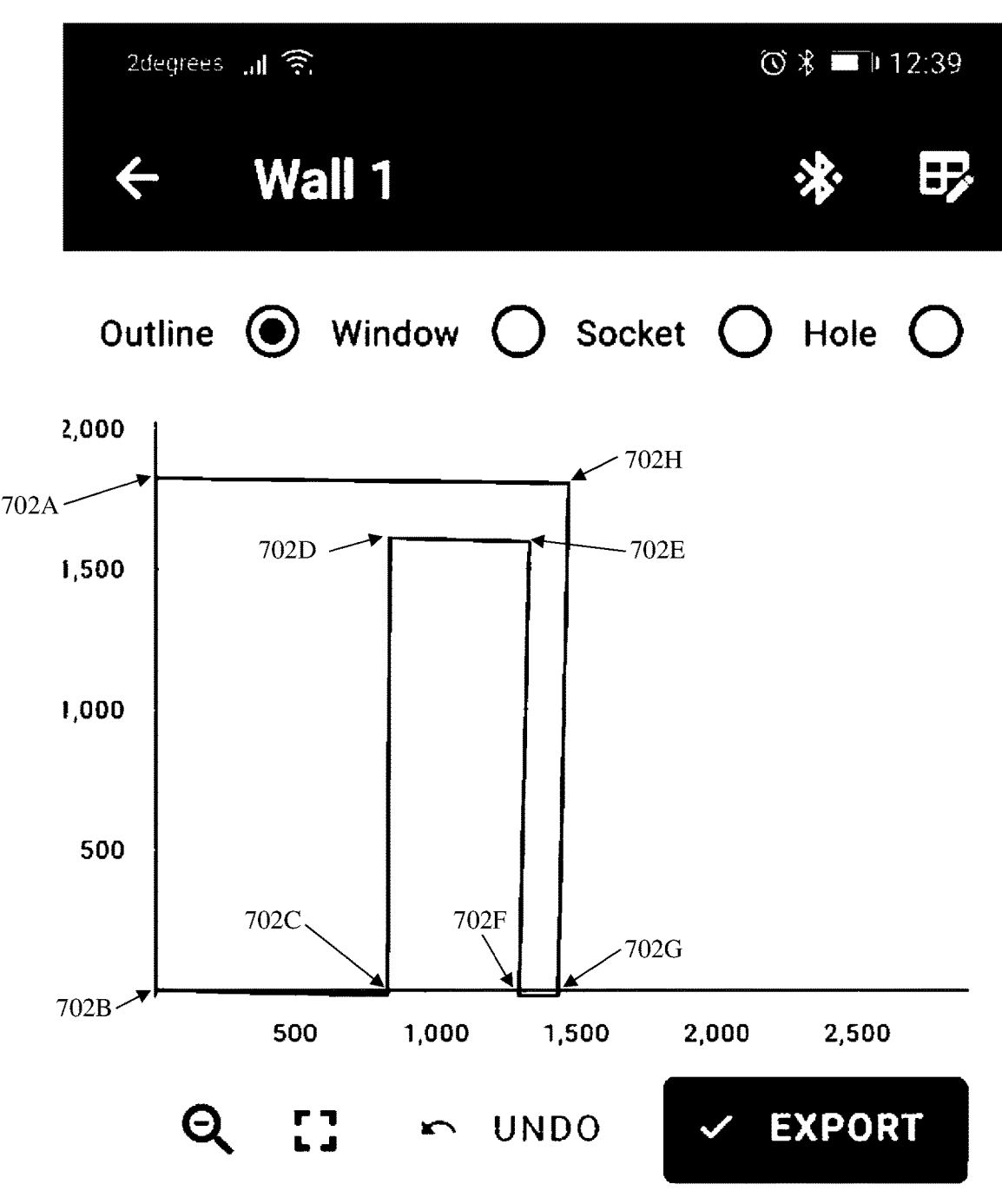
Figure 8A:
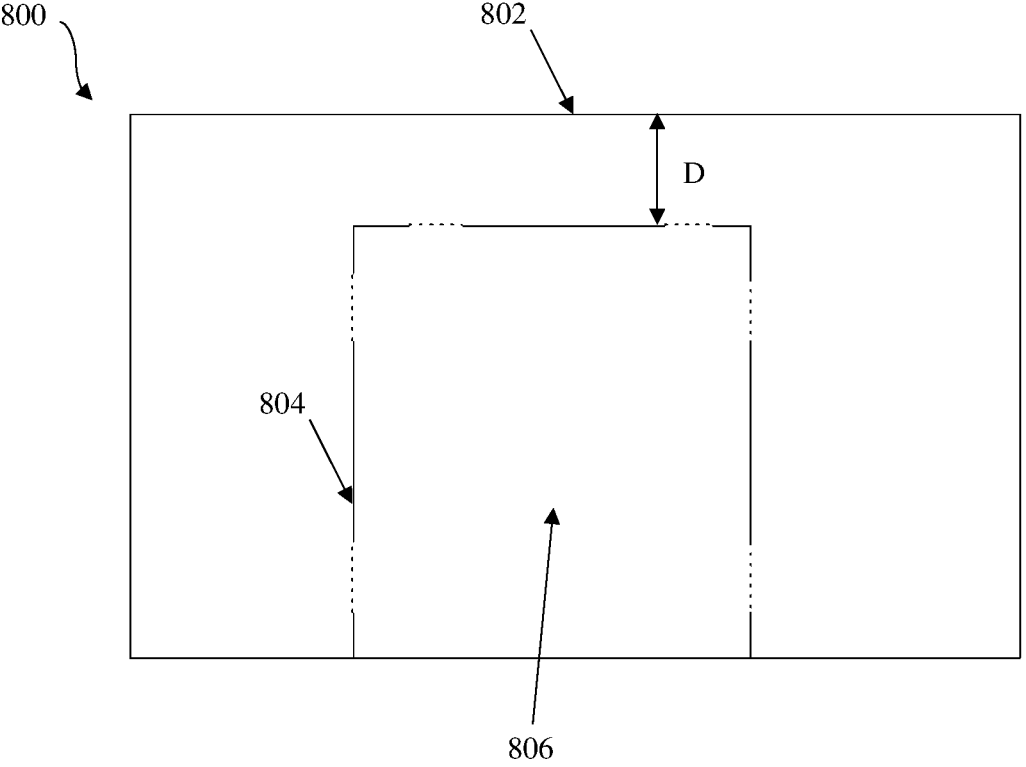
Figure 8B:
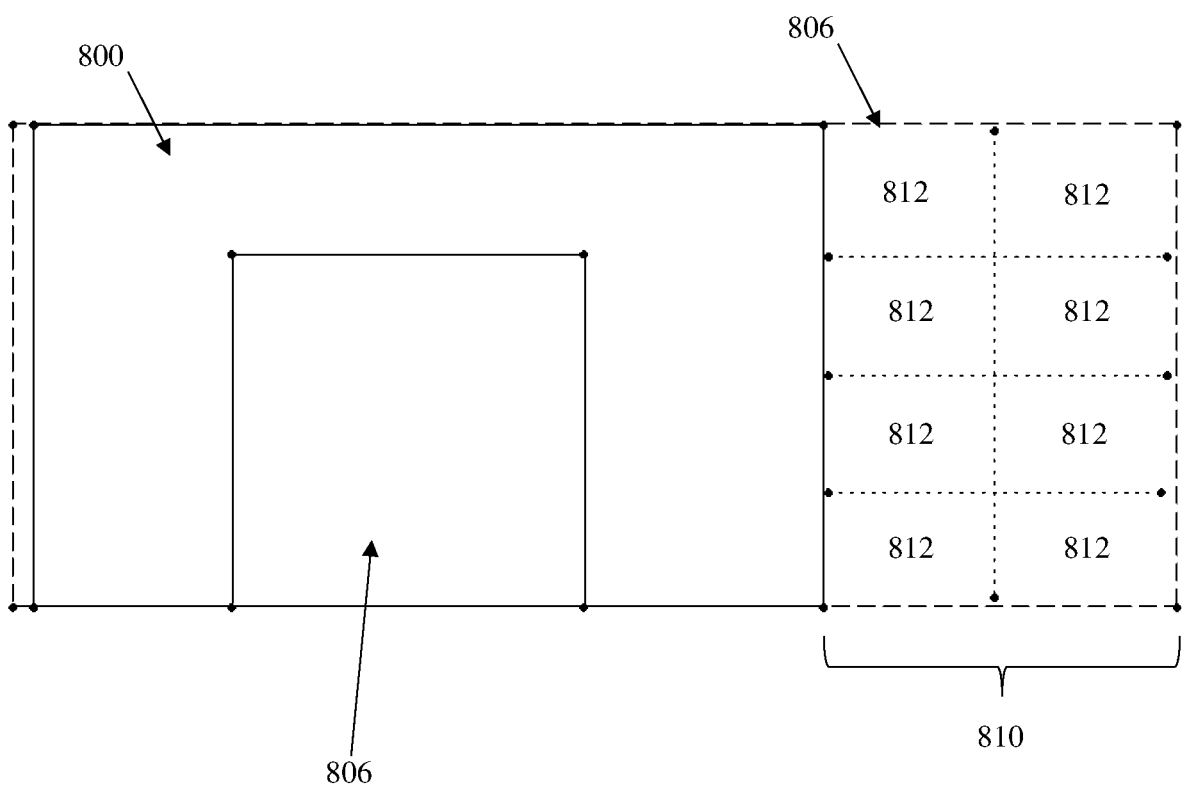
Figure 9A:
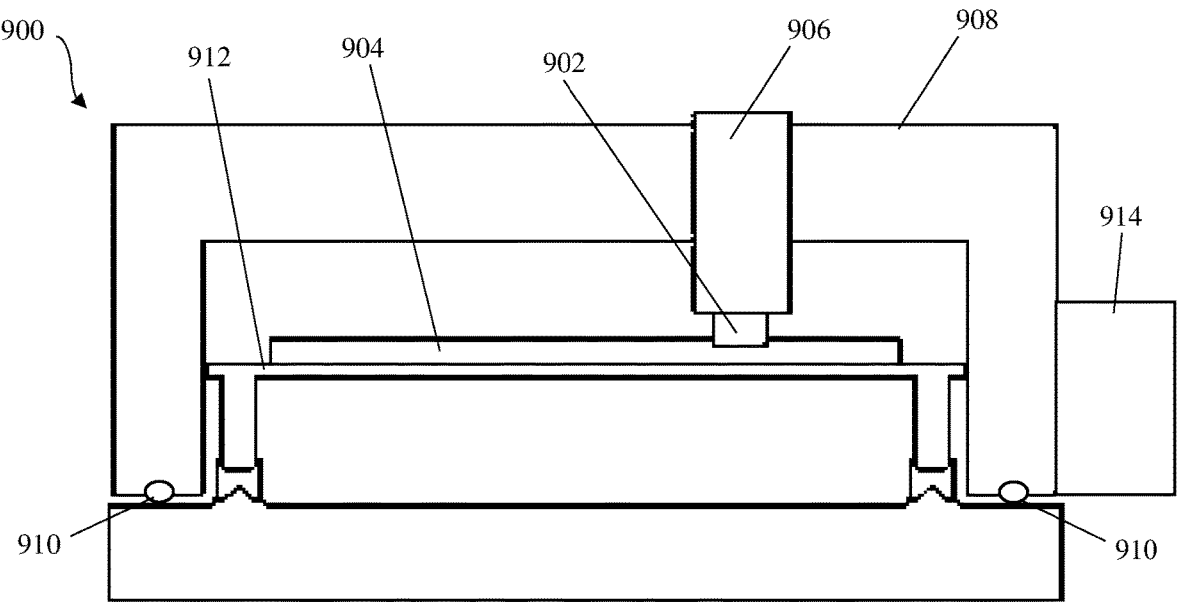
Figure 9B:
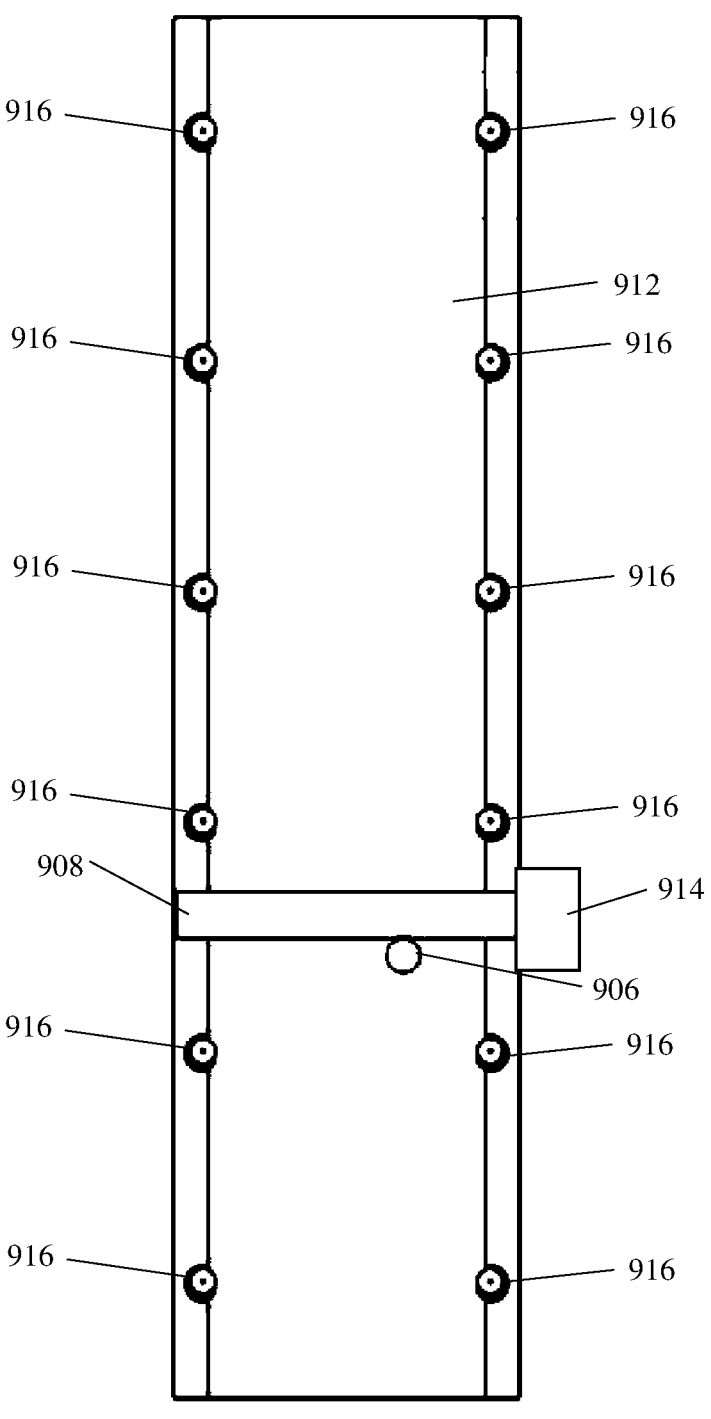
Figure 9C:
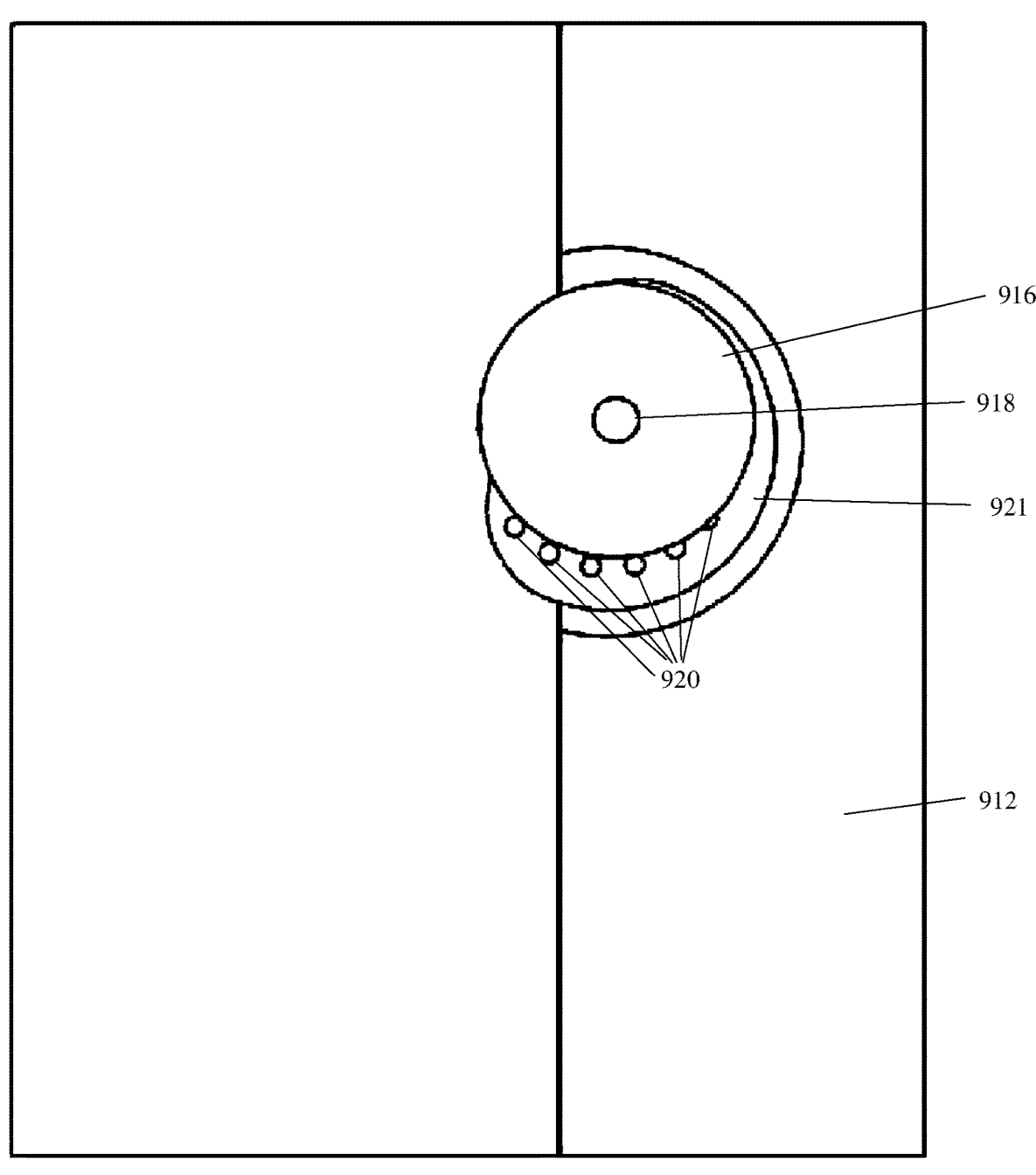
Figure 9D:
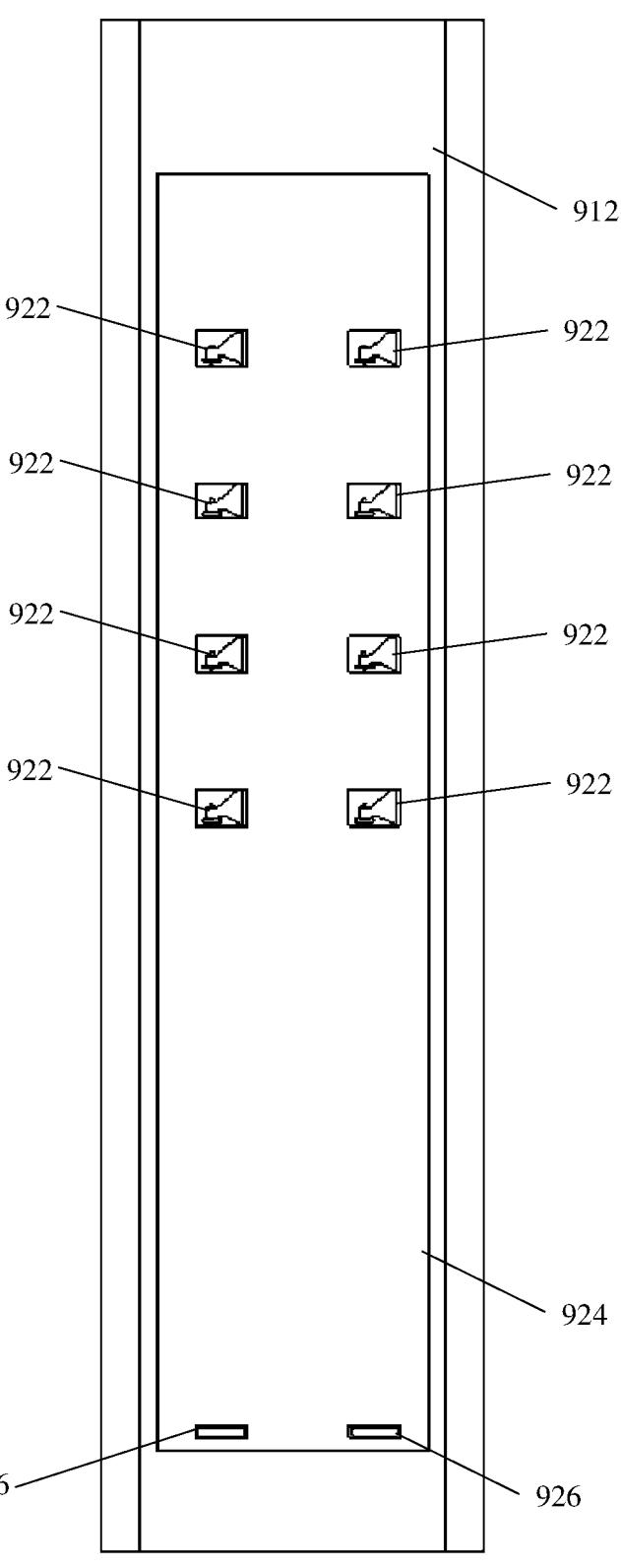
Figure 9E:
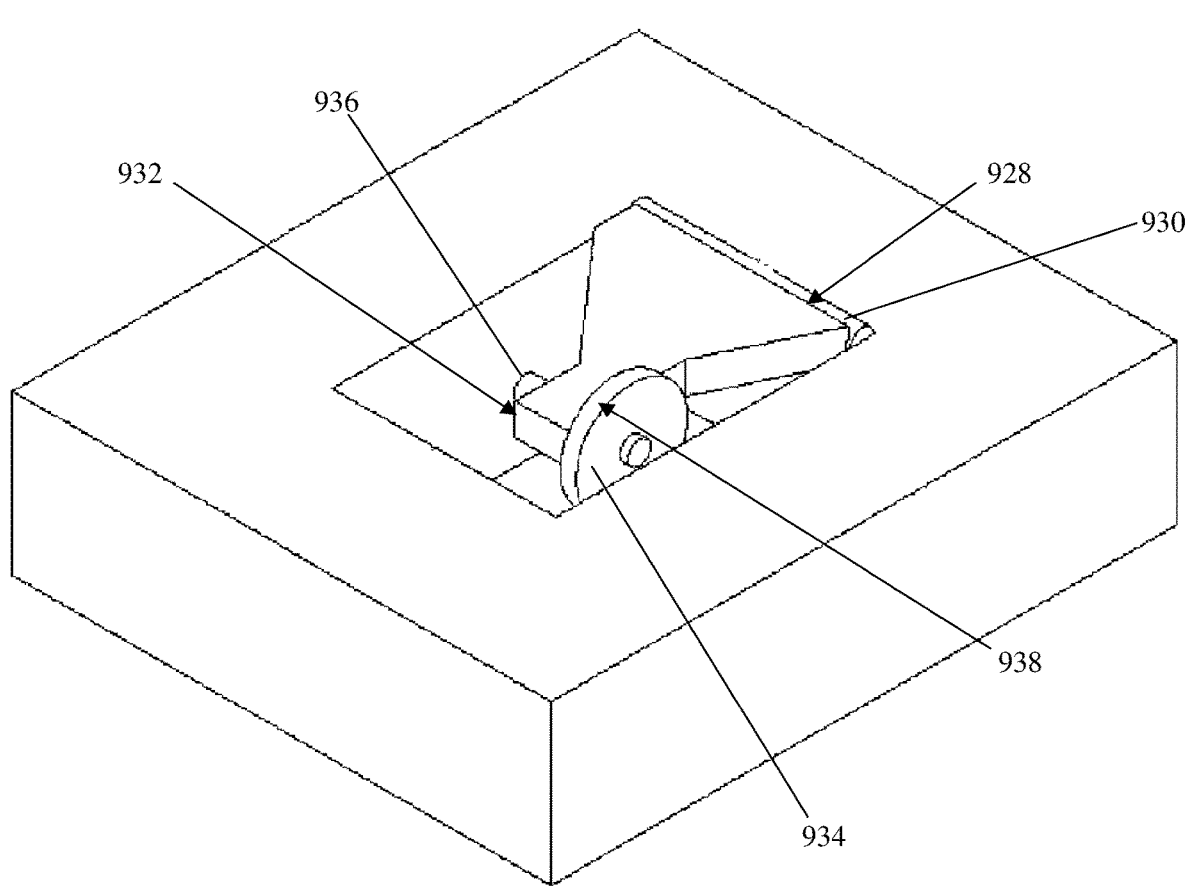
Figure 9F:
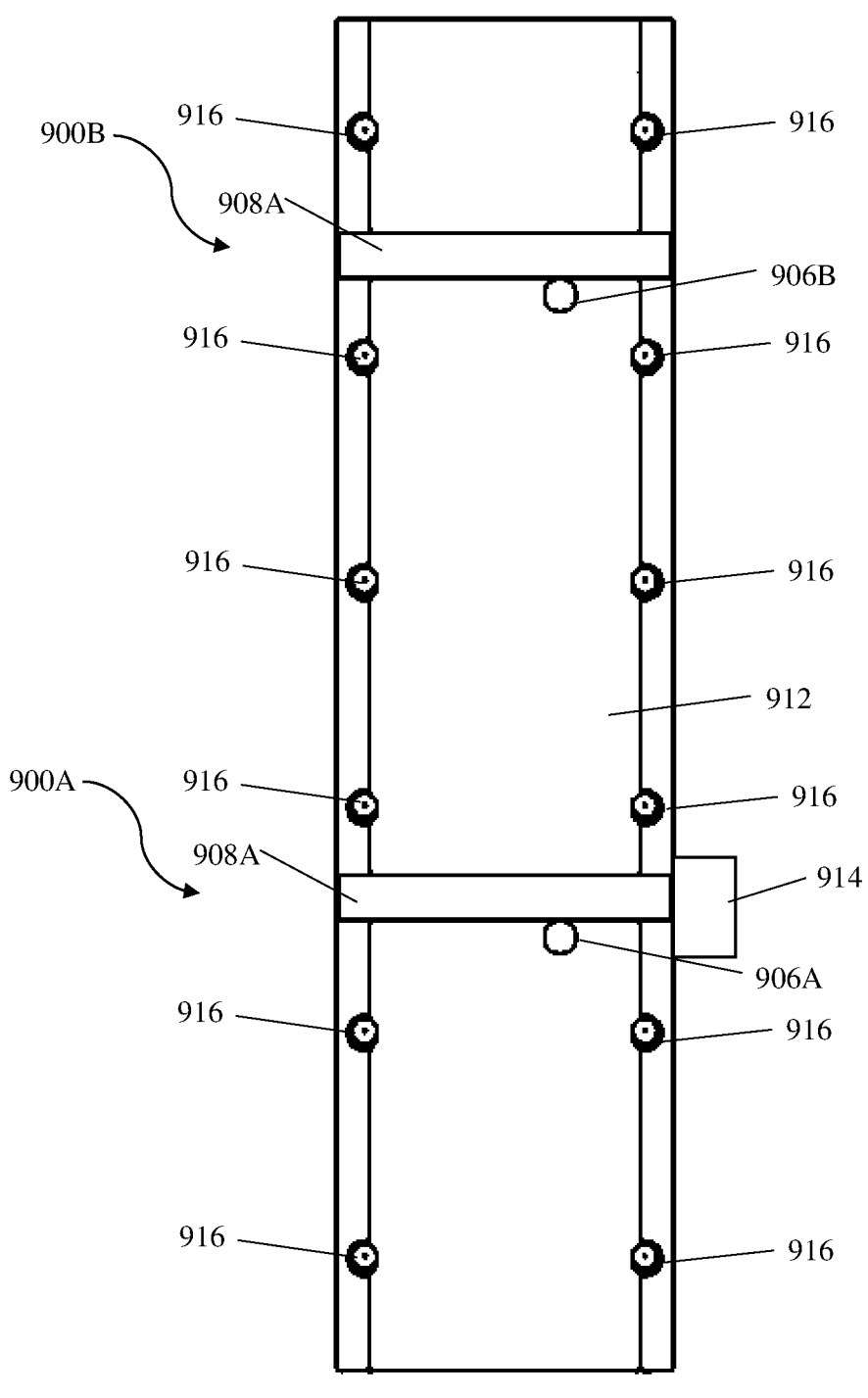
Figure 10A:
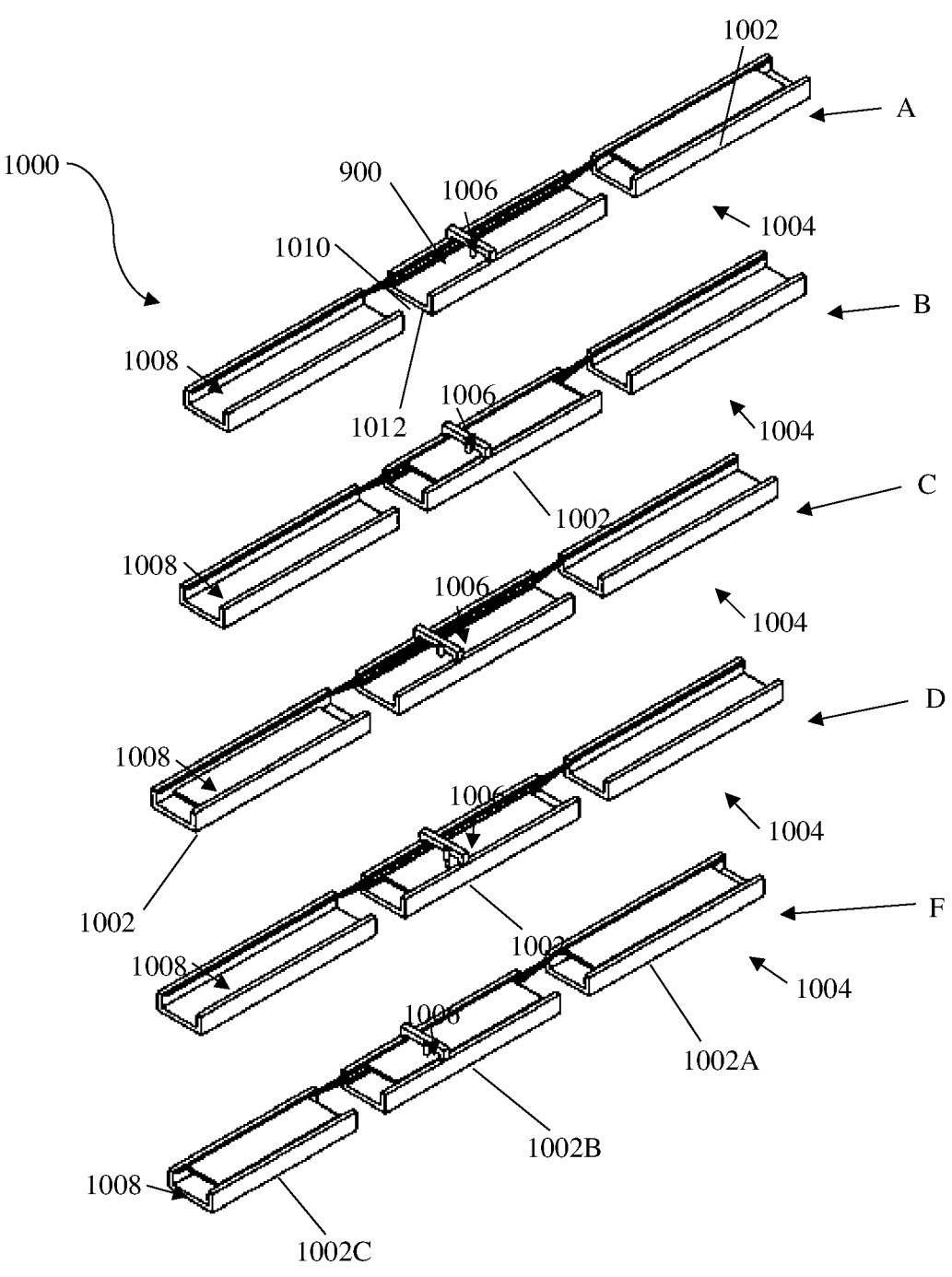
Figure 10B:
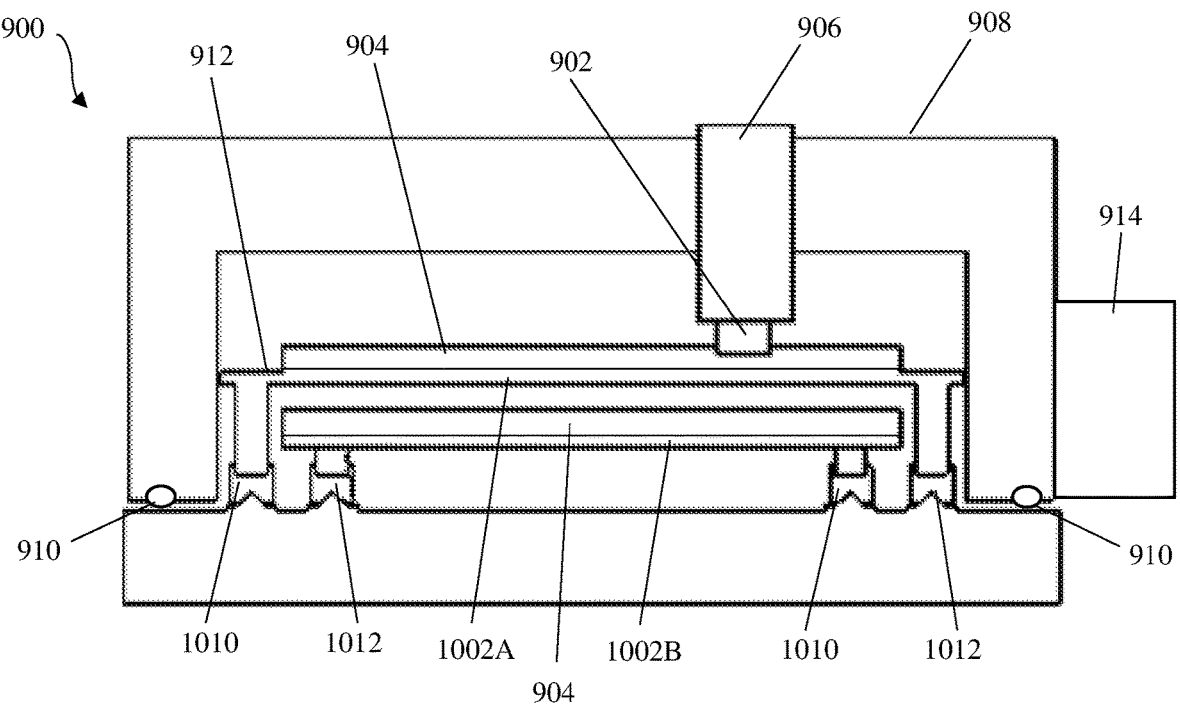
Figure 10C:
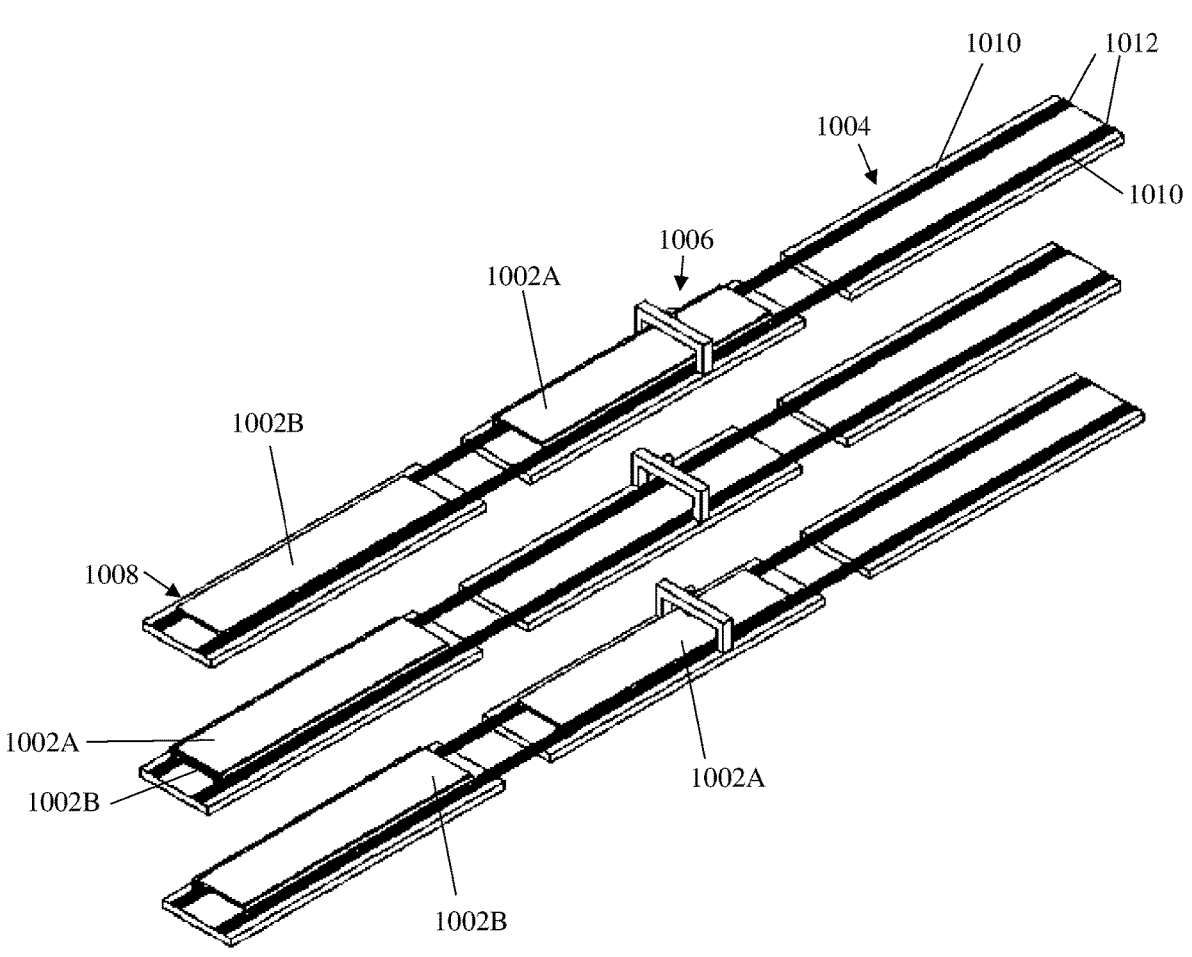
Figure 10D:
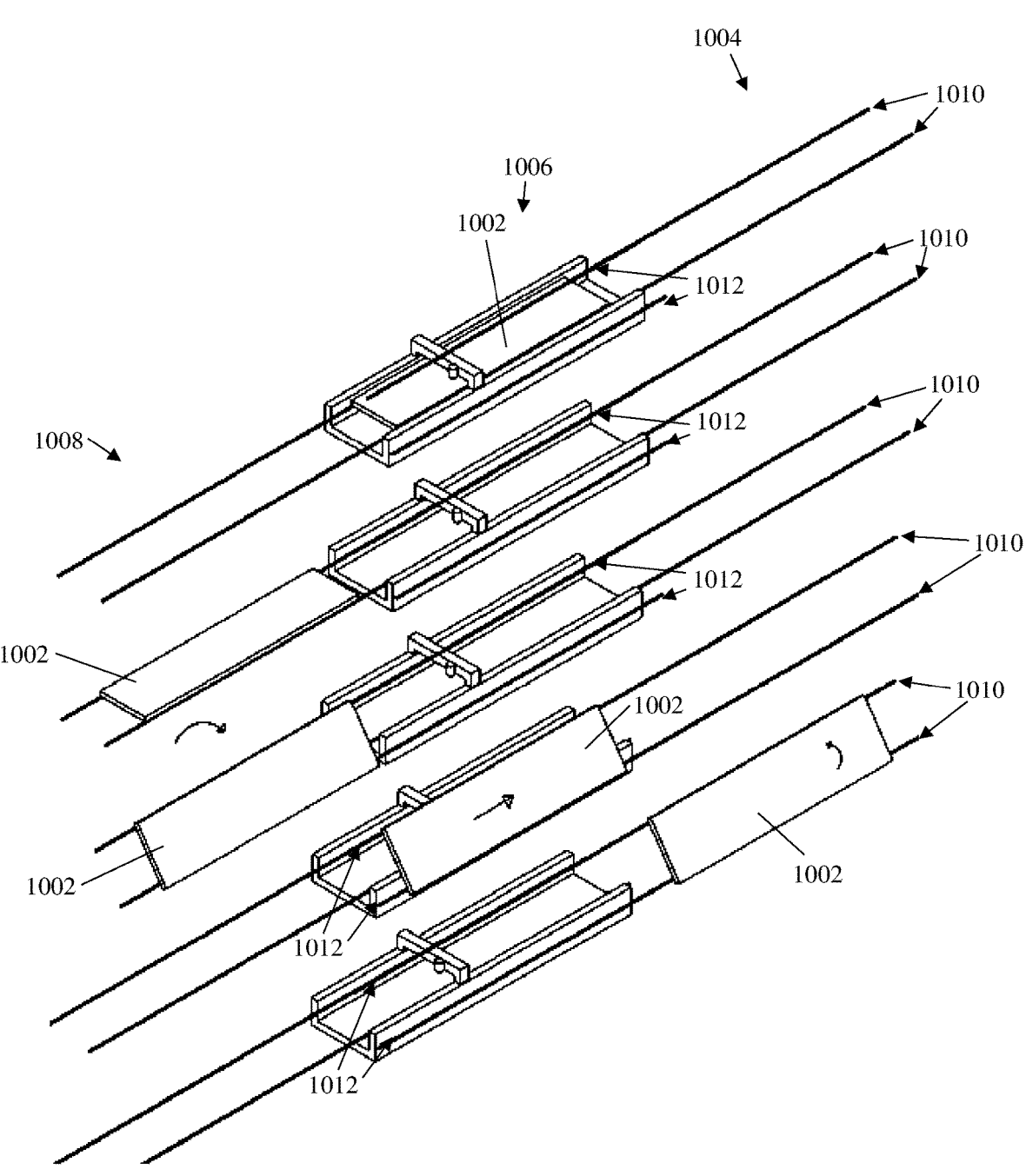
Figure 10E:
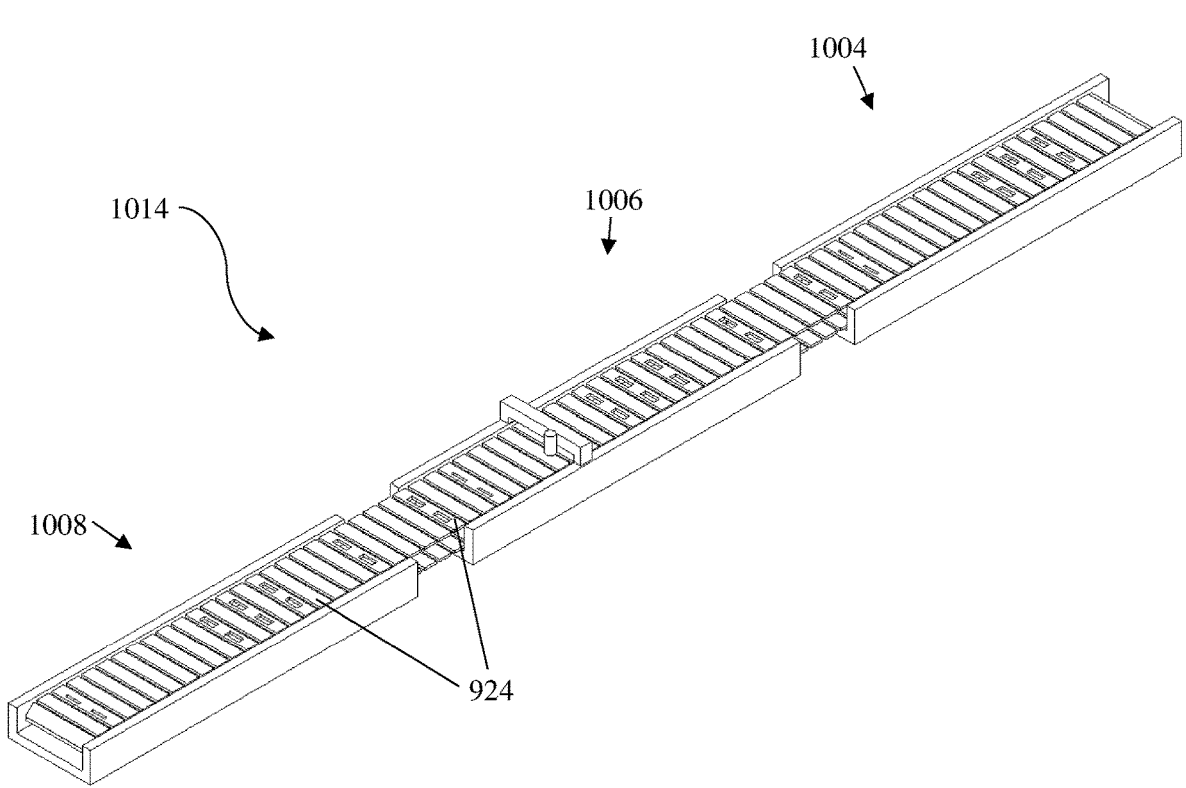
Figure 11A:
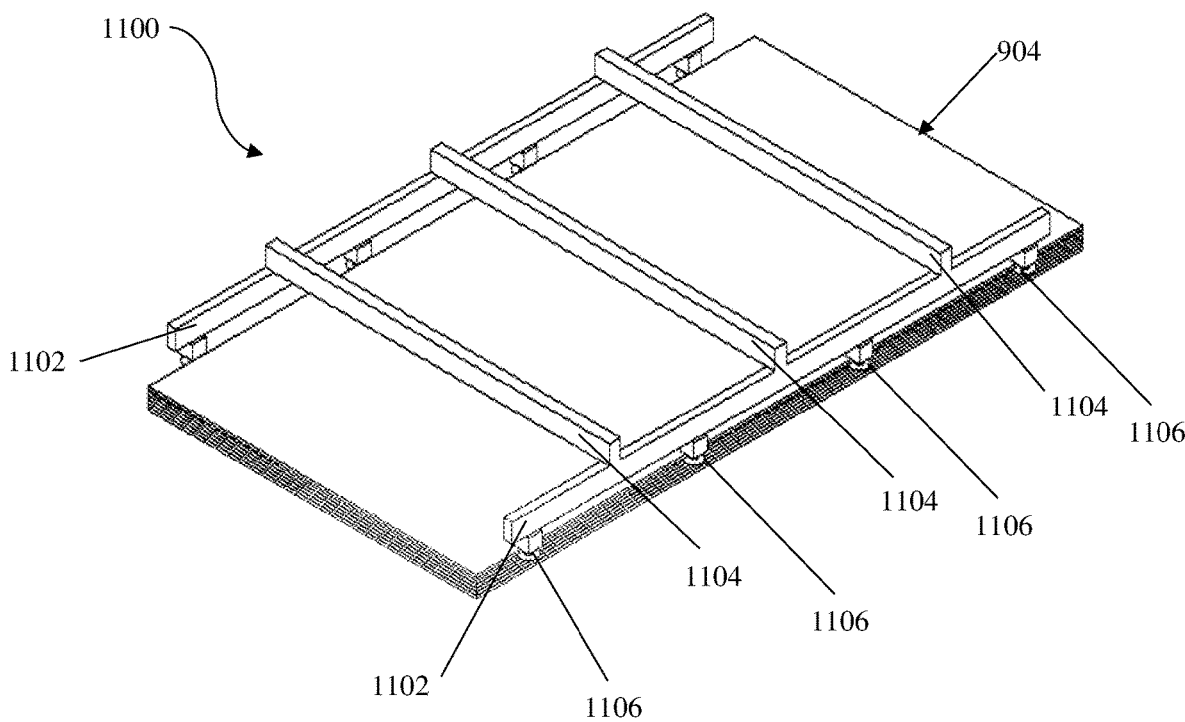
Figure 11B:
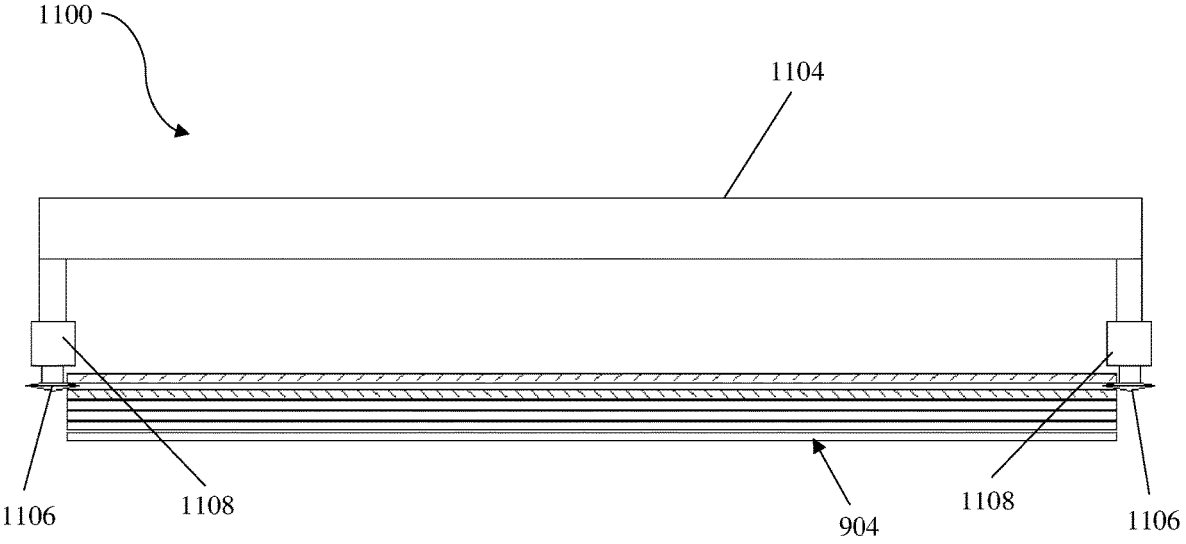
Figure 11C:
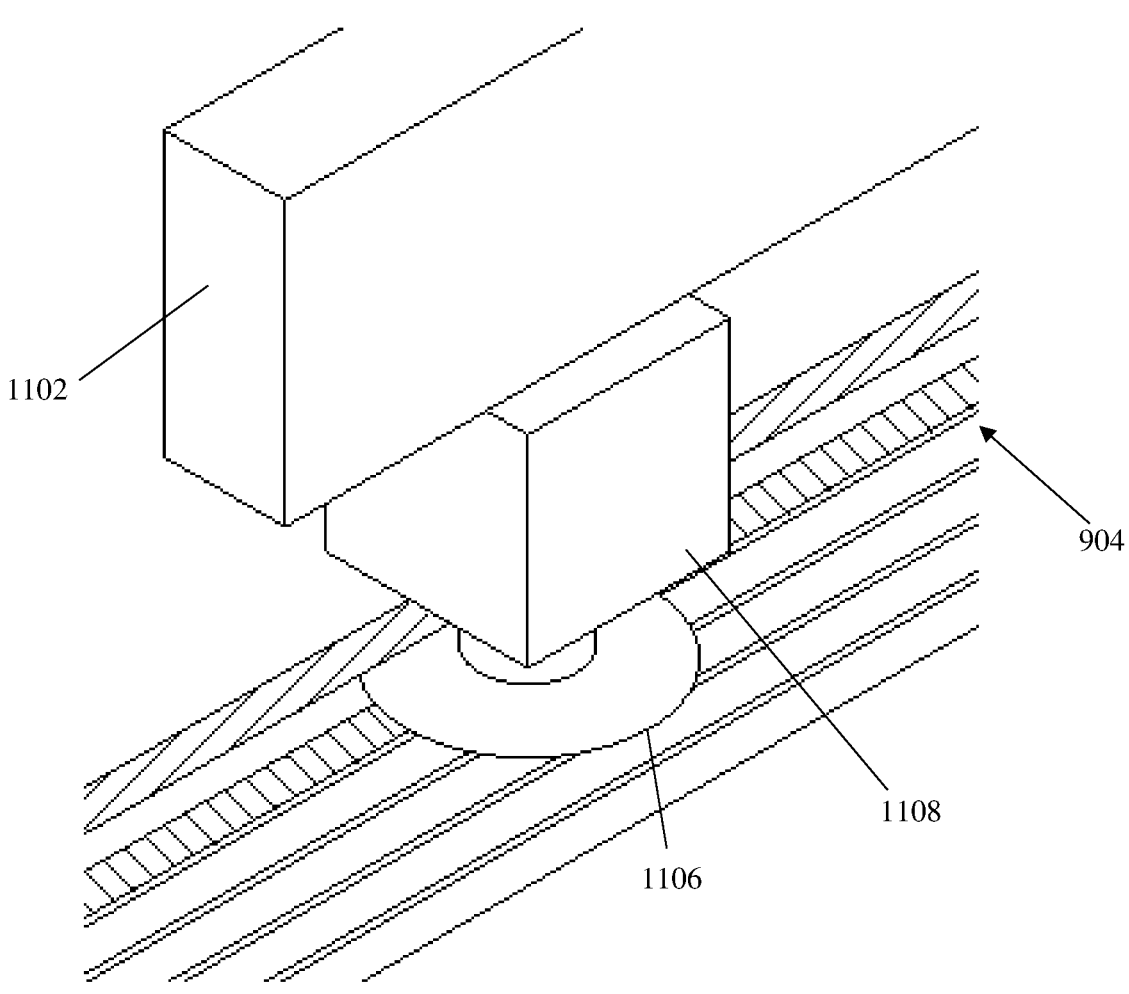
Figure 11D:
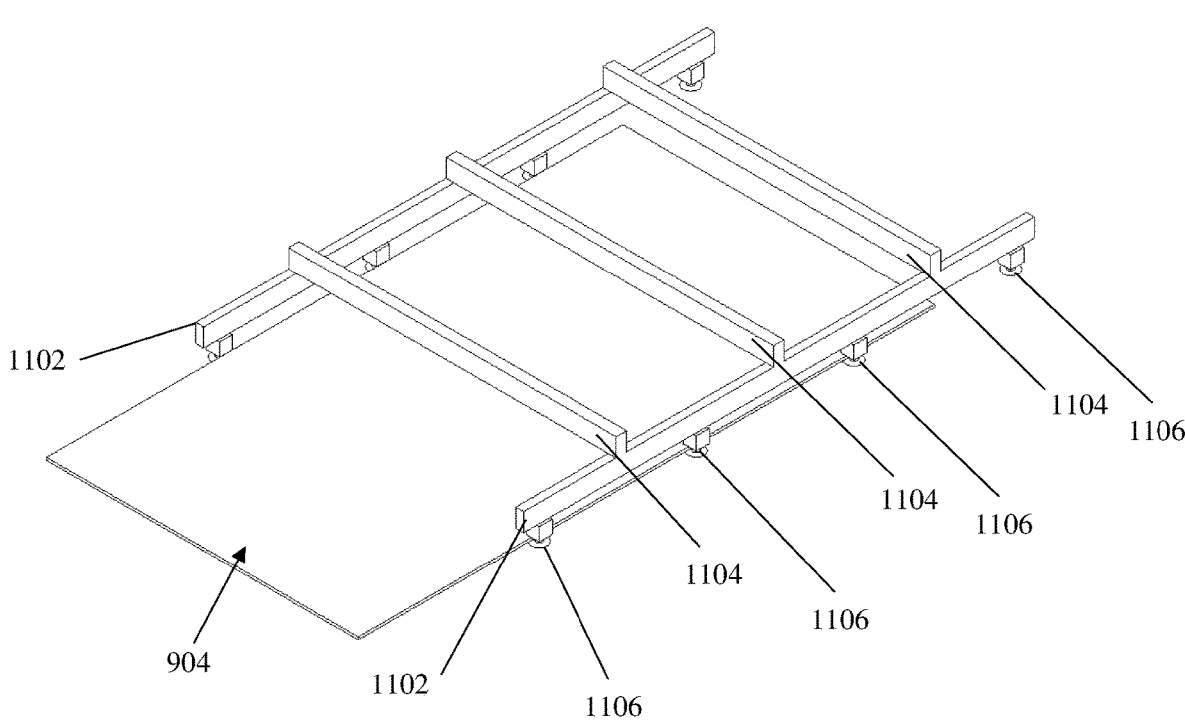
Figure 12:
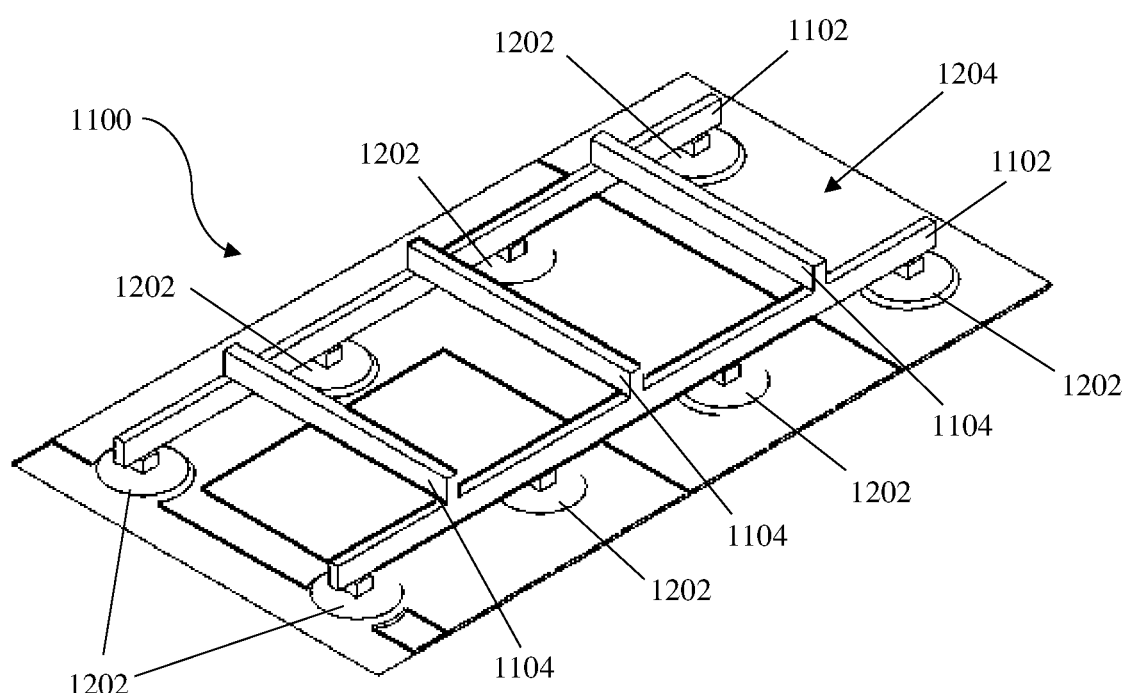
Figure 13A:
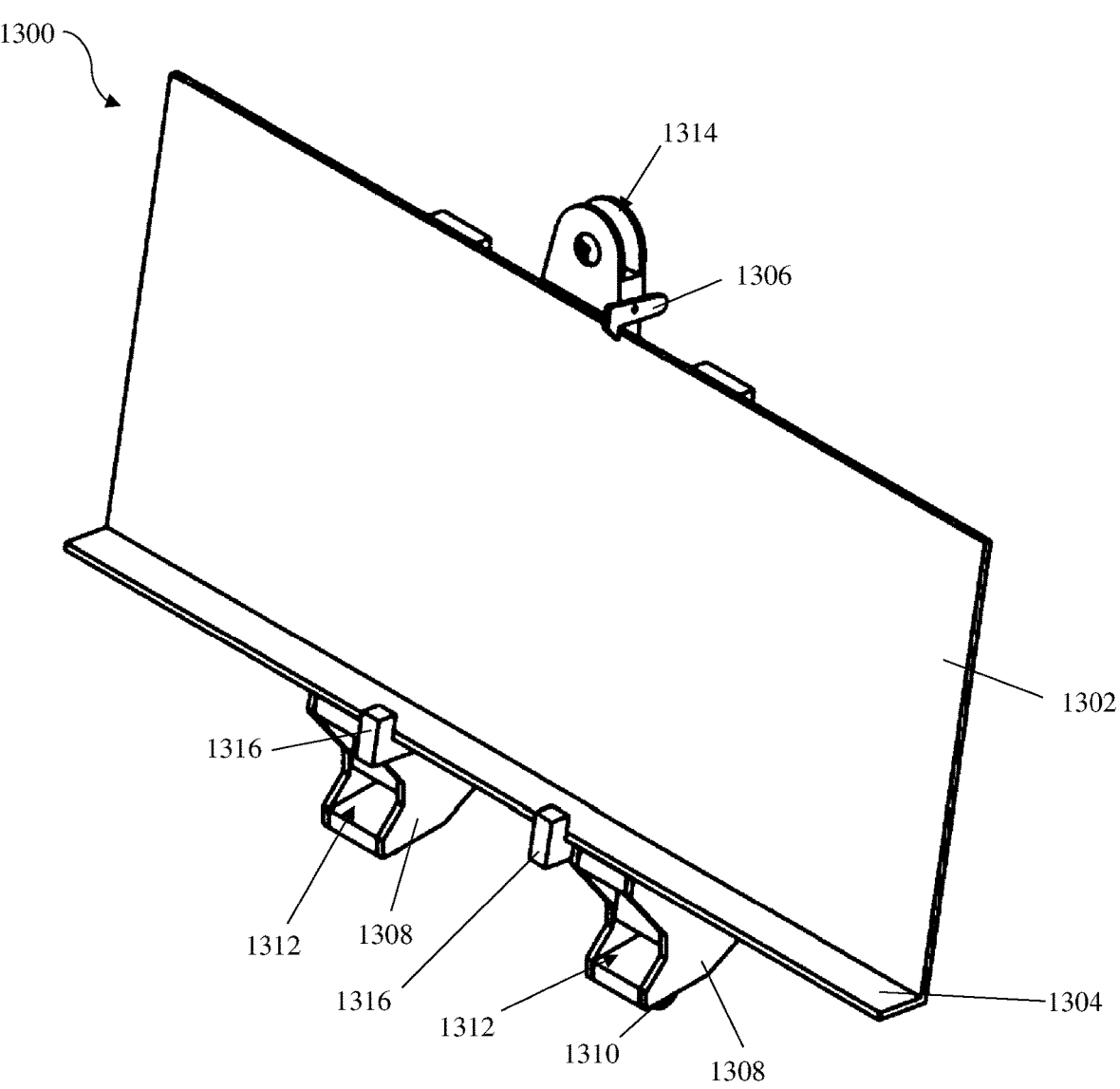
Figure 13B:
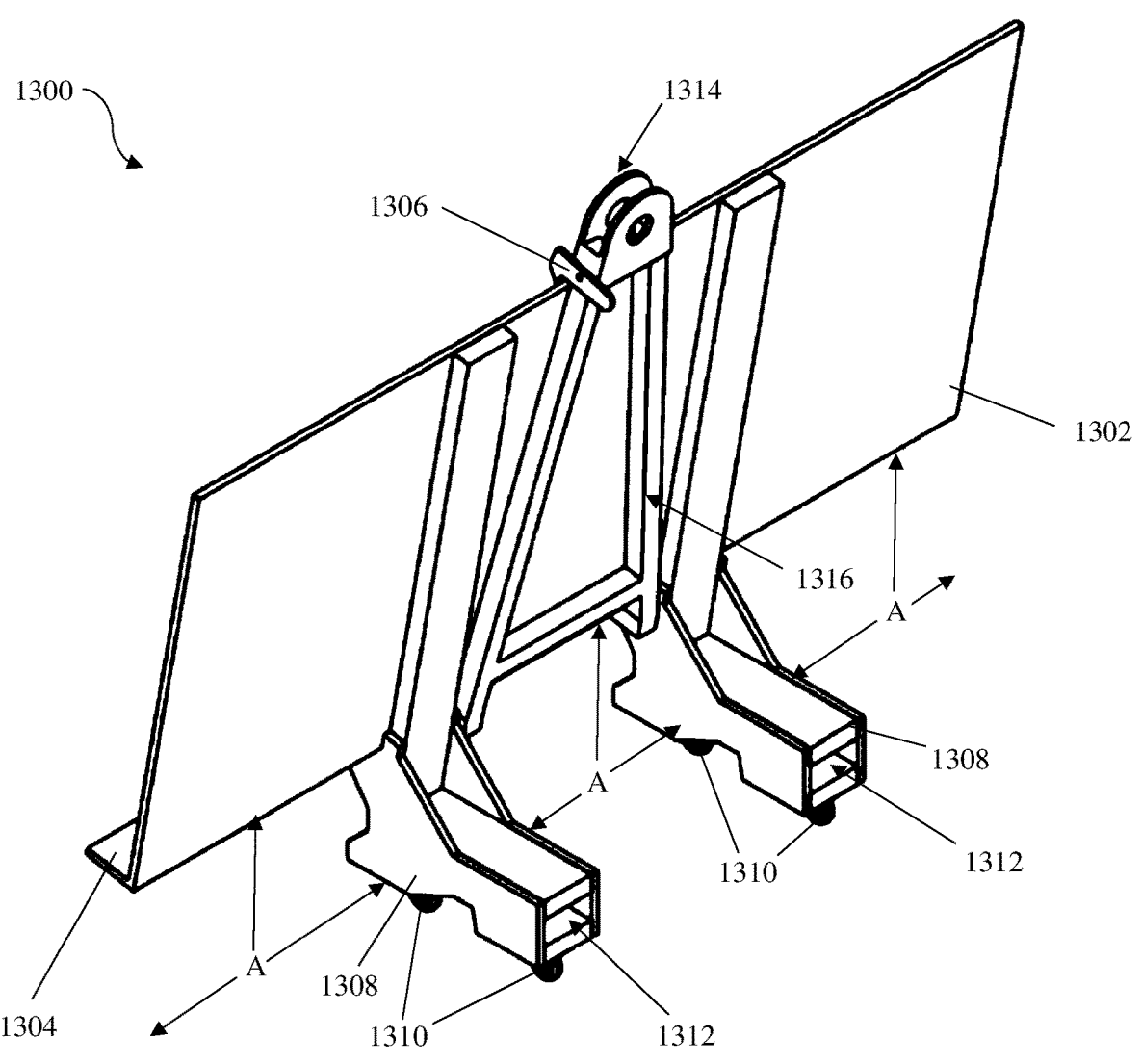
Figure 13C:
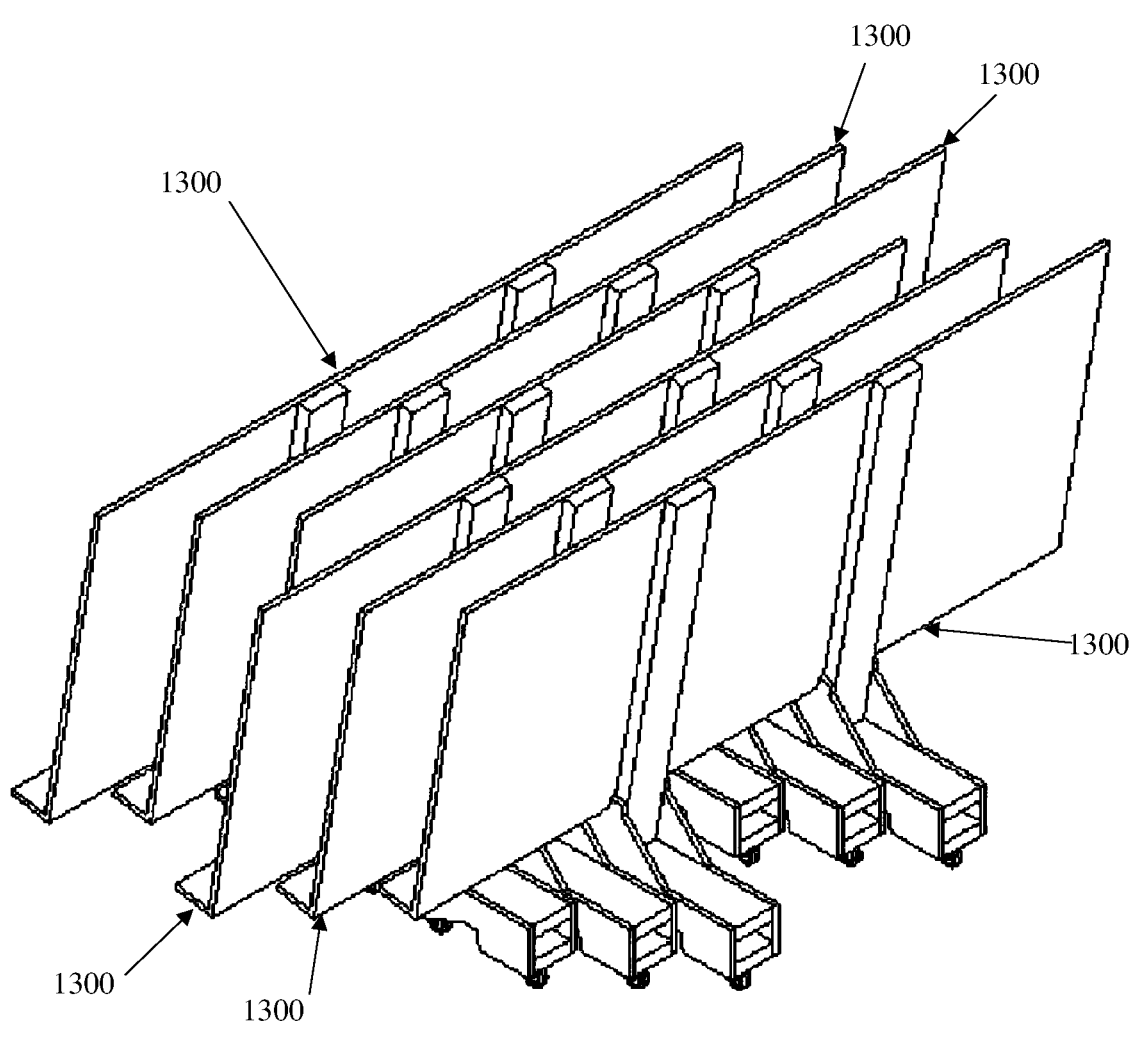
Figure 13D:
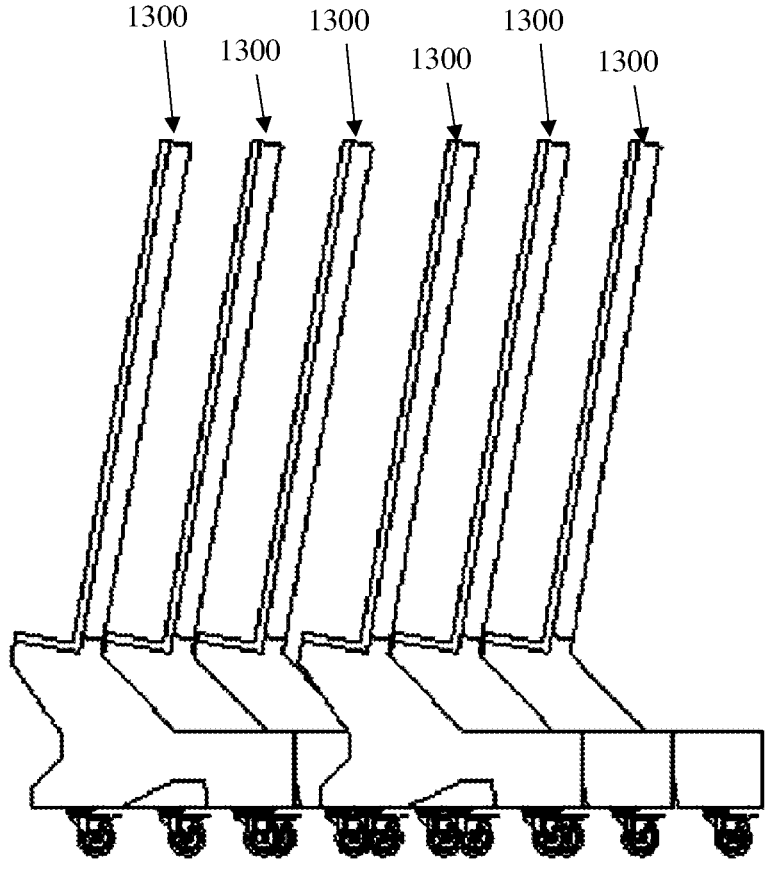
Figure 14:
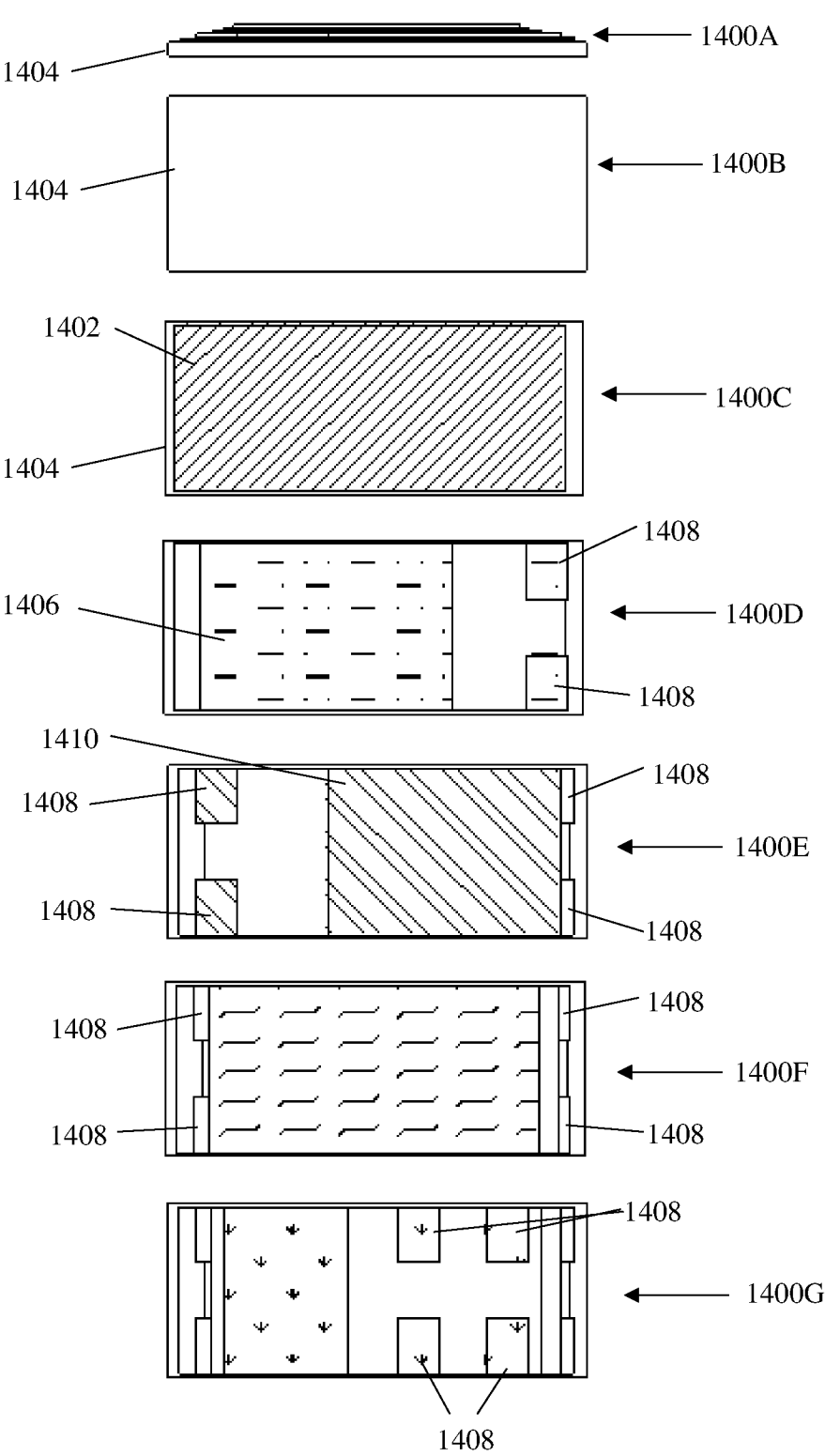
Figure 15:
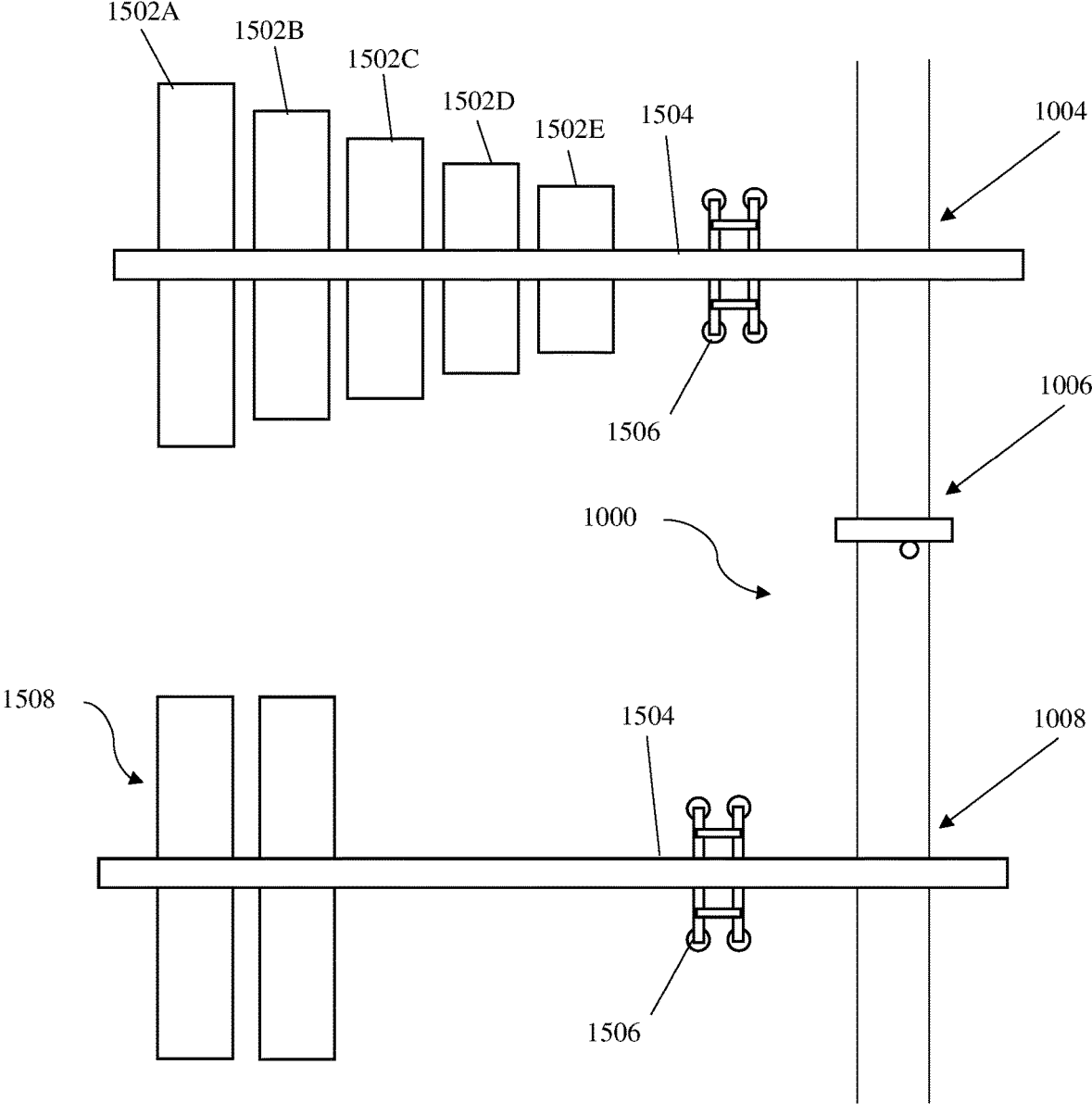
Figure 16:
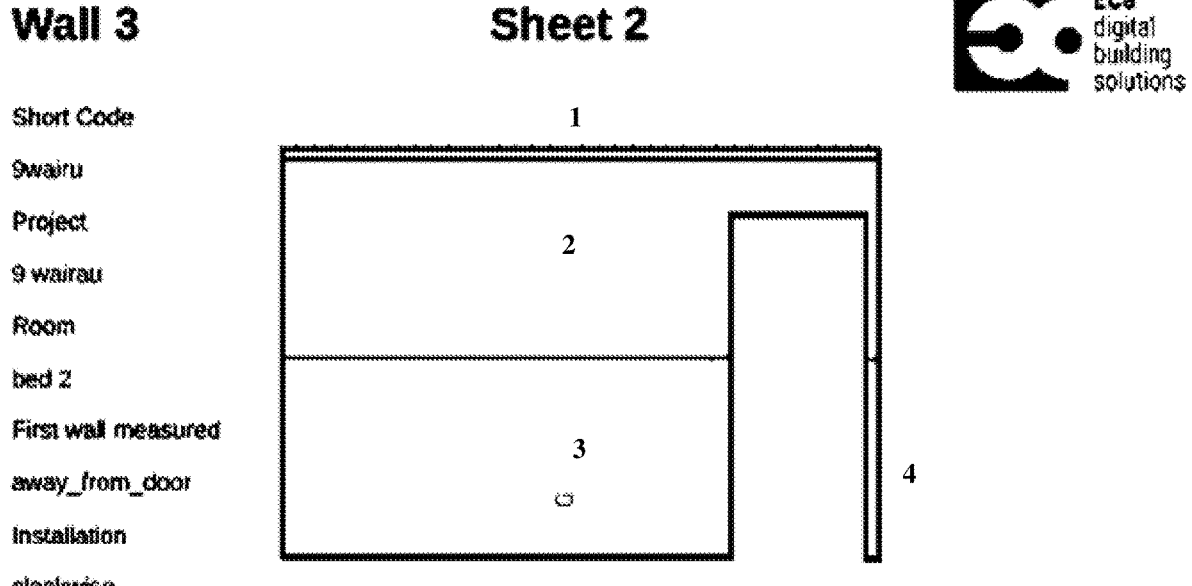
Figure 17:
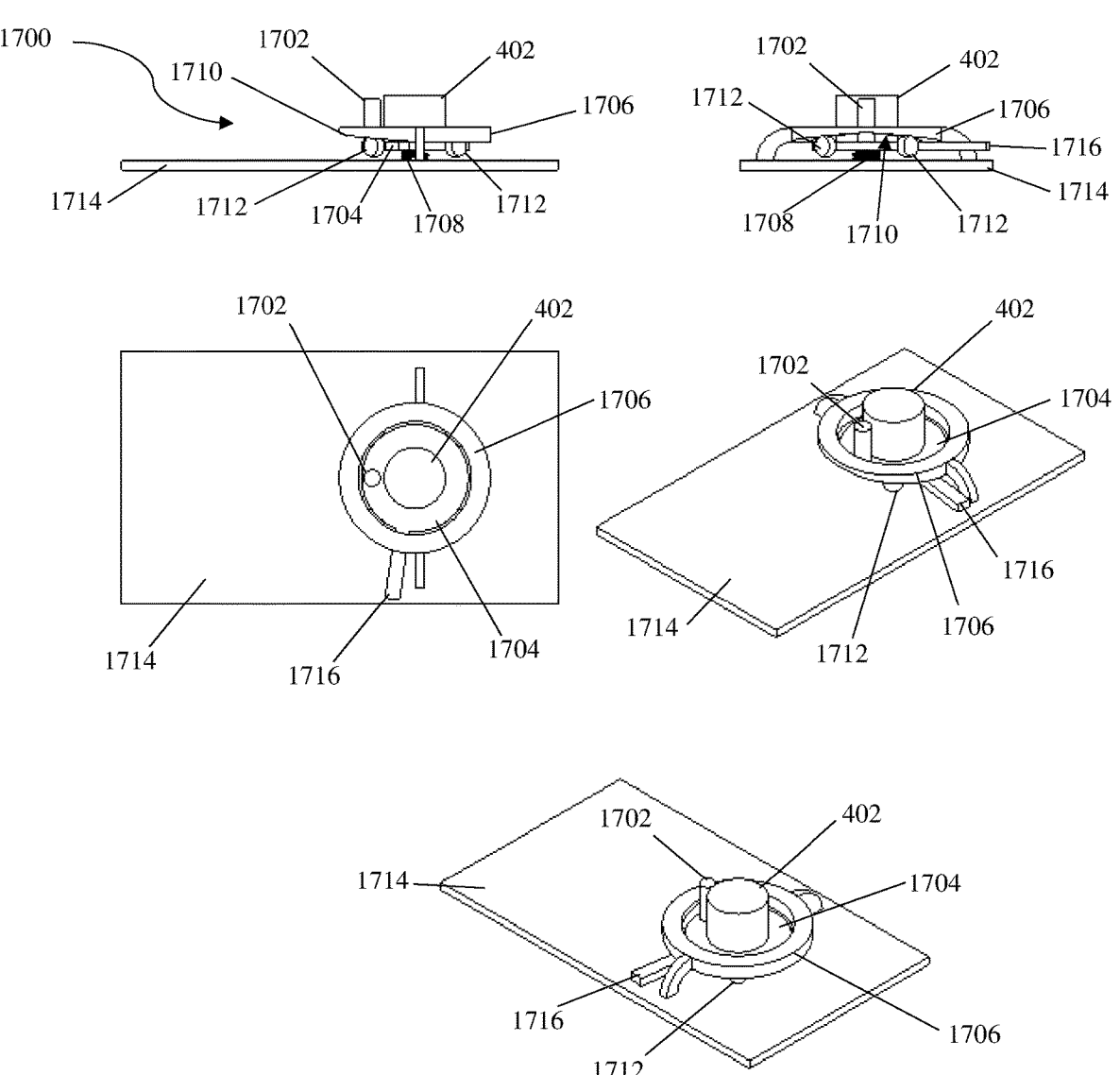

FIG. 7 is an exemplary view of a graphical user interface presented by a software application for mapping and categorising measurement device measurements according to one form of the technology;

FIG. 8A is an exemplary outline of a cut plasterboard panel in accordance with the present technology;

FIG. 8B is a further exemplary outline of a cut plasterboard panel in accordance with the present technology;

FIG. 9A is a side view of a CNC router in accordance with the present technology;

FIG. 9B. is a top view of the CNC router of FIG. 9A;

FIG. 9C is an exemplary roller to facilitate positioning of the plasterboard sheet on a bed according to one form of the technology;

FIG. 9D is a top view of a sliding bed comprising stops to facilitate secure holding of a plurality of different plasterboard sheet sizes according to one form of the technology;

FIG. 9E is a perspective view of one of the stops of FIG. 9D;

FIG. 9F is a top-down view of a dual headed CNC router, in accordance with one aspect of the present technology;

FIG. 10A is a perspective view of a system for processing plasterboard sheets, and returning a sliding bed for facilitating same according to one form of the technology;

FIG. 10B is a side view of a CNC router, comprising two pairs of rails to support two different slidable beds according to one form of the technology;

FIG. 10C is a perspective view of a system for processing plasterboard sheets, using the dual rail system of FIG. 10B FIG. 10D is a perspective view of a system for processing plasterboard sheets, and an alternative system for returning a sliding bed according to one form of the technology;

FIG. 10E is a perspective view of a conveyor system for processing plasterboard sheets according to one form of the technology;

FIG. 11A is a lifting frame to facilitate lifting of plasterboard sheets from a stack according to one form of the technology;

FIG. 11B is a side view of the lifting frame and plasterboard sheets of FIG. 11A;

FIG. 11C is a close-up view of the discs of the lifting frame of FIG. 11A;

FIG. 11D is a view of the lifting from of FIG. 11A in use;

FIG. 12 is a perspective view of a vacuum lifting frame attached to a cut plasterboard panel according to one form of the technology;

FIG. 13A is a perspective view of a transporting frame in accordance with the present technology;

FIG. 13B is a rear perspective view of the transporting frame of FIG. 13A;

FIG. 13C is a rear perspective view of the transporting frames of FIG. 13A;

FIG. 13D is a side view of the transporting frames of FIG. 13A;

FIG. 14 shows a sequence of views of a cut plasterboard panel stacking process in accordance with the present technology; and FIG. 15 shows a plasterboard processing system in accordance with the present technology;

FIG. 16 shows an example of a framing outline which has been converted to cut plasterboard panel dimensions in accordance with the present technology; and FIG. 17 shows an example of a measurement device which includes an adjustment mechanism in accordance with the present technology.

6. DETAILED DESCRIPTION OF EXEMPLARY FORMS OF THE TECHNOLOGY

6.1. Plasterboard Measuring Systems and Devices

There is a need to be able to quickly and accurately measure wall and ceiling dimensions to identify sheet shapes and sizes for plasterboard building materials. This is currently performed by taking the overall wall or ceiling dimensions, for example using a tape measure and calculating the total area to be covered. This can then be divided by the plasterboard sheet dimensions to determine the number of plasterboard sheets required. These sheets are ordered off-the-shelf in various prefabricated dimensions which are cut to size by the builder on-site. Incorrect estimation of the number of sheets required, or needing to re-order sheets due to damage can result in significant delays in a building project, therefore it is not uncommon for extra sheets to be ordered as a precaution which adds additional waste and cost to the building sector.

One aspect of the present technology is to provide systems methods and devices for accurate measurement of building framing in order to determine optimal plasterboard dimensions. Furthermore, the systems methods and devices described herein may be used to record locations where the plasterboard needs to be cut for example to account for window, or door framing, sockets, piping, power points etc.

These plasterboard dimensions may then be provided to a builder for manually cutting the plasterboard sheets, or alternatively be provided to systems and devices as described herein for automatically cutting the plasterboard sheets.

6.1.1. Measurement Device

Figure 1A:
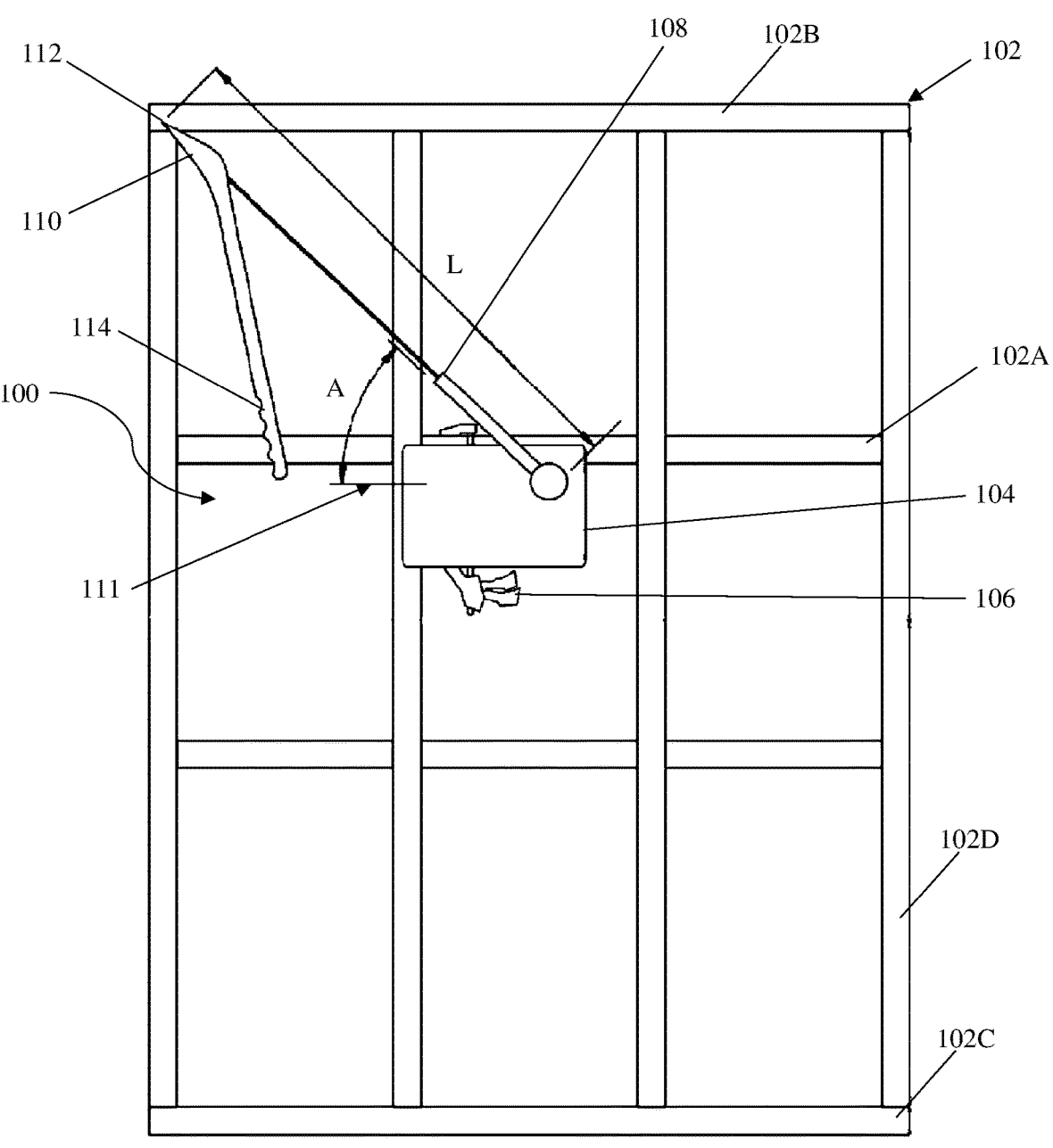
FIG. 1A is a side view of a measurement device attached to framing according to one form of the technology.
Figure 1B:
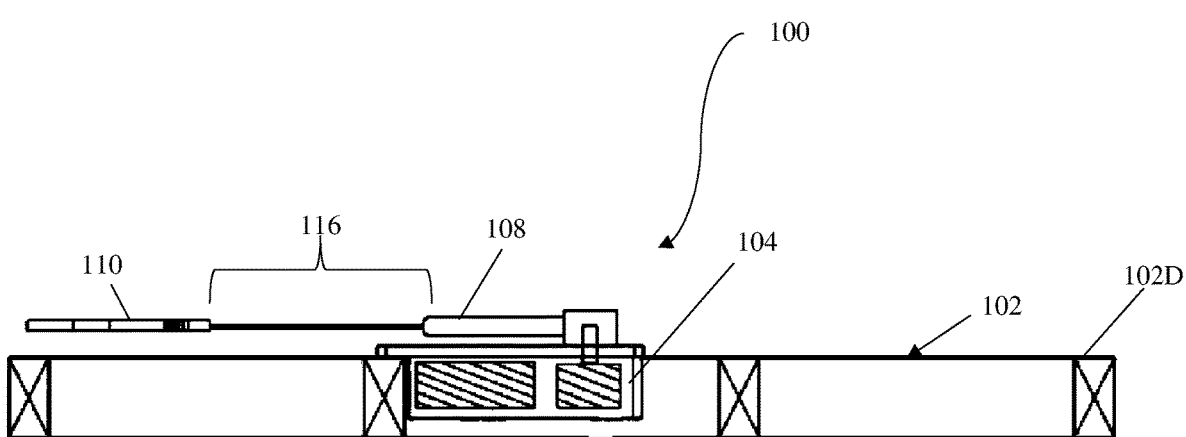
FIG. 1B is an underside view of the measurement device and framing of FIG. 1A.

In a first example of the technology shown in FIGS. 1A and 1B a measurement device 100 is provided which is configured to attach to the framing 102 of a building to facilitate measurement of area in which the plasterboard is to be located. For example, the area may be wall, or ceiling framing 102 of a building.

The measurement device 100 comprises a measuring unit 104, which is configured to attach to the framing 102 using an attachment mechanism 106 such as a clamp, or magnetic mounting system (in the case of steel framed structures). In the illustrated example, the measuring unit 104 is configured to attach to the wall noggins 102A, however this should not be seen as limiting on the technology, and in other examples such the measuring unit 104 may be attached to any one or more of the top plate 102B, bottom plate 102C, one or more of the studs 102D, or joists in the case of roof framing.

Extending from the measurement device 100 is an arm 108 which is pivotally attached to the measuring unit 104. The arm 108 is preferably extendable along its length (L), for example by using a telescoping system, or a retractable member such as a wire, string, or cable. In the example illustrated in FIG. 1 the extendable portion 116 is provided by a retractable wire, for example by using a wire drum.

In use, the measuring unit 104 is configured to measure the angle (A) of the arm relative to any suitable plane of reference 111. For example, in FIG. 1A the angle is shown to be measured with reference to a horizontal plane. However, this should not be seen as limiting on the technology, and any suitable reference plane may be used. For example, the angle may be measured with reference to a vertical plane.

In addition, the measuring unit 104 is configured to measure the length of the arm 108 (such as using the exemplary techniques given below). By combining the length and angle measurements of the measurement device

100, it is possible to calculate a point on a two-dimensional plane. This plane corresponds closely to the plane in which the plasterboard is to be installed, and therefore correlates to the dimensions of plasterboard required for the build. It should be appreciated that by measuring a plurality of points on the two-dimensional plane it is possible to define the outline which the plasterboard needs to cover. Additionally, the measuring unit can be configured to generate two-dimensional co-ordinate information which indicates the locations of various fittings such as power-points, and pipe fittings.

In some examples of the technology, the distal end 112 of the arm 108, i.e. the end 112 of the arm 108 which is furthest from the measuring unit 104, may be provided with a positioning device 110 or pointer. For example, the arm 108 may be provided with a pointed end 112, or an end which otherwise clearly indicates where the length measurement is to be measured from. In this way distal end 112 of the measurement device can be moved between a plurality of locations on the framing, in order to create a plurality of points which define the shape of the wall or ceiling to which the plasterboard is to be applied.

The positioning device 110 may further be provided with a handle 114 to facilitate easy operation by a user. For example, the handle 114 may include a gripped portion for ergonomic comfort.

Measuring the angle and length of the arm 108 can be performed using any techniques known to those skilled in the art. For example, the angle (A) can be measured using a digital angle gauge, an inclinometer, a rotary encoder, a tilt sensor, or accelerometer. Similarly, where the arm comprises retractable material, this retractable material may be provided on a spool or drum and rotations of the spool may be detected for example by using a rotary encoder. In other examples, the length of the arm may be determined by using time-domain reflectometry, or wireless distancing methods such as time-of-flight measurements.

Referring to FIG. 1B the measuring unit 104 can preferably attached to the framing 102, such that at least part of the measuring unit 104 is positioned within the wall cavity, or the space between the joists 102D and noggins 102A. By positioning the measuring unit 104 at least partially within the wall cavity, the arm 108 can be positioned more closely to the plane at which the plasterboard is going to be installed. This allows for substantially two-dimensional measurements to be made to determine the plasterboard dimensions. Furthermore, by taking advantage of the space available in the wall cavity, the present technology may be realised with off-the-shelf components such as rotary encoders without needing further design effort to miniaturise the construction.

Figure 2:
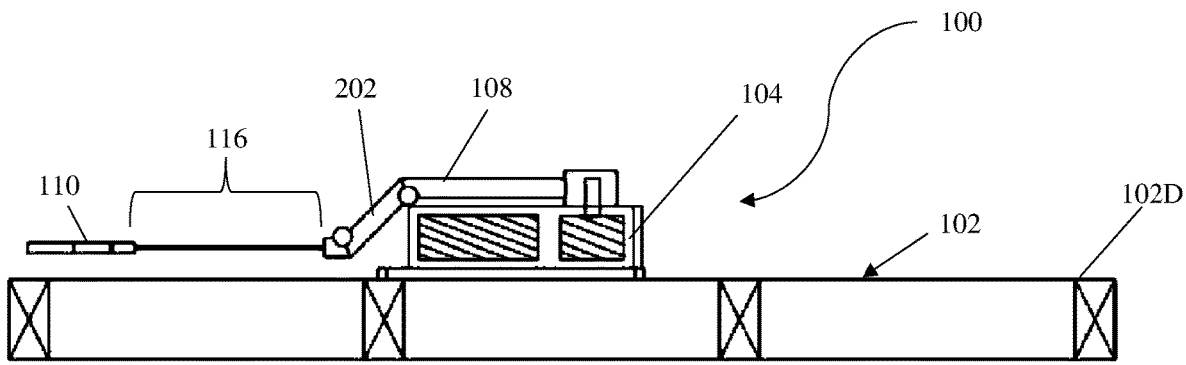
FIG. 2 is an underside view of an alternative measurement device attached to framing according to one form of the technology.
Figure 3:
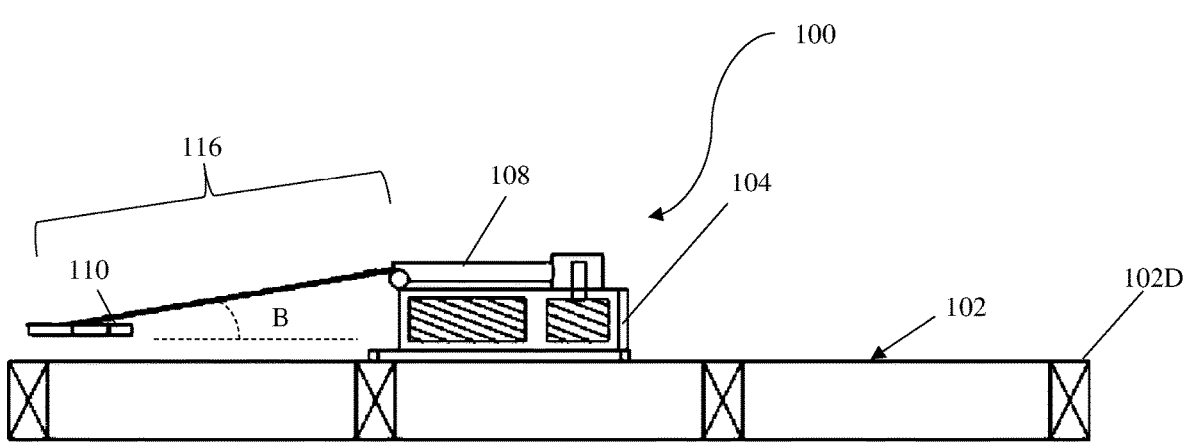
FIG. 3 is an underside view of a further alternative measurement device attached to framing according to one form of the technology.

The foregoing should not be seen as limiting on the technology, and in other examples such as those shown in FIGS. 2 and 3, the measuring unit 104 may be configured to mount substantially externally to the framing. In other words, the measuring unit 104, may be configured to attach to the front face of the framing, which is the surface that the plasterboard is configured to attach to during construction.

In the example of FIG. 2 the arm 108 comprises an offset 202, which allows for the plane of the plasterboard to be measured irrespective of the specific size, dimensions and location of the measurement device 104. For example, the retractable material may be routed through the offset 202 using techniques familiar to those skilled in the art including guides, and pulleys.

In the example of FIG. 3 the extendable portion 116 is provided at an adjustable angle (B) relative to the plane of the framing 102 and plasterboard. This angle can either be measured by the measuring unit 104 using techniques described herein in relation to arm angle measurement, or alternatively the angle (B) may be calculated automatically when performing measurements. For example, as the extendable portion 116 of the arm forms a triangle in which the hypotenuse, or longest dimension, is measured using the techniques described herein, the distance offset from the framing, i.e. the distance opposite to angle B is defined by the distance in which the arm is positioned relative to the front surface of the framing, and is set by the depth of the measuring unit 104. Accordingly, using trigonometry the distance along the plane of the framing 102 and or the angle B can be calculated, for example using the Pythagorean Theorem.

6.1.2. Wireless Distance Measuring Technologies

While the foregoing examples are described in relation measurement devices comprising an extendable arm, this should in no way be seen as limiting on the technology, and in other examples, the measurement may be conducted using any wireless measurement technologies known to those skilled in the art, including LIDAR, laser and LED time-of-flight sensors, ultrasonics, and triangulation technologies.

Examples of a wireless distance measuring system 400 is shown in FIGS. 4A, 4B, 4C, and 4D. The system comprises a measuring unit 104 which is configured to attach to the framing 102 using an attachment mechanism 106 such as a clamp, or magnetic mounting system as described herein.

The measuring unit 104 comprises an optical distance sensor 402 configured to measure distance. For example, the optical distance sensor may be configured to use any one or more of LIDAR, laser and LED time-of-flight sensors, or distance measurement sensors using triangulation. In other examples of the technology a wireless distance sensor such as an ultrasonic or radio frequency (RF) distance sensor may be used.

In a preferred example of the technology, the optical distance sensor 402 is configured to provide distance measurement in a 360-degree field of view, relative to the optical distance sensor 402. For example, the optical distance sensor may comprise an angular adjustment mechanism, such as a motor or lens which is configured to in-use deflect the measuring light beam around a 360-degree arc.

In use the optical distance sensor 402 is configured to project one or more light beams onto one or more surfaces, and measure the distance between the optical sensor 402 and the surfaces, for example by using reflection of the light from the surfaces 414.

In one example of the technology, in order to obtain accurate distance measurements, a positioning device 404 is provided which, in-use, provides one or more surfaces 406 to reflect the incident light beam from the optical distance sensor 402.

In use, a user may position the positioning device 404 in any suitable location on the framing in order to indicate to the measuring unit 104 the position of one or more features including a corner of the framing, i.e. defining the area which the plasterboard needs to cover, or a location of a cut-out in the framing, such as for windows, doors, power points, pipes or conduit.

The positioning device 404 preferably includes one or more surfaces 406 which are positioned at an angle relative to one another. These angles are preferably selected with values that are unlikely to be observed on a construction site. In this way it may be possible to distinguish reflections from the positioning device independently of other reflections from surfaces on the building site. For example, the shape could be an pentagonal, hexagonal or octagonal shape. In other examples the shape may be characteristic in its length, i.e. a length which is unlikely to be observed on a construction site such as less than 50 mm or comprise a series of openings which the measurement device may detect, such as a series of apertures in the surface. In other examples of the technology the surfaces 406 may be provided with a highly reflective surface, such as using a polished metal, prism or mirror such that the reflected light from the positioning device has a greater intensity than the reflected light from other surfaces on the building site. This intensity difference may be detected by the measuring unit 104, and used to distinguish the positioning device 404 from reflections off other surfaces. In other examples of the technology, the reflective surfaces may be configured to reflect only specific wavelengths of light, such as blue or green light (or different wavelengths of invisible light such as infra-red or ultra-violet), by using a colour filter. Accordingly, the measuring unit 104, may distinguish the positioning device 404 by identifying specific wavelengths of reflected light.

In the example of FIGS. 4A-4D, the positioning device 404 may comprise six reflective surfaces 406 positioned on three arms 408 spaced evenly around the circumference of the positioning device. These six reflective surfaces 406 may be positioned to provide three reflective angles between each of the arms 408, the reflective angles measuring approximately 120 degrees. A further potential advantage of using three arms 408 reflective angles of approximately 120 degrees is that the resulting three-pointed star shape enables measurement from either side of the positioning device 404. For example, the positioning device may be located in a corner of a framed structure, and the length of the arm 408 may be factored into the total distance measurement. In other words, the measuring unit 104 may be configured to include an offset in the positioning device 404 which is substantially equivalent to the length of the arm 408 from the reflective surfaces 406.

Figure 4A:
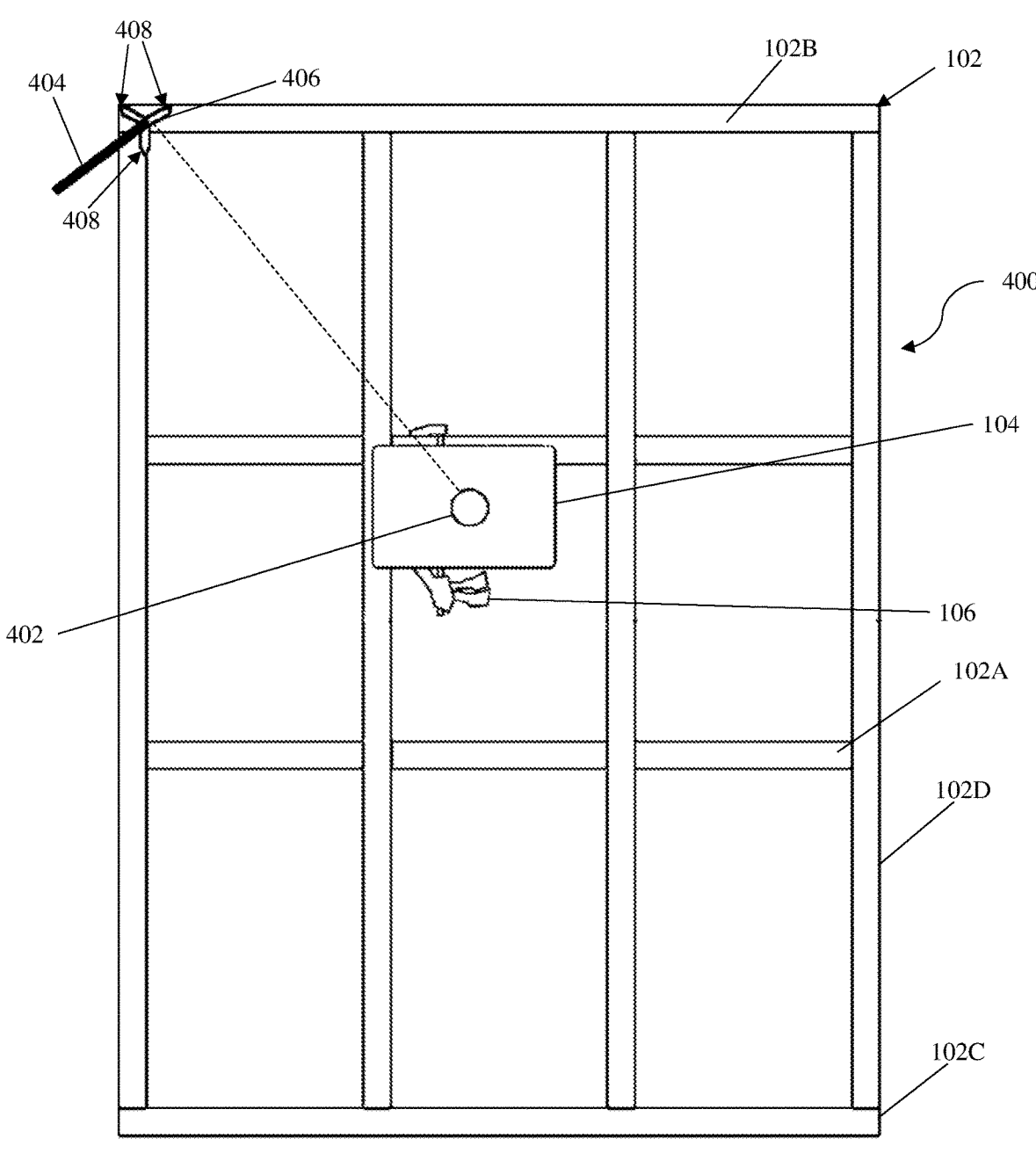
FIG. 4A is a side view of a wireless measurement device attached to framing according to one form of the technology.
Figure 4B:
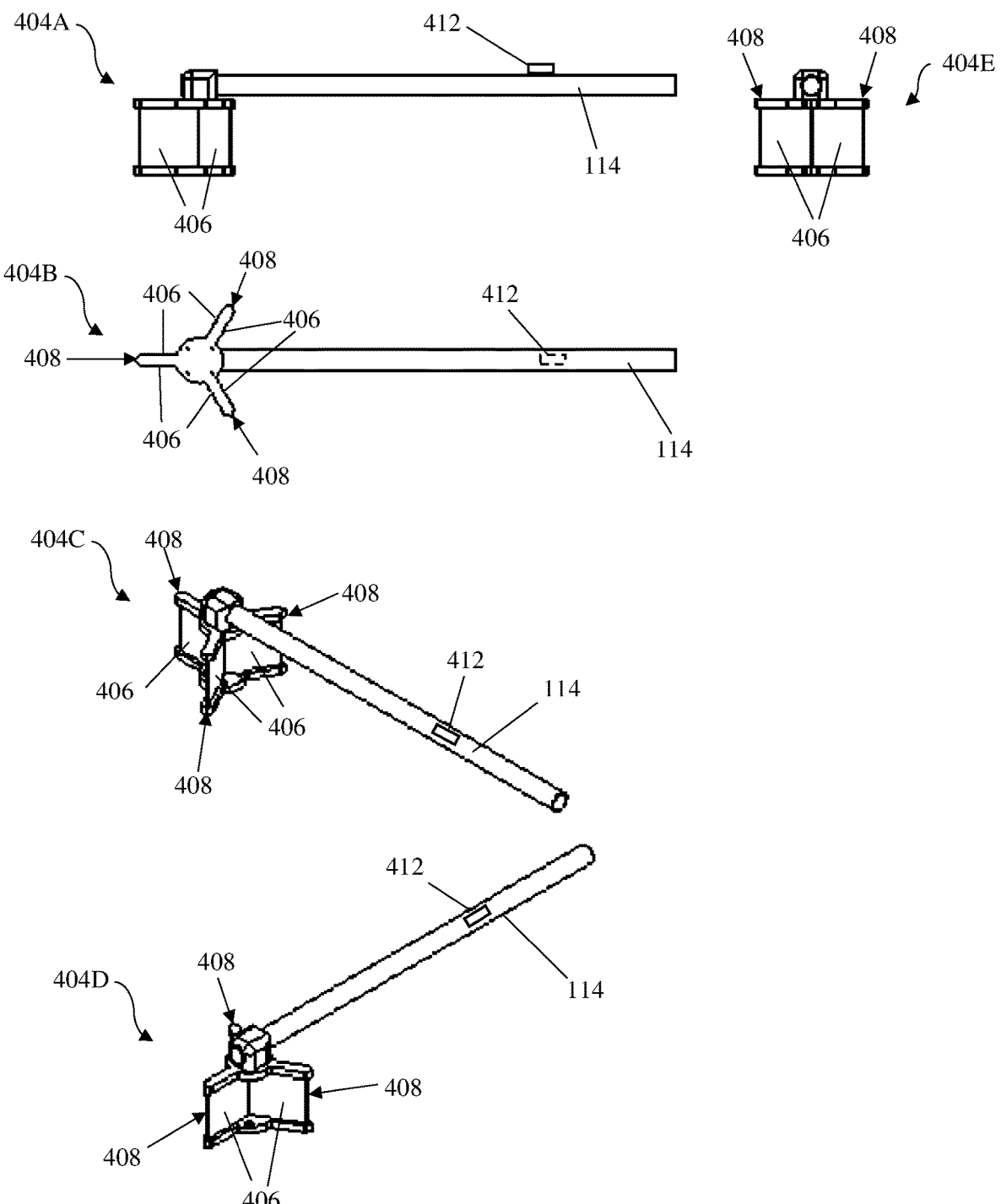
FIG. 4B shows various views of a positioning device for use with the measurement device of FIG. 4A.

FIG. 4B shows a side view 404A, a bottom view 404B, two perspective views 404C, 404D and an end view 404E of a positioning device 404 in accordance with the present technology. The positioning device 404 in this figure includes a handle 114 to facilitate positioning of the positioning device 404. In the illustrated example the handle 114 is substantially cylindrical, however this could be constructed of any suitable shape.

In some examples of the technology, the handle 114 of the positioning device is provided with an interactable element 412 such as a button or switch, which is configured to facilitate communication with the measuring unit 104. For example, the interactable element 412 may be pressed when the positioning device 404 is in the correct position for a distance and angle measurement to be taken. In other words, the pressing or otherwise actuating the interactable element 412 may cause a signal to be transmitted to the measuring unit 104 such as a wireless or wired signal instructing the measuring unit to take a measurement.

In the wired examples described herein, actuating the interactable element 412 may instruct the measuring unit 104 to perform a length and angle measurement in order to determine the location of the positioning device 404.

Figure 4C:
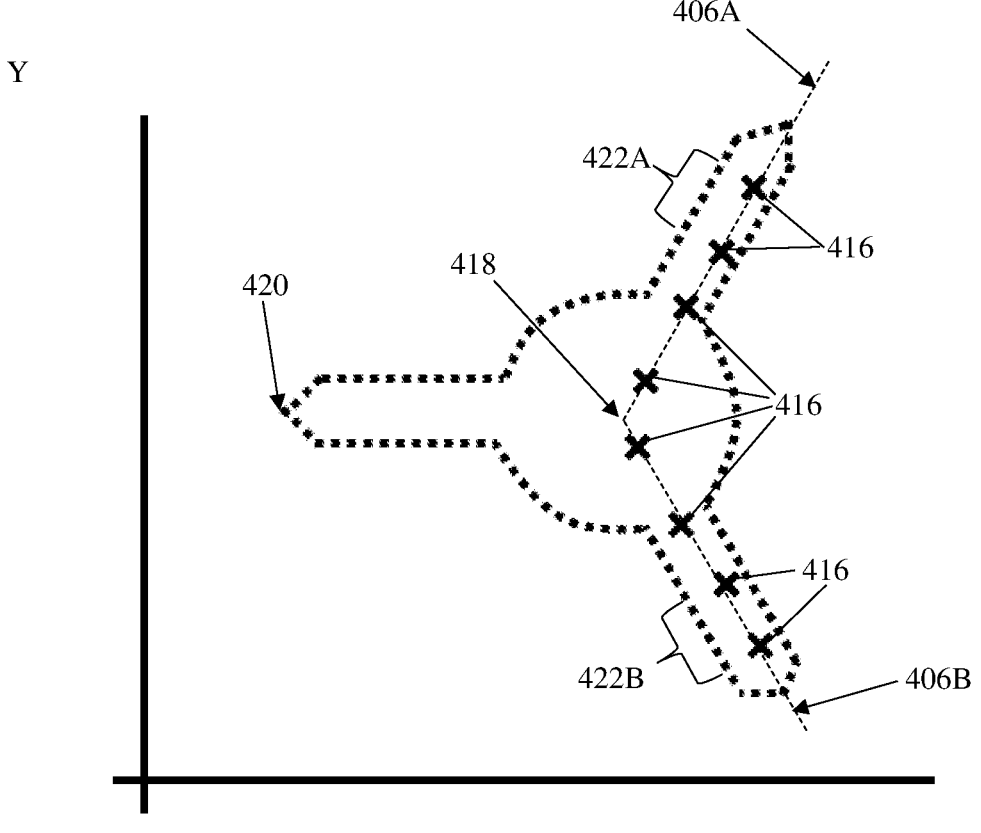
FIG. 4C is an exemplary plot of data points obtained from a wireless measurement device according to one form of the technology.

In the wireless examples described herein, actuating the interactable element 112 may instruct the measuring unit 104 to perform a scan (preferably in 360 degrees) to identify geometry or surfaces 414 surrounding the measuring unit 104, including any geometry which is indicative of the reflective surfaces 406 of the positioning device 404. It should be appreciated that the distance and angle information generated by the optical distance sensor 402 may be provided as a point cloud, or a collection of distance and angle information (e.g. in the form of an array) that can be represented as points 416 in a two-dimensional or three-dimensional space. One example of a point cloud indicative of positioning device geometry is shown in FIG. 4C. As shown the point cloud comprises a series of discrete points 416 of distance and angle information which can be represented as two-dimensional X and Y coordinates representing the location of the points in 2D space. The spacing of the points 416 in the point cloud is a function of the speed of the optical sensor 402, the rate of rotation of the optical sensor 402, and the distance of the reflective surfaces 406, 414, from the optical sensor 402.

From the point cloud information, it is possible to infer the location of a central point 418 on the positioning device. For example, by using a combination of interpolation (to predict geometry between two points), and extrapolation (to predict geometry outside of the points in the point cloud), it is possible to identify relevant surfaces 406A, 406B on the positioning device as well as the central point 418 where these surfaces 406A, 406B intersect.

As the present technology can detect the angles of the surfaces 406, and the central point 418 of the positioning device, it is possible to calculate a distal point 420, 112 on the positioning device which correlates to a location on the positioning device positioned against relevant geometry on the framing such as framing edges, windows, doors, electrical sockets, conduits and pipes.

Using statistical modelling techniques, point 416 information which are outliers can either be ignored or averaged to improve the accuracy of the foregoing technology. For example, statistical tests including Pierce's criterion, Chauvenet's Criterion, and Grubb's test may be used to identify outliers, among others which should be familiar to those skilled in the art. In a preferred example of the technology, outlines are calculated from multiple points using the least squared method, and R2 values to determine how well the points match the predicted surfaces.

A further aspect of the technology is that the scanning of surfaces to obtain point information can be controlled in real-time by the measuring unit 104. For example, the optical distance sensor 402 may be configured to start a 360-degree scan, and automatically stop the scan once a sufficient number of data points have been obtained to accurately identify the location of surfaces 414, and/or the positioning device 404.

In one example of the technology, the measuring unit 104 may be configured to do a preliminary 360 degree scan to identify potential locations of the positioning device, for example by identifying a first point pair 422A and a second point pair 422B, wherein the first point pair 422A defines a first surface or axis 406A, and the second point pair 422B defines a second surface or axis 406B, and wherein the first surface 406A is at an angle relative to the second surface 406B which corresponds to an angle on the positioning device, such as 120 degrees. More generally the angle of the first surface 406A relative to the second surface 406B may be considered to correspond to an angle of the positioning device if the angle is within 5% of the target, for example between 114 degrees and 126 degrees.

Once the potential location of the positioning device 404 has been identified, the measuring unit 104 may perform a targeted scan of the potential location to collect more point information in the relevant area. This approach may reduce the amount of information requiring processing and allowing more rapid detection of the relevant geometry. If the targeted scan fails to validate the presence of the positioning device 404, the point cloud may be assessed to determine other potential candidate locations, or alternatively a second 360 degree identifying scan may be performed.

It should be appreciated that the foregoing point clouds may be generated in one or more rotations or scans conducted by the measuring unit 104. In one example, the optical sensor 402 is running continuously and only records the relevant point 416 information when instructed to do so using the methods described herein. In other examples, the measuring unit 104 is set to perform a predefined number of scanning cycles such as between one and three 360-degree scans. In other examples, the measuring unit is configured to dynamically adjust the number of scanning cycles performed based on the detection, resolution, and/or accuracy and confidence of the point 416 measurements/geometry.

It should be appreciated that the measuring unit 104 in the wireless distance measuring system 400, may include any of the features described in relation to the measuring unit 104 of the arm-based distance measuring systems 100. Accordingly, the measuring unit 104 may also be configured to mount at least partially within the wall cavity as shown in FIG. 1B, or alternatively substantially externally to the wall cavity as shown in FIGS. 2 and 3.

Furthermore, one example of the technology combines the wireless scanning technologies described herein, with wired measurement capabilities such as those described in relation to FIGS. 1-3. In this way the combined technology may allow automated detection of relevant surfaces 414, and rapid manual detection of location information using a positioning device 110 as described herein.

Figure 4D:
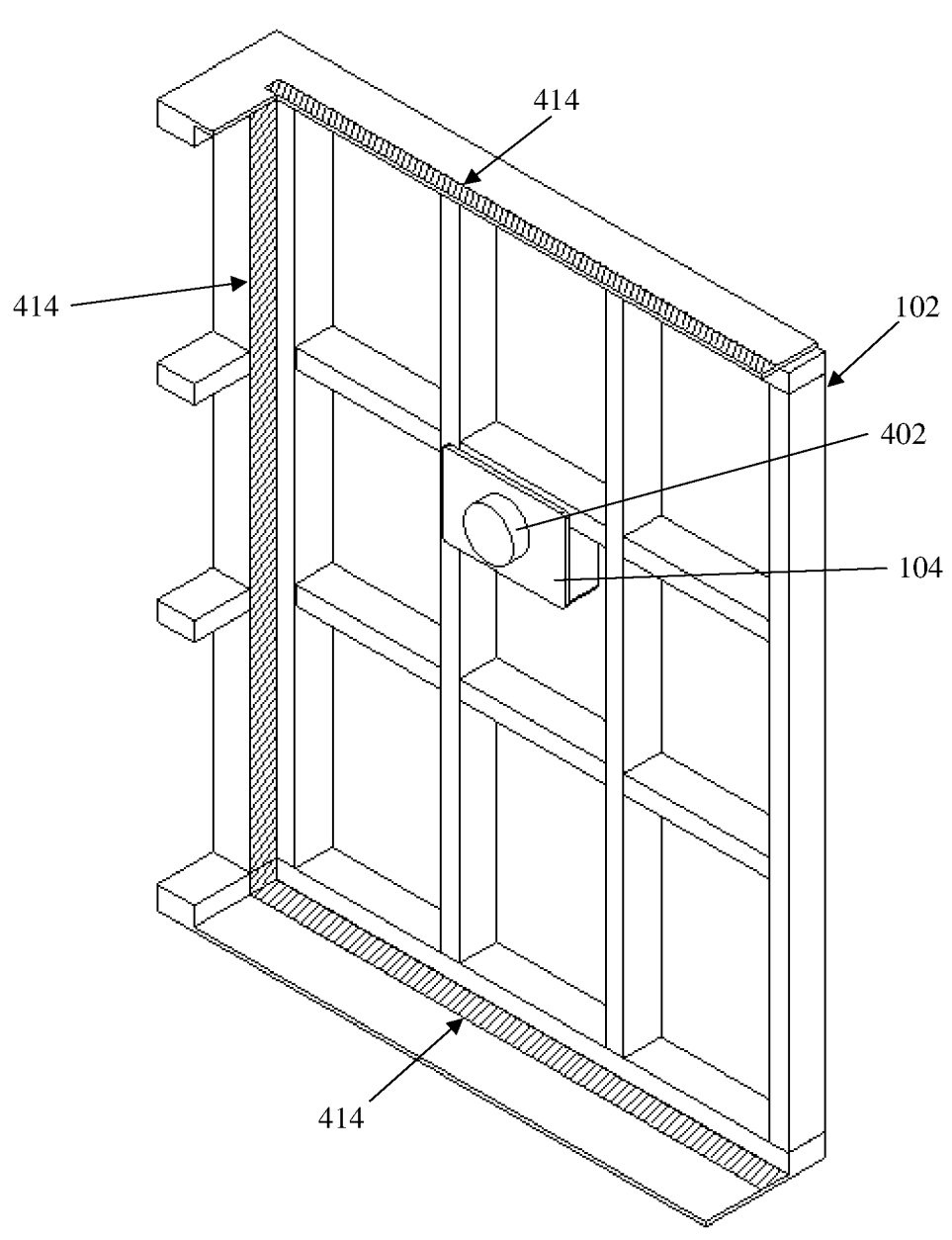
FIG. 4D shows a perspective view of the wireless measurement device of FIG. 4A attached to framing, and automatically detecting surfaces adjacent to the framing.

Another feature of the present technology is the ability to detect adjacent surfaces 414 to the framing 102, automatically, for example the present technology may be used to detect the location of flooring, other wall framing, a ceiling or ceiling framing automatically. One example of this is shown in FIG. 4D.

As shown, the measuring unit 104 is attached to the framing using the techniques described herein such as an attachment mechanism 106. An optical distance sensor 402 is provided to the measuring unit 104 and is configured to in use perform a 360-degree scan of the surrounding environment to obtain a series of distance and angle data points indicative of surfaces 414 adjacent to the framing 102. In situations where the surface 414 data points provide a full perimeter around the framing, the plasterboard dimensions can be directly determined. However, where no reflective surfaces are provided in one or more directions, such as is shown in FIG. 4D, the present technology may use a positioning device 404 as described herein to obtain any missing data points, as well as location information pertaining to electrical sockets, conduits, pipes, and fittings.

In some framing applications, a surface 414 of approximately 40 mm may be provided around the edge of wall framing, to facilitate the attachment of plasterboard sheets to adjacent wall sections. This 40 mm surface may provide the surface which the measuring unit 104 detects in use to determine the plasterboard perimeter.

The present technology may also detect and treat surfaces 414 differently to point information obtained using the positioning device 404. For example, it may be advantageous to leave a 5 mm gap between adjacent surfaces 414 to prevent moisture ingress, and/or to leave a gap to allow easier installation of the plasterboard. Accordingly, surface 414 information may be provided with an offset to account for any required spacing.

One potential advantage of using a two-dimensional measuring unit 104, is that the required sensors and processing is reduced, allowing for smaller, more compact measuring units 104, which may be provided more cost-effectively, and require less processing power in order to determine the relevant dimensions of the plasterboard sheet required.

The measurement devices 104 described herein may advantageously allow for rapid accurate measurement of building framing for the purposes of determining the dimensions, and amount of plasterboard required to construct the building. Accordingly, the present technology may be used by any appropriately trained person without requiring specialist skills, such as those of a quantity surveyor.

6.1.2.1. Calibration

Figure 5A:
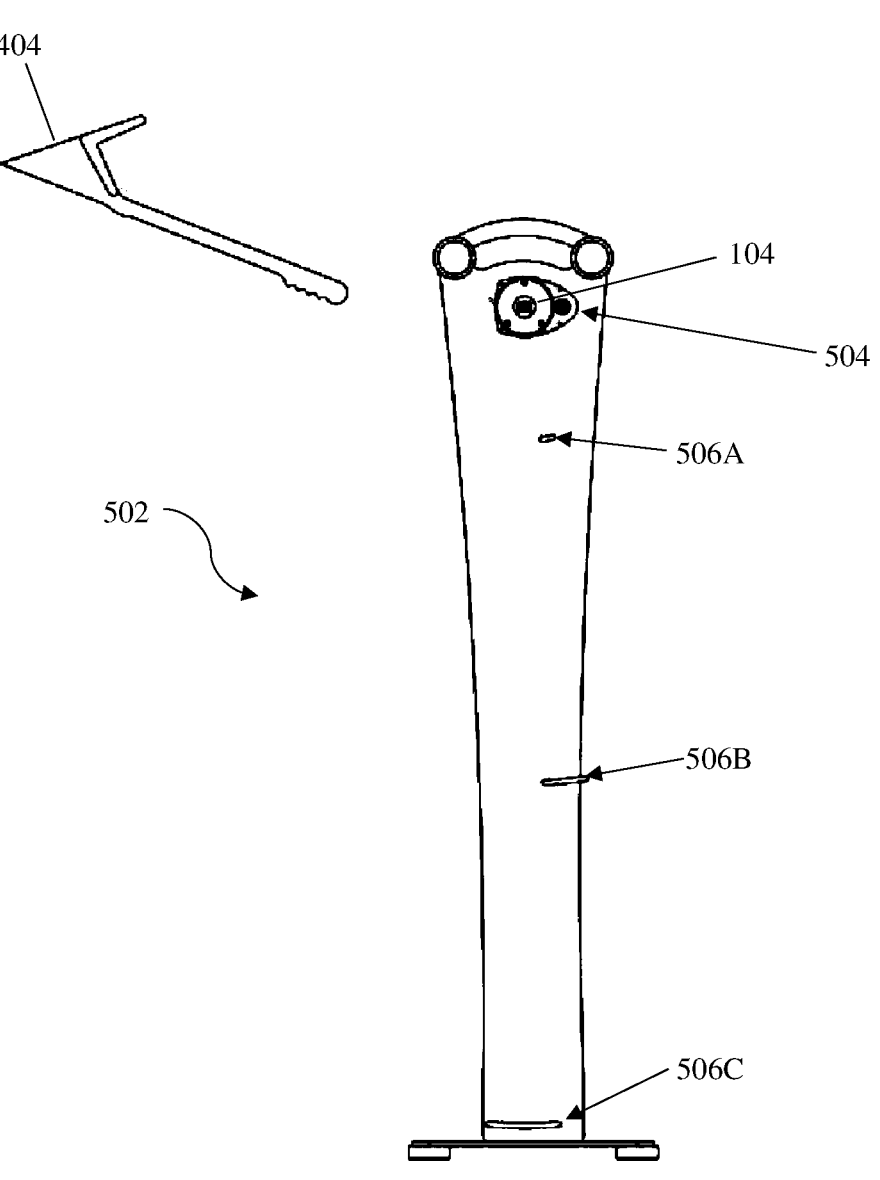
FIG. 5A shows an example of a wireless measurement device calibration stand according to one form of the technology.
Figure 5B:
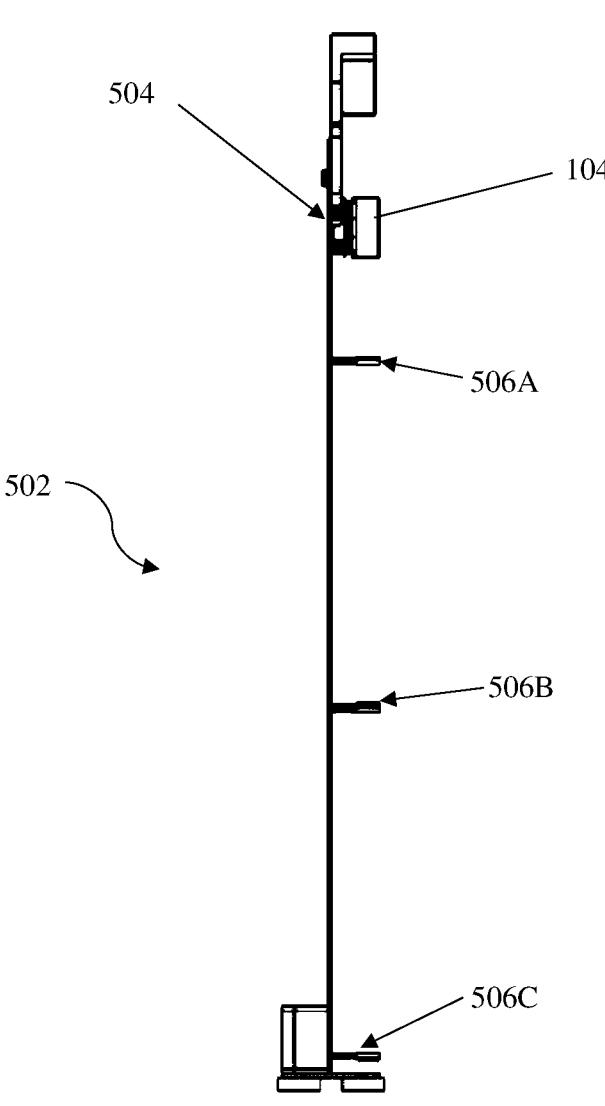
FIG. 5B is a side view of the wireless measurement device calibration stand of FIG. 5A.

In some examples of the technology, it may be advantageous for the distance measuring capabilities of the measuring unit 104 to be calibrated. One way of achieving this is to provide a calibration device 502 as shown in FIGS. 5A and 5B.

The calibration device 502 in this example comprises a fixed mounting location 504 for the measuring unit 104, and one or more fixed measurement points 506A, 506B, 506C at predetermined distances from the fixed mounting location 504.

As the distance from the fixed mounting location 504 to the one or more fixed measurement points 506A, 506B, 506C is known, any difference between the distance measured by the measuring unit 104, and the known distances can be corrected using one or more correction factors. These correction factors may be programmed into the measurement device 104, or alternatively applied to the measurements taken by the measurement device after they are obtained, for example by performing a post-processing of the measurements. For example, the correction factor(s) may be a fixed scalar to account for a percentage-based error. In other examples the correction factor may be a polynomial to account for measurement errors which vary in a complex relationship with distance. In other examples, the correction factors may be linked to any external stimulus including but not limited to temperature, ambient lighting levels, and humidity.

In one example of the technology, the calibration device 502 may be used concurrently while the framing measurements are being performed. For example, the calibration device may be positioned adjacent to, or partially recessed within the framing 102 of the building, using the techniques described herein. In this way the measurements of distance from the measuring unit 104 to the positioning device 404 can be automatically calibrated by comparing the distance measured between the measuring unit 104 and fixed measurement points 506A, 506B, 506C.

6.1.2.1. Angular Adjustment

It should be appreciated that in wireless distance measuring technologies such as those described herein, it may be advantageous to adjust the plane in which the scanning is performed, including the 360 scanning described herein.

Accordingly, FIG. 17 shows one example of the technology in which a scanning device adjustment mechanism 1700 is provided.

It should be appreciated that many wireless distance sensing technologies are invisible to the human eye, and therefore there is a need to provide a device which can indicate where the optical distance sensor 402 is pointing. Accordingly, the adjustment technology includes a laser line projector 1702 which is configured to generate a visible point that corresponds to where the optical distance sensor 402 is pointing.

In some examples, this laser line projector 1702 may be configured to project an arcuate path, or otherwise a full 360-degree projection onto a wall or part of the framing 102.

Accordingly, where the projected line is not accurately representative of the plane in which the plasterboard is to be attached, there is a need to be able to quickly and easily adjust the projection angle of the optical distance sensor 402.

In the example shown in FIG. 17 this adjustment mechanism 1700 comprises an mounting plate 1704 which supports the optical distance sensor and the laser line projector 1702. This mounting plate 1704 is rotatably connected to an adjustment frame 1706, and in use urged towards the adjustment frame 1706, by a biasing mechanism 1708 such as a spring.

The adjustment frame has a concave underside surface 1710, on one side. This concave underside surface 1710 engages with the mounting plate 1704, for example by way of four rollers 1712, spaced evenly around the mounting plate 1704

The mounting plate 1704 is rotatably connected to the adjustment frame 1706 such that the rollers 1712 can selectively be engage with the concave underside surface to adjust the angle of the mounting plate relative to the mounting surface 1714, such as the housing 609 of the measurement device 104.

In some examples of the technology the mounting plate 1704 may comprise a handle 1716 to facilitate rotation of the mounting plate 1704. However, this should not be seen as limiting on the technology, for example, the mounting plate may be rotated by rotating the mounting plate directly, one or more protrusions extending outwardly of the mounting plate 1704, or by rotating the optical distance sensor 402 or laser line projector 1702.

It should be noted that in the arrangement shown in FIG. 17 the laser line projector, may at least be partially obscured by the optical distance sensor 402, and vice versa. Accordingly, in an alternative example of the technology, the laser line projector 1702 may be integrated with, or otherwise positioned above or below the optical distance sensor 402. In another example the laser line projector 1702 may be positioned slightly below the plane of the optical distance sensor, so as to prevent obscuring the optical distance sensor 402. In a yet further example a plurality of laser line projectors 1702 may be used to provide a 360-degree visible projection.

6.1.3. Measuring Unit Control Systems.

Figure 6:
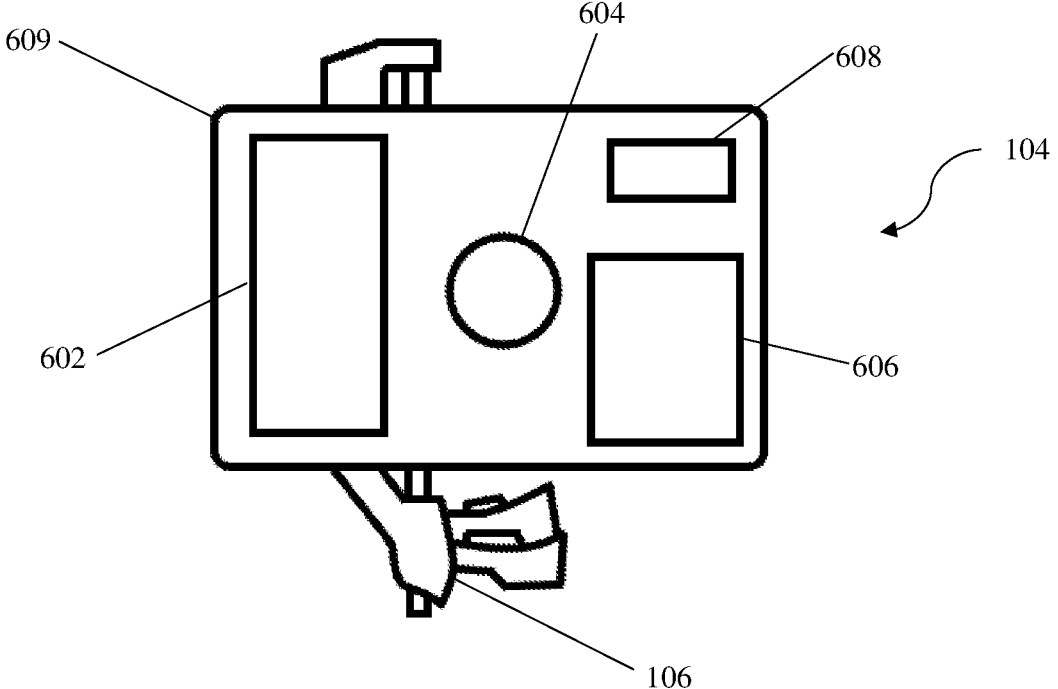
FIG. 6 is a block diagram of the components of a measurement device in accordance with the present technology.

Referring now to FIG. 6 which shows a close-up block diagram view of a measuring device in accordance with the present technology. In the illustrated example, the measuring device comprises:

An attachment mechanism 106 configured to clamp or otherwise attach the measurement device 104 to the framing 102 of a building or structure.

A power source 602, such as a rechargeable battery. It may be advantageous for the power source to be internal to the measurement device 104, as this allows for use in environments (such as a construction site) where external power sources are limited. In some examples of the technology, the power source may be external to the measuring unit, for example the power source may be provided as an external AC or DC power source. In other examples of the technology the measuring unit may be configured to facilitate internal and external power sources 602.

A measurement device 604, such as an optical distance sensor 402 or moveable arm 108 as described herein.

A processor 606 such as a microcontroller, or microprocessor which is configured to control the operation of the measurement device in use.

A communication system 608 configured to facilitate communication of the measuring unit with an external electronic device, such as a phone, computer or wireless controller. For example, the communication system may be configured to communicate with an external electronic device using wireless communications such as Wi-Fi, Bluetooth, RFID, NFC, or any other suitable wireless technology. In some embodiments the communications system allows for communication with a wired device such as the positioning device (in examples such as those shown in FIGS. 1-3), and/or an external device such as a computer using a wired connection such as ethernet, USB, or serial.

In a preferred example of the technology the power source 602, measurement device 604, processor 606 and communication system are housed, at least partially, within a housing 609 such as an enclosure. It may be advantageous for the enclosure to include at least one flat external surface such that it can be securely attached to a flat framing surface using the attachment mechanism as described herein.

In some examples of the technology the measurement device may further comprise a storage means, such as non-volatile storage in the form of flash memory a solid-state disk drive or hard drive. For example, the storage means may be configured to store the calibration factor(s) as well as any point measurement information for later processing.

6.1.4. Smartphone Measurement Systems

According to another aspect of the present technology, a smartphone may be used to automatically determine an outline, or region of framing where plasterboard needs to be attached by taking photographs of the relevant area.

Since building framing generally uses standard dimensions of gauged framing timber, or steel sections, these known, standard dimensions may be used to automatically determine the scale of any features within a photograph, and therefore the overall scale of the photograph and objects therein.

These techniques may also be used to determine the angle at which the photograph was taken relative to the timber framing. For example, by measuring the width of the framing timber/steel at a plurality of points across the image, it may be possible to determine both linear scaling effects, for example due to distance, as well as non-linear scaling effects, such as due to lens distortion in the image.

Furthermore, the images can be analysed to determine locations and dimensions of relevant features such as window framing, door framing, electrical sockets, conduits and pipes. Accordingly, dimensional information regarding the framing can be extracted, including cut areas for plasterboard.

One method of analysing images to determine framing dimensions is to train an artificially intelligent (AI) model to perform semantic segmentation on the image to detect and identify the framing, as well as any other relevant features including electrical sockets, conduits and pipes. For example, the AI models may be trained on any suitable training data including data generated by the measurement device 104 described herein. In other words, the measurement devices described herein can generate labelled training data for the purposes of training the foregoing model with a supervised learning approach. Similarly additional training data may be synthesised using a generative adversarial network (GAN) as should be familiar to those skilled in the art.

For example, the AI model may be configured to perform semantic segmentation using threshold segmentation techniques as should be familiar to those skilled in the art.

Accordingly, one feature of the present invention is a system which is configured to automate the pre-fabrication of plasterboard based on one or more images taken of building framing. For example, the system may comprise a handheld electronic device such as a smartphone, which is used to take one or more photographs of building framing. The system further comprises a processor, configured to process the one or more photographs to identify one or more dimensions of the framing. For example, the processor may be configured to determine one or more dimensions of one or more objects within the photograph by comparing the size of the object in pixels with a known size, such as a measurement in millimetres. Once the dimensions of the one or more objects in the photograph have been identified the processor is configured to generate machine instructions to perform at least one cutting operation on a plasterboard panel, in order to create a plasterboard panel with the appropriate dimensions to match the building framing. The machine instructions can then be forwarded to a computer numerical control (CNC) router configured to perform the at least one cutting operation to generate the cut plasterboard panel.

It should be appreciated that the term "processor", as used herein, may encompass one or more processors unless the context indicates otherwise. For example, all processing may be done by a processor comprised as part of the handheld electronic device, or alternatively part, or all, of the processing may be performed by a remote processor, such as a networked or cloud-based processor, or plurality of remote processors.

In a preferred example, the one or more dimensions of the framing include a width measurement of timber or steel framing in pixels and a comparison of the pixel measurement against a known dimension of the timber or steel framing used in construction.

The machine instructions may include any suitable machine instructions including machine or G-code. Alternatively, the machine instructions may include CAD or CAM data which is in turn processed by another processor to create the machine specific instructions.

It should be appreciated that while the foregoing example relates to the use of an AI model to determine the dimensions of framing from one or more photographs, this should not be seen as limiting on the technology, and determining dimensions may be performed manually, or using any suitable non-machine learning trained algorithms.

6.1.5. Camera Technologies

In a further example of the technology, relevant framing dimensions may be determined using a lidar enabled camera as should be familiar to those skilled in the art. For example, by knowing the distance to various locations on the framing, and the angle to the camera, it is possible to determine the sizing of the framing. This size information can then be converted into cut plasterboard panel sizes, and features such as locations of electrical sockets, conduits and pipes determined in order to generate corresponding cut areas on the plasterboard panel. For example, a user may analyse the lidar data, together with the image data to determine locations of objects of interest such as electrical sockets, conduits and pipes.

In an alternative example, the dimensions of the framing may be determined using photogrammetry techniques such metric photogrammetry techniques such as triangulation and generating stereo pair photographs.

For example one or more photographs of a buildings framing may be taken and photogrammetry techniques performed to determine one or more dimensions of the framing.

6.1.6. Methods of Use

In one example of the technology, framing or plasterboard measurements are conducted via the following steps (performed in any suitable order):

A) The measuring device is attached to the framing 102 of a structure, using the attachment mechanism.

B) The measuring device is powered on and connected to an external device which may include a user's smartphone and/or a positioning device 404 as described herein.

C) Where a positioning device is used, the user positions the positioning device in a first location which relates to a point of interest on the framing.

D) The user requests that a measurement is taken. For example, this can be performed by pressing a button on an application on the user's smartphone, or a button on the positioning device. Note that in some examples of the technology, the measurements are taken automatically, for example the measuring device 104 may be continually scanning.

E) The communication system receives the request, and the processor controls the measurement device in order to obtain one or more measurements. For example, in wireless technologies, the measurement device may conduct a 360 degree sweep to identify the positioning device, and any other surfaces 414 adjacent to the framing. Once identified, the measurement device 604 measures the angle and distance to the positioning device 404 or surfaces 414 in order to identify points on a two-dimensional plane. In wired examples, the processor may measure the angle and extension of the arm to determine the point on a two-dimensional plane.

F) The measurement is then categorised or coded, for example by entering information about the point into a smartphone application. Example categorisation includes that the point relates to:

A point on the outside edge of the framing, and therefore a point on the edge of the plasterboard sheet.

An edge or corner of a window or door frame, and therefore a point in which defines where plasterboard cut-out should be.

The location of a socket such as an electrical socket. For example, the point information may be categorised as the centre of the socket, and suitable dimensions may be selected from a pre-determined drop list or entered manually by the user.

The location of a hole, such as a hole for a conduit, water, gas or plumbing pipe. Categorisation information can include hole diameter.

For example the categorisation in step F) may be performed by selecting a category (such as by using a drop-down list), and adding any necessary information, such as dimensional or rotational information about the measurement.

As each point on the two-dimensional plane is recorded and categorised or coded, the information may be communicated to an electronic device such as a smartphone application, or alternatively uploaded to a remote server (such as an internet-based/cloud server) for processing.

One example of an application for real-time collection and categorisation of point co-ordinates is shown in FIG. 7. In the example shown, framing has been measured using the systems described herein to identify eight points (702A-702H) which define the outline and dimensions of plasterboard required for a build process.

6.2. Plasterboard Mapping

One aspect of the present technology involves systems, methods and devices for translating framing measurements to cut instructions for plasterboard sheets in order to produce cut plasterboard panels.

Throughout the present specification use of "cut plasterboard panel" refers to plasterboard which has been cut, or otherwise marked with dimensions suitable for installation onto framing in a construction site. Reference to "plasterboard sheets" refers to plasterboard sheets before they are marked or cut to a desired shape/size, for example off-the-shelf commercially available plasterboard sheets of standard rectangular dimensions. More general references to "plasterboard" should be understood to be references to the material from which the plasterboard sheets and cut plasterboard panels are constructed from.

It should further be understood, plasterboard is different to most other materials used in the construction industry, or many other industries due to the fact that it is relatively heavy (approximately 7-9 kg/m² for 10 mm thick sheets, and 9-12 kg/m² for 13 mm thick sheets), fragile, and can be marked, dented or damaged easily. Accordingly, measuring, handling, cutting, transporting and processing of plasterboard has specific requirements which are not present for other materials. Accordingly, technologies for example designed for the processing of plywood, or MDF sheets are often not suitable for use in plasterboard applications. Accordingly, the translation of framing measurements to plasterboard cut instructions needs to take into consideration:

How the plasterboard material is to be transported. For example, leaving an end of a plasterboard sheet unsupported can result in damage.

How the plasterboard sheet is handled during installation. For example, where cuts are made in the plasterboard, care must be taken to ensure that the remaining material can support the weight of the sheet without breaking.

The order in which the sheets will be installed onto the construction site.

Accordingly, one aspect of the present technology comprises a method comprising one or more of the following steps:

A) Receiving a plurality of points in a two-dimensional plane, the points relating to one or more of a desired plasterboard outline, and/or regions where material should be removed from a plasterboard sheet to create a cut plasterboard panel.

B) Analysing the plurality of points to determine a desired cut plasterboard panel shape.

C) For each cut plasterboard panel shape, determining whether removal of any material from the shape, or plasterboard sheet would result in an undesirable shape for transporting, handling or installation purposes. For example, when the desired cut plasterboard panel shape comprises a cut that which extends beyond forty percent of the width or length of the sheet (either in the x or y plane) this may be indicative of a undesirable shape as the sheet may be likely to crack when lifted from an edge parallel to the cut.

D) Determining for each cut plasterboard panel shape, what size of plasterboard sheet should the cut plasterboard panel be cut from.

E) Analysing adjacent cut plasterboard panel shapes to determine whether one or more cut plasterboard panel shapes can be provided from a single plasterboard sheet. For example, the analysis may comprise an analysis of each sequential cut plasterboard panel shape until it is determined that the combination of shapes cannot be provided on the largest sheet size (i.e. 1.35 m×6 m. At this point the analysis may determine what the smallest sheet size is which can accommodate the shapes.

F) Generating instructions for cutting plasterboard sheets to create the required cut plasterboard panel shapes.

In step C), determining whether a resulting cut plasterboard panel shape would be undesirable for transporting, handling or installation may comprise an assessment of any one or more of:

Structural integrity due to removed material from the plasterboard sheet or cut plasterboard panel. For example, when a section of plasterboard material is to be removed (for example, for a doorway), the assessment may comprise an analysis of the amount (i.e., area and/or weight) of material either side of the removed area, and whether the remaining structure has the required shear strength to support the weight of the remaining material.

The width of any individual section of the cut plasterboard panel. For example, the analysis may flag a shape as undesirable for transporting, handling or installation if removing material results in a section of cut plasterboard panel with a width of less than 25 mm.

When the desired cut plasterboard panel shape comprises a cut that which extends beyond forty percent of the width or length of the sheet (either in the x or y plane).

In steps D) and E) the cut plasterboard panel shape may be configured to be cut from a plasterboard sheet having a width of 900 mm, 1200 mm or 1350 mm, a thickness of 10 mm or 13 mm, and a length of 1800 mm, 2400 mm, 2700 mm, 3000 mm, 3300 mm, 3600 mm, 4200 mm, 4800 mm, or 6000 mm.

When determining an appropriate plasterboard sheet size to provide the required cut plasterboard panel shapes, consideration may be given to adjacent sheet cut plasterboard panel shapes, in other words the cut plasterboard panel shapes which are installed before or after the plasterboard panel. For example, if adjacent panel shapes can be provided from a single plasterboard sheet, it may be beneficial to do so to reduce loading and unloading overheads, reducing overall costs.

For example, a first cut plasterboard panel shape may have a size of approximately 1200×2650 mm. This cut plasterboard panel could be provided by cutting the appropriate shape from a plasterboard panel having a size of approximately 2700 mm×1200 mm. However, if the preceding, and/or following plasterboard panel shapes can be provided from a single (potentially larger) plasterboard sheet, then it may be more time and cost efficient to cut both plasterboard panel shapes from a larger sheet, such as a 6000 mm×1200 mm sheet.

During the analysis performed under steps D) and E) should it be identified that the desired cuts would result in an undesirable plasterboard panel as described herein, then during step F) the instructions may include partial cut instructions, such as perforations, or partial depth cuts.

For example, FIG. 8A shows an example of a plasterboard panel cut shape 800. In the example shown the external perimeter 802 of the panel shape is indicative of the outer bounds of the plasterboard panel. This may be provided from a complete plasterboard sheet where no external cuts are required, or alternatively the plasterboard panel shape shown may be cut from a larger plasterboard sheet.

An internal cut line 804 is shown symbolically as a series of straight and dotted lines as a way of indicating a partial cut region. For example, in use the internal cut line may comprise a partial depth cut, a sequence of full depth cuts, a scoring line, or any other suitable method of ensuring that the central region 806 of the plasterboard sheet, remains connected to the plasterboard panel cut shape 800 until required. For example, the central region 806 may remain partially connected through the plasterboard stacking, shipping and transportation steps described herein before the central region 806 being removed prior to installation on the building site.

FIG. 8A is an example of a plasterboard panel cut shape 800 wherein if the central region 806 were to be removed from the panel, the resulting shape may be undesirable for shipping, handling or installation. For example, the remaining distance (D) may be calculated as providing insufficient structural integrity and could be at risk of breaking or damage during transport or installation.

Where partial cuts are used, it should be appreciated that the partial cuts may be fully cut on-site by a builder, or alternatively the partially cut section simply broken out of the panel prior to installation. In one example of the technology the instructions may be provided to a builder to manually cut the plasterboard sheets to the required shape. Accordingly, the cut instructions can be used to reduce waste. In another example of the technology described herein, the cut instructions may be provided on a plasterboard sheet. That is to say the cut locations may be cut or otherwise marked on the plasterboard panel. In a yet further example of the technology described herein, the cut instructions may be provided in machine code suitable for cutting a plasterboard panel, for example using a computer numerical control (CNC) router, milling machine, knife or laser. In a yet further example, the cut plasterboard panels may be provided as a product ready for installation at a construction or building site.

FIG. 8B shows a further example of the present technology, wherein a plasterboard cut panel 800 is to be removed from a larger plasterboard sheet 808. In this example, the excess area 810 on the sheet which would otherwise be wasted, may be cut into a series of back-blocks 812 or backing blocks. These back-blocks are typically used to provide support between adjacent plasterboard panels or sheets when installed in ceilings. Accordingly, the excess area 810 of the plasterboard sheet 806 which would otherwise be wasted may be repurposed to provide back-blocks 812. During shipping these back-blocks 812 can further be used to support regions of plasterboard which would otherwise be unsupported, such as between neighbouring sheets of different dimensions.

It should be appreciated that plasterboard sheets 806 have two sides, a first side configured to receive a plaster coating, and a second size configured to attach to the framing. Accordingly, in some examples of the technology, step F) further comprises a step of customising the cut instructions to account for whichever face of the plasterboard sheet 806 is upright. For example, if the second side of the panel is face up in a plasterboard stack, rather than flipping the plasterboard, it may be advantageous for the cut instructions to be mirrored.

Another feature of plasterboard is that some sheets may have a tapered edge to facilitate easier jointing, plastering or skimming. Accordingly, when generating cut instructions, these features may be taken into consideration to ensure that the tapered edges are appropriately positioned when installing the plasterboard on a building site. In other words, the present technology may translate the cut instructions to a plasterboard sheet, by mirroring rotation, or any other suitable transformation to account for any physical properties of the plasterboard sheet.

6.3. Plasterboard Processing Systems

FIGS. 9A and 9B show side and top views of a CNC (computer numerical control) router 900 or milling machine, specifically designed to process plasterboard sheets into cut plasterboard panels. Standard features of CNC routers and milling machines should be familiar to the skilled reader, as well as the control systems for driving same. Accordingly, these features are not described in detail herein.

For sake of efficiency the present technology is described in relation to a CNC router 900, in other words a device wherein the plasterboard is substantially stationary, and the CNC control system moves the cutting bit through X, Y and Z axes to perform the necessary cuts to the plasterboard. It should be appreciated that the technologies described herein may be adapted for use in a CNC milling machine, for example wherein the plasterboard moves along the X and Y axes and the cutting bit is moved through the Z axis to perform the necessary cuts to the plasterboard. However, in spite of the foregoing, the use of a routing system is preferred in the present technology, due to the weight of the plasterboard, and the difficulties in moving the plasterboard at a sufficiently fast speed to enable efficient cutting.

In broad terms, the CNC router 900 comprises:

A cutting bit 902, for example a routing bit configured to remove material from the plasterboard sheet 904. This can be a rotary cutting bit, such as a straight cutting bit, a v-groove cutting bit, or a spiral-flute cutting bit. Alternatively, the cutting bit may be a blade such as a CNC controlled knife.

A spindle 906, configured to control the cutting action of the cutting bit 902. For example, the spindle 906 may include a motor configured to rotate the cutting bit at speeds of up to 40,000 RPM (revolutions per minute). The spindle may further comprise a chuck or collect to facilitate easy insertion and removal of the cutting bit 902.

A gantry 908 along which the spindle 906 moves in use to control the cutting bit 902 position in at least one axis. It should be appreciated that the gantry may be configured to move longitudinally along one or more rails 910 to allow for cutting in an axis at 90 degrees to the movement of the spindle 906 on the gantry 908.

A bed 912 configured to receive the plasterboard sheets 904 in use. In some examples of the technology the bed may be provided with a spoil board which provides a sacrificial surface on which the plasterboard sits during the cutting process.

A CNC controller 914 configured to control the operation of the CNC router 900. The CNC controller receives co-ordinate cut instructions in the form of G-code from the plasterboard mapping systems described herein.

One aspect of the present technology is that the CNC router 900 needs to be configured in a way that makes it practical for use in the processing of plasterboard materials. In this regard, the CNC router can be configured to have:

A spindle 906 travel speed of at least 30 cm per second. As plasterboard is a relatively cheap building material, in order for the pre-processing of plasterboard sheets to be economically viable, the CNC router must be able to cut the plasterboard sheet quickly and effectively.

A cutting bed 912 measuring at least 2.4 m long by 1.2 m wide. When processing full-sized sheets of plasterboard for construction projects, this bed should be at least 6 m long by 1.2 m wide.

A spindle 906 speed of at least 25,000 RPM, this ensures that the high-spindle movement speeds can be achieved without damaging the cutting bit.

A moveable bed 912 which allows for sheets of plasterboard to be moved in and out of the cutting area without sliding or lifting. As plasterboard is a paper-backed composite material, sliding the plasterboard sheets can result in damage to the paper layer such as scratches, denting and tearing. Similarly lifting plasterboard sheets can result in cracking or splitting of the sheet.

The ability to load, cut and unload plasterboard simultaneously to reduce overall processing times below one and a half minutes per plasterboard sheet. As plasterboard is difficult to load due to flexibility, weight and paper layer surface.

A cutting flute designed for plasterboard of compression type designed for specific angles, to cut the upper and lower paper layers cleanly. For example, a compression mill cutting bit having a spiral angle of approximately 60 degrees, and being designed to provide a 14 mm cut, this helps to ensure that the backing paper on both sides of a 13 mm plasterboard sheet can be cut.

A second cutting head and gantry system at the other end of the CNC due to reduce travel time of the cutter on long 6 m sheets that may only require two cuts at either end to trim the length.

It should be appreciated that technologies which rely on the sliding of material are not suitable for plasterboard processing. Accordingly, conventional devices and techniques which require a "push bar" to slide material through a CNC router, cannot be used for plasterboard processing without potentially damaging the paper layers on either side of the sheet.

Referring to FIGS. 9B and 9C another feature of the technology is the use of rollers 916 on one or more sides of the bed 912 to ensure that the plasterboard sheet remains centrally located on the bed 912. In the example shown the rollers 916 are positioned on both sides of the bed. These rollers are preferably made from sacrificial material, or spoil board, such that if the rollers are damaged during an edge cut of the plasterboard sheet, they are easy, and cost-effective to replace.

Each roller 916 comprises a central pivot 918 such as a pin or bolt. This central pivot 918 may act as a quick release mechanism in use in order to facilitate quick release of the rollers when they require replacement. The central pivot 918 may be inserted through one or a series of apertures 920 positioned in an eccentric spiral pattern, to allow the positioning of the roller relative to the plasterboard sheet to be adjusted. In some examples of the technology, the position of the apertures 920 may be adjusted by moving the section 921 of the bed 912 which houses the apertures 920, for example by rotation. Once an appropriate position for the apertures 920 has been set, the section 921, may be secured in place using any suitable fastening system, including but not limited to clamps, screws, bolts and adhesives.

Another feature of the present technology shown in FIGS. 9D and 9E is the use of stops 922 to allow for a plurality of sheet dimensions to be accommodated on a single bed 912. For example, the stops may be provided at predefined locations along the length of the bed 912 such that, irrespective of the plasterboard sheet length used, the bed has a fixed reference point for the starting corner of each sheet.

For example, the bed may be provided with a spoil board 924 measuring at least 6 m long by 1.2 m wide (this may be provided as one or more individual sheets of material). At a first end of the spoil board, a series of fixed stops 926 may be provided which abut the plasterboard sheet (not shown) in use. In the illustrated example, the stops 922 extend upwardly through holes in the spoil board so as to provide an interfering member which prevents the plasterboard sheet from sliding in use.

Along the length of the bed, a series of stops 922 are positioned at common lengths from the fixed stops 926. For example, at 2400 mm, 2700 mm, 3000 mm, 3300 mm, 3600 mm, 4200 mm, 4800 mm, and/or 6000 mm. These stops 922 are preferably pivotally attached to the bed, such that when a plasterboard sheet is used which covers some of the stops, the covered stops recess downwardly and therefore allows the plasterboard sheet to sit flat on the spoil board 924.

For example, when a 3000 mm length sheet of plasterboard is used, the plasterboard sheet may abut the fixed stops 926 at a first end and sit overtop stops 922 for 2400 mm and/or 2700 mm sheets. A second end of the plasterboard abuts stops for 3000 mm sheets. Opposing sides of the plasterboard sheet may abut rollers 916 as described herein. Accordingly, the bed 912 may be configured to securely retain multiple length plasterboard sheets automatically, and without adjustment or reconfiguration.

FIG. 9E shows a close-up view of a stop 922 in accordance with the present technology. A first end 928 of the stop 922 is provided with a resilient member 930 which urges the second end 932 of the stop 922 upwardly. For example, the resilient member 930 may comprise a spring such as a sprung hinge.

The second end 932 of the stop 922 further comprises a roller 934 and pin 936 configured such that the roller 934 can rotate about the pin 936 in use. The pin further acts as a quick release to allow for replacement of the roller if it becomes damaged in use. In use the curved face 938 of the roller 934 bears against the underside of a plasterboard sheet. The roller 934 allows the plasterboard sheet to be slid in place on the bed while reducing the likelihood of the paper backing layer on the plasterboard sheet tearing or otherwise becoming marked.

The side face 940 of the roller 934 in use prevents the plasterboard sheet from sliding longitudinally along the bed 912.

6.4. Software Systems

One aspect of the present technology uses machine interpretable software implemented on a processor for the conversion of framing dimensions to cutting instruction readable by a CNC controller.

For example, according to one example of the technology there is a system for converting framing dimensions to cutting instructions readable by a CNC controller, the system comprising: at least one processor; and a computer readable storage medium having computer readable program code embodied therewith and executable by the at least one processor, the computer readable program code comprising:

computer readable program code that receives one or more framing dimensions;

computer readable program code that determines one or more outline shapes from the framing dimensions;

computer readable program code that arranges the outline shapes on standard plasterboard sheet sizes to provide plasterboard sheet cut locations, and computer readable program code that converts the plasterboard sheet cut locations into machine readable cutting co-ordinates and cutting bit path instructions.

In some examples of the technology the computer readable program code may be configured to convert the plasterboard sheet cut locations into a first set of cutting bit path instructions for a first CNC router 900A, and a second set of cutting bit path instructions for a second CNC router 900B, as described herein.

In one example of the technology, the system comprises is a generic computer implemented system, as should be familiar to those skilled in the art. The system including processing facilities represented by processors, memory, and other components typically present in such computing environments.

The memory may be of any suitable means known in the art, capable of storing information in a manner accessible by the processors, including a computer-readable medium, or other medium that stores data that may be read with the aid of an electronic device. The processors may be any suitable device known to a person skilled in the art. The computer readable program code may include any set of instructions suitable for execution by the processors. For example, the computer readable program code may be stored as computer code on the computer-readable medium. The computer readable program code may be stored in any suitable computer language or format.

Data, such as the framing dimension data may be retrieved, stored or modified by processors in accordance with the computer readable program code. The data may also be formatted in any suitable computer readable format.

While the foregoing section relates to the use of software, this should not be seen as limiting on the scope of the technology, and the framing dimensions may be converted cutting instructions manually by a skilled user.

Accordingly, the present technology provides new and improved methods of translating framing measurements to cut instructions which accounts for factors not previously considered in the plasterboard manufacturing industry including:

How framing information can be combined in a practical way to reduce the total handling of plasterboard sheets. I.e. by combining multiple plasterboard panel dimensions on a single plasterboard sheet.

Accounting for specific features of the plasterboard material such as which face of the plasterboard is face-up in a stack on a routing bed. Similarly, ensuring that plasterboard features such as tapered edges are maintained in the correct orientation during the cutting process.

Repurposing waste plasterboard material to provide spacers and back blocks which provide reinforcement behind plasterboard joints, particularly in ceiling installations.

Optimising the cutting order such that the cut plasterboard panels are palletised for shipping on a per room basis, and further providing cutting orders which can account for things such as which rooms require the longest plasterboard panels, as these can be delivered to site first.

Considering the structural integrity of the cut plasterboard panels, and taking steps to ensure that the cut plasterboard panels are not damaged during transport. For example, by creating partial cuts to prevent too much structural material from being removed from the panel.

Considering handling constraints such as where the cut plasterboard panels will be lifted from and, and how the cut information can be varied to account for these handling constraints.

Order information, and stacking instructions to ensure that the cut plasterboard panels are available in a palletised form, in such a way that they can be removed from the pallet in the order of installation.

Generation of stacking instructions and procedures which are designed to reduce the potential for damage to the plasterboard panels.

Accordingly, the present technology can provide improved systems, methods and devices which enable the delivery and provision of cut plasterboard panels to building sites irrespective of what code is used, or even if software is used at all.

Regardless of it should be appreciated that the systems, methods and devices described herein may be performed more quickly and efficiently by taking advantage of automated software processing systems as described herein.

6.5. Plasterboard Panel Production

Another feature of the present technology is providing systems and methods that enable, rapid, efficient and in some cases completely automated production of cut plasterboard panels.

FIG. 10A shows a first example of a plasterboard panel production system 1000 which streamlines the process of loading plasterboard sheets and unloading cut plasterboard panels from a CNC router 900. As shown the plasterboard panel production system 1000 comprises:

A sliding bed 1002, which is configured to move between three areas:

A loading area 1004, in which plasterboard sheets are loaded onto the sliding bed.

A routing area 1006, where the CNC router cuts appropriate panel shapes into the plasterboard sheet; and An unloading area 1008, in which the cut plasterboard panels are removed from the production system 1000.

A CNC router 900, as described herein.

Each of the loading 1004, routing 1006 and unloading 1008 areas may be provided with loading, routing and unloading beds, that is to say structures configured to receive the sliding bed 1002. In other examples of the technology, such as those shown in FIG. 10D, the sliding bed may simply be configured to travel between the loading 1004, routing 1006 and unloading 1008 areas, for example by rails.

It should also be appreciated that the sliding bed 1002 may include any of the features of the beds described herein.

One method of manufacturing cut plasterboard panels comprises:

A) loading a plasterboard sheet onto a sliding bed 1002 in a loading area.

B) moving the sliding bed 1002 along a first track or rail 1010 into a routing area 1006, wherein the plasterboard sheet is routed into cut plasterboard panel(s).

C) moving the sliding bed 1002 into an unloading area 1008, where the cut plasterboard panel(s) are removed.

D) moving the empty sliding bed 1002 back through the routing area 1006, on a second track or rail 1012 which is at a different height to the first track 1010.

E) Returning the sliding bed to position A to restart the process.

The second track 1012 may run underneath the first track 1010, and in this way it is possible for the sliding bed 1002 to be moved under another sliding bed (not shown) which is present on the first track 1010. In this way, up to three sliding beds may be used simultaneously. For example, step F in FIG. 10A shows an example of the technology where three sliding beds are used 1002A, 1002B, 1002C. In this example, loading, routing and unloading may be performed simultaneously.

Once the cut plasterboard panel(s) have been unloaded, sliding bed 1002C may be positioned under sliding bed 1002B in the routing area. This allows the sliding bed 1002B to be moved to the unloading area 1008 as soon as the routing process is complete. Sliding bed 1002A may then be slid into the routing area 1006, and the sliding bed 1002C on the second track 1012 can be returned to the loading area 1004 for loading of a new plasterboard sheet.

It should be appreciated that the use of tracks or rails 1010, 1012 should not be limited to examples where the tracks or rails run above or below one another. Rather the technology described herein accommodates any number of multiple track configurations. Including trackless designs, and tracks which run at angles relative to one another.

For example, FIGS. 10B and 10C shows an example of a CNC router 900 in which a first track 1010 runs adjacent to a second track 1012. In this example the first track 1010 and the second track 1012 are at substantially the same height relative to one another. Accordingly, a first sliding bed 1002A can be configured to slide along the first track 1010 while a second sliding bed 1002B may be configured to slide along a second track. The spindle may select which bed is being routed by simply controlling the Z-axis (vertical axis) positioning. This may be made completely transparent to the 914 CNC controller by zeroing the Z-axis prior to each cut. For example, by using a limit switch, contact probe, or any other zeroing technique known to those skilled in the art.

With reference to FIG. 10C it can be seen that, in this example, the first sliding bed 1002A runs on the outer track or rails 1010, and the second sliding bed 1002B runs on the inner track or rails 1012. In use the first sliding bed 1002A can be slid over the top of the second sliding bed. For example, the first sliding bed 1002A may be loaded with a plasterboard sheet, in the loading area 1004. Once loaded the first sliding bed 1002A may be slid into the routing area 1006 for CNC routing. At the same time, the second sliding bed 1002B may be moved into the loading area and loaded 1004. Once loaded, (either before or after the first sliding bed has finished routing) the second sliding bed 1002B may be moved into the routing area 1006. When the plasterboard sheet on the first sliding bed 1002A has been routed, the first sliding bed may be moved to the unloading area 1008, and the cut plasterboard panels removed. Once plasterboard sheet on the second sliding bed has finished being routed, it may be moved to the unloading area, for example, underneath the first sliding bed 1002A, and the first sliding bed 1002A, may be returned to the loading area 1004 for loading once more.

A further alternative example of a plasterboard panel production system is shown in FIG. 10D. In this example the sliding bed 1002 may be moved through the production system, from the loading area 1004, to the routing area 1006 and unloading area 1008. However, when returning the sliding bed 1002 back to the loading area, the sliding bed may be tilted onto a second set of track or rails 1012, which runs at an angle to the first set of track or rails 1010, such that the first set of track or rails 1010 can move the sliding bed past the routing area 1006, without passing through the routing area 1006. Accordingly, the present system allows for any number of sliding beds 1002 to coexist in the production system without interfering with one another. Titling the sliding bed may further aid to facilitate removal of the cut plasterboard panel(s) from the sliding bed 1002 and/or loading of the plasterboard sheet.

While the foregoing examples each use a plurality of tracks or rails 1010, 1012 to improve the throughput of plasterboard processing systems, this should not be seen as limiting on the technology. For example, the sliding bed 1002 may be removed from the rails 1010 in the unloading area and placed back onto the rails 1010 in the loading area for example, either manually or using a gantry, crane or similar apparatus.

Similarly, while the foregoing examples each use sliding beds to facilitate movement of plasterboard through a processing system, this should not be seen as limiting on the technology. In a further example of the technology shown in FIG. 10E, plasterboard may be moved through loading 1004, routing 1006 and unloading 1008 areas using a conveyor system 1014. It should be appreciated that in this example, the features described in relation to the sliding bed 1002 may instead be provided by the conveyor system such as the stops 922, fixed stops 926, spoil boards 924 and rollers (not shown).

In particular, it can be important for the conveyor to include spoil boards 924 on their top surface to prevent the cutting bit from damaging the underlying conveyor system in use.

Accordingly, the plasterboard sheet may be loaded in the loading area 1004 and moved through to the routing area 1006 by the conveyor 1014. The conveyor may stop temporarily while the plasterboard is routed, or alternatively, the conveyor may continue to move the plasterboard while routing occurs, this movement can be compensated for by the CNC controller 914, or alternatively the router 900 may move concurrently with the conveyor such that the plasterboard is stationary relative to the router during routing. The conveyor then moves the cut plasterboard panel(s) to the unloading area 1008 as per prior examples of the technology.

The foregoing examples provide examples of plasterboard processing systems, including numerous ways in which a return path may be provided for sliding beds in a plasterboard processing system.

The foregoing should not be seen as limiting, and further examples should be apparent to the skilled reader.

The reader should also appreciate, that in order for the present technology to process plasterboard sheets which are up to 6 m long, the associated loading 1004, routing 1006 and unloading 1008 areas of the production system must be similarly long. Accordingly, the overall length of the production system may be in excess of 18 metres long.

It should further be appreciated that plasterboard cutting does not require as high level of precision, as many other routing and milling devices available on the market. However, it must be able to produce the cut plasterboard panels quickly and efficiently. Accordingly, the systems described herein are configured for maximum throughput, and in order to accommodate the specific needs of the heavy, fragile plasterboard sheets.

In one example of the technology the plasterboard production systems may be manufactured from routed plywood, MDF or aluminium extrusions. This allows the production systems to be manufactured and assembled quickly and easily, at a lower cost and with lower overall weight when compared to the traditional steel counterparts.

Furthermore, use of lower-cost materials together with the design of the production system to incorporate sacrificial materials such as spoil boards, allows the present technology to operate at much higher speeds, without needing to worry about the routing bit being damaged by contacting steel components, such as material clamps, while routing.

6.5.1. Multi-Headed CNC Routing

As plasterboard sheet throughput is an important consideration in producing cost-effective cut plasterboard panels, some examples of the present technology provide features to further improve the production efficiency of cut plasterboard panels.

One example of this is shown in FIG. 9F in which a plurality of CNC routers 900A, 900B are provided in the routing area 1006 of a plasterboard panel production system. Each CNC router 900A, 900B may be configured to process the plasterboard sheet in different regions of the routing area, such as a first half of the routing area and a second half of the routing area.

In the illustrated example a single CNC controller 914 is provided which controls the operation of the CNC routers 900A, 900B. However, this should not be seen as limiting and any number of CNC controllers may be used such as one per CNC router 900. In use the CNC routers, may be configured to process the plasterboard sheet in the same direction, i.e. within their respective routing areas starting from the end which is closest to the first end of the plasterboard sheet. This helps to ensure that the CNC routers are generally working in the same direction (rather than towards each other) which can help to ensure that the first CNC router 900A does not collide with the second CNC router 900B.

It should be appreciated that the gantry 918A of the first CNC router 900A, and or the gantry of the second CNC router 900B may be provided with limit switches to thereby prevent collision of the first CNC router 900A with the second CNC router 900B.

In should also be appreciated that in some examples of the technology, the area in which the first CNC router 900A operates may need to overlap with the area in which the second CNC router operates. For example, to allow for the section of the plasterboard sheet between the two areas to be processed.

Depending on the length of plasterboard sheet which is inserted into the routing area, the CNC controller may automatically adjust the areas in which the first CNC router 900A, and second CNC router 900B operate, together with the corresponding machine instructions for each router, so as to balance the amount of time each router spends cutting the plasterboard sheet.

6.5.2. Panel Instructions

At the end of the manufacturing process, the systems and methods described herein may provide cut plasterboard panels that are produced in a logical order based on the measuring sequence of the building framing 102. It may therefore be advantageous for this panel sequence to be kept consistent for easy on-site installation.

Accordingly, a further aspect of the technology is the automated generation of instructions which may include:

Instructions as to which parts of the cut plasterboard panel(s) are to be kept for installation on the building site. For example, the instructions may include information as to what sections of plasterboard panel are to be connected to the framing, which sections are off-cuts or waste, as well as identifying material which can be used for backing blocks.

Instructions on how the cut plasterboard panel(s) should be stacked or palletised for shipping. Including where supports should be placed based on the geometry of the foregoing, cut plasterboard panels, and the following cut plasterboard panels. This can also include identification of supports that have been cut from waste material on the plasterboard sheet.

How the cut plasterboard panels should be installed on the building site, including how they should be positioned relative to other cut plasterboard panels.

Meta information, including the project name, room, wall number, order of installation, install direction i.e clockwise or anticlockwise, sheet number and/or a diagram showing the layout of multiple cut plasterboard panels on each wall.

Where partial cuts are made, where the partially cut material should be fully cut or otherwise removed prior to installation.

For example, FIG. 16, shows one example of a framing instruction sheet 1600, in accordance with the present technology. As shown, the instruction sheet can comprise any one or more of:

Project identifying information such as the company logo, project name, and unique identifier for the project;

Descriptors including the Room name, type installation direction, and orientation, for example relative to the main doorway.

Numbers representing each of the cut plasterboard panels provided by the technologies described herein.

In one example of the technology, the processing systems comprise a printer, configured to print the instructions. For example, the printer may be provided adjacent to the unloading area 1008, such that the instructions are available to the people unloading and stacking the cut plasterboard panels.

In another example of the technology, the printer may be configured to print on self-adhesive labels which are affixed to the cut plasterboard panels, so that the instructions are provided directly on the cut plasterboard panels. In another example the CNC router, may comprise a CNC print head which is configured to print instructions directly onto the plasterboard sheets during routing.

6.6. Plasterboard Handling Technologies

Once the plasterboard sheet has been cut into plasterboard panels, it is necessary to transport these cut plasterboard panels to the building site for installation. Accordingly, one feature of the present technology is to provide lifting hardware specifically designed to meet the requirements of plasterboard materials.

FIGS. 11A-11D show one example of a plasterboard lifting frame 1100 designed to life one or more sheets of plasterboard 904 from a stack or pallet. The lifting frame 1100 includes two longitudinal rails 1102 which interconnected by a plurality of connecting structures. The connecting structures 1104, extend between the longitudinal rails, for example at 90 degrees from the longitudinal rails, however this should not be seen as limiting on the technology, and any shape of connecting structure may be used.

The longitudinal rails 1102 are preferably spaced slightly wider than the width of the plasterboard sheet 904. For example, between approximately 1250 mm and 1300 mm. Extending downwardly from the longitudinal rails 1102 are discs 1106 which are rotationally connected to the lifting frame 1100. In some examples of the technology such as those shown in FIGS. 11A-11D, the discs are rotationally attached to the lifting frame 1100 by a connecting member 1108. The spacing between the connecting member and the disc may define a maximum width of plasterboard (or number of sheets of plasterboard) that can be carried simultaneously.

In use these discs 1106 are configured to be inserted under the longitudinal sides of one or more sheets of plasterboard material so as to provide a bearing surface which facilitates lifting of the plasterboard sheet 904.

In some situations, adjacent sheets of plasterboard and joined with a paper edge, accordingly one feature of the discs is the use of a sharp edge to facilitate splitting adjacent boards in a stack as well as potentially puncturing the paper edge to aid in separating the sheets.

It should be appreciated that the lifting frame may be configured to attach to a gantry or crane using methods known in the art, including by using chains or ropes.

In use the plasterboard sheet 904 may be slid in and out of the lifting frame along the top surface of the discs 904. As the discs are rotationally connected to the frame, the rotation of the discs can help to ensure that there is a relatively low amount of friction between the plasterboard sheet 904 and the lifting frame, which could otherwise result in damage to the plasterboard sheet 904 or the backing paper thereof.

In another example of the technology, the connecting member 1108, may be pivotally connected to the lifting frame 1100, for example by using a hinge. In this way the connecting member can be pivoted inwardly to pick up one of the plasterboard sheets 904, and outwardly to release the sheet 904.

6.6.1. Vacuum Lifting Technologies

FIG. 12 shows a further example of a lifting frame 1100 which comprises a vacuum lifting system consisting of a plurality of vacuum suction pads 1202. In use the lifting frame may carry a pneumatic conduit through, or otherwise attached to the longitudinal rails 1102 and connecting structures 1104 in order to provide a vacuum lifting pressure to the suction pads 1202. For example a vacuum pump may be pneumatically connected to the lifting frame through one or more pneumatic connections. The vacuum pressure may be selectively provided to the one or more suction pads 1202 to enable lifting of the lifting frame and plasterboard sheet 904 or cut plasterboard panel 1204. For example, by using one or more valves the pneumatic connection to one or more of the suction pads may be turned off and on.

It should be appreciated that, in this example, the longitudinal rails may be preferably spaced apart less than the width of a plasterboard sheet, for example 750 mm apart. This ensures that the suction pads 1202 may be located on the face of the plasterboard sheet 904/cut plasterboard panels 1204.

Where the vacuum lifting system is used to load plasterboard sheets 904 into the loading area 1004 of a processing system as described herein, all suction pads which contact the plasterboard sheet may be enabled. However, where the vacuum lifting system is used to unload cut plasterboard panels from the unloading area 1108 of a production system as described herein, any suction pads which are positioned over a cut, may result in a loss of or reduction in vacuum pressure in the lifting system.

Accordingly, in one example of the technology, the CNC router is programmed to have specific areas in which full cuts should not be made. For example, any location in which a vacuum suction pad will be placed during lifting. The CNC router may also have specific areas in which partial cuts should not be made. For example, while partial cuts can be made underneath the suction pads, any partial cut which extends from under the suction pad, outwardly of the suction pad may result in vacuum pressure loss and should therefore be avoided.

In another example of the technology, the translation of framing measurements to plasterboard cut instructions as described herein may be adjusted to account for the vacuum suction pad locations. For example, cut lines may be translated on the sheet in a way which optimally avoids the suction pads where possible.

In a further example of the technology, the vacuum lifting frame may be configured to automatically disable suction for one or more suction pads which are positioned over a full-depth cut, or span across a partial-depth cut. For example, the vacuum control system may be provided with cut information and use the cut information to automatically determine which vacuum suction pads should be enabled.

In a further example of the technology, the vacuum lifting system may be moved automatically to avoid cut lines in the plasterboard panels. For example as the locations of the cut lines are known the vacuum lifting system can be moved in an X or Y axis so as to optimise the placement of the vacuum lifting system such that the greatest number of vacuum suction pads are positioned away from any cut lines.

6.6.2. Transportation Frames

Another feature of the present technology is to provide transporting frames 1300 or dollies to help with transportation of the plasterboard sheets 904 or cut plasterboard panels 1204 without damaging them, for example between the processing system and a pallet during the loading and or unloading of the processing system.

FIGS. 13A-13D show a transporting frame comprising a back support 1302, and a base 1304. In use the plasterboard sheets 904 or cut plasterboard panels 1204 are placed onto the transporting frame 1300 with the edge of the sheet abutting the base 1304. The back support 1302 and base 1304 are angled back slightly (such as between 5 and 15 degrees with respect to vertical) to reduce the likelihood of the plasterboard tipping and falling off the frame during transport.

The transporting frame 1300 may further comprise a latch 1306 or locking mechanism to prevent the plasterboard from tipping forward and falling from the transporting frame, particularly when being transported over unlevel ground.

Each transporting frame 1300 has legs 1308 with wheels 1310 to allow for smooth movement of the frame. The legs of the transporting frame 1300 can also include channels 1312 which in use are configured to receive the forks of a forklift to enable easier transporting.

In some examples of the technology the transporting frame may also comprise an aperture or hook 1314 which is centrally positioned and designed to facilitate lifting of the transporting frame 1300 by a crane, or gantry. This hook may be attached to a lifting frame 1316 which is releasable from the transporting frame such that plasterboard sheets or cut plasterboard panels can be one and off the transporting frames using forklifts, cranes, or gantries etc.

FIGS. 13C and 13D show examples of transporting frame 1300 construction which allows for tight nesting of the transporting frames 1300 with one another, thereby reducing the amount of area required for storage. In other words, the transporting frames 1300, are designed with a narrow side profile, with only the legs extending substantially outwardly of the back support 1302 and base 1304. Accordingly, to accommodate the legs 1308 when stacking, an open area (A) is provided between, and on either side of the legs, so as to allow the legs of another transporting frame 1300 to be positioned in between during stacking.

In one example of the technology the transporting frames may be loaded with a plurality of plasterboard sheets and transported directly from the manufacturing site to the building site for installation. In other examples, the transporting frames may simply be used to transport plasterboard sheets to the loading area and cut plasterboard panels from the unloading area.

6.7. Plasterboard Stacking Methods and Systems

FIG. 14 shows an exemplary method of stacking cut plasterboard panels in accordance with the present technology.

In use a cut plasterboard stack 1400A is created by placing a first cut plasterboard panel 1402 onto a pallet 1404. The first sheet is preferably a long sheet of plasterboard as this may help to prevent smaller cut plasterboard panels from being damaged or falling through any gaps in the pallet. For example, the systems described herein can include information about which rooms the plasterboard panels relate to, or otherwise determine a plasterboard panel stacking order based on the size of the plasterboard measured panels. For example, it may be advantageous to process rooms with less complex cut shapes, such as a garage, or warehouse before processing rooms with more complex cut shapes such as bathrooms, and wardrobes.

Within each plasterboard stack however it is important that the cut plasterboard panels are provided in the order of installation.

Preferably the instructions on how to effectively stack the cut plasterboard panels is provided by way of an electronic display configured to present the stacking information. For example, a television or computer monitor.

The next cut plasterboard panel 1406 is positioned on top of the first plasterboard panel 1402, taking into consideration the largest dimensions of plasterboard sheets which are still coming and will require stacking. In other words, the finished stack should always have a pyramid shaped structure, irrespective of the size ordering of the sheets within the stack.

Accordingly, where the second cut plasterboard panel is shorter than any subsequent plasterboard panel, spacers 1408 may be provided to ensure the ends of the subsequent sheets are supported. These spacers 1408 may be cut from scrap material/offcuts of the manufacturing process, or otherwise comprise the backing blocks described herein.

The next cut plasterboard panel 1410 is preferably positioned in the opposite orientation to the previous. This ensures that any spacers 1408 are covered by a larger sheet of plasterboard material, helping to secure them in place.

The process is repeated for subsequent sheets of plasterboard material until the stack reaches the desired size. For example, a stack may be limited by weight, height, or may be packed for lining specific rooms on a building site. Accordingly, one or more pallets of stacked plasterboard material may be provided for any given room on a construction site to allow multiple rooms to be lined simultaneously.

Where very short plasterboard panels are provided in the stack, it may be advantageous to include a plurality of spacers 1408 to ensure that each plasterboard panel is fully supported.

A further aspect of the stacking methodology is that each of the spaces should be positioned such that they extend at least 50 mm beyond the ends of the preceding plasterboard panel. This ensures that, should the plasterboard stack be bumped during transport the plasterboard panels remain protected, and the spacers can absorb the bulk of the impact force.

In one example of the technology there is a pallet 1404 with a length of 6000 mm. The first plasterboard panel measures only 2000 mm, but the information indicates that a later sheet in the stack is 4000 mm long. Accordingly, the systems described herein will automatically generate packing instructions to ensure that the pyramid structure is maintained. For example, the instructions will tell the packer to place the 2000 mm sheet at 1000 mm from a first edge of the pallet, such that the largest 4000 mm sheet will be central with a 1000 mm gap on either edge of the pallet. The instructions will further recommend placing a spacer at 5050 mm from the first edge. This leaves 950 mm to the second edge of the pallet, such that when the longest 4000 mm sheet is placed the spacer extends 50 mm past the end of the sheet.

These instructions can be as simple as "Sheet 1000 mm", and "Spacer 5050 mm".

Accordingly, the exemplary sequence 1400A-1400G ensure that the cut plasterboard panels can be shipped and transported safely and securely.

6.8. Systems for Providing End-to-End Plasterboard Customisation and Ordering

FIG. 15 shows one example of how the foregoing systems, methods and devices may be combined to provide a complete plasterboard processing facility 1500.

The processing facility comprises one or more stacks of plasterboard sheets 1502 of varying sizes 1502A, 1502B, 1502C, 1502D, 1502E. The plasterboard sheets 1502 are transported one at a time to a loading area 1004 on a plasterboard panel production system 1000. For example, an appropriate plasterboard sheet 1502 size may be determined by analysing the cut information as described herein.

The plasterboard sheet 1502 may be transported using any of the methods and devices described herein, however in the illustrated example a gantry 1504 is provided with a lifting frame 1506 such as a vacuum lifting frame as described herein.

The plasterboard sheet 1502 may be placed directly onto the plasterboard panel production system 1000 or onto a sliding bed 1002 as described herein. The plasterboard panel is then moved to the routing area 1006, where the cut information is used by a CNC controller to form one or more cuts in the plasterboard sheet, to provide one or more cut plasterboard panels.

Once the plasterboard panels have been appropriately cut, they are moved through to an unloading area 1008 where the plasterboard panels are removed from the unloading area, and stacked in a palletising area 1508, such as using a further gantry 1504 and lifting frame 1506 as described herein.

The foregoing example should not be seen as limiting on the technology. For example, the gantry and lifting frames described herein may be replaced by workers who manually move the plasterboard sheets. Similarly, a plurality of plasterboard panel production systems 1000 may be provided to allow parallel processing of plasterboard sheets.

In light of the foregoing, it should be appreciated that the systems and methods described herein have a number of advantages over known building plasterboard cutting systems and methods. By using digital measuring and CNC cutting installation time of the plasterboard can be reduced by up to 1-3 days. This is in two parts, the first is a saving in time to cut the sheets removing 'triple measuring' (i.e., measuring the framing, the plasterboard sheet, and transferring the framing measurements to the sheet for cutting) and manual cutting. The second is the ability to cut the sheet while waiting for final regulatory inspections of the walls/ceilings so when approval is given the build is 1-3 days ahead of a traditional schedule. The other benefit of the method is the reduction of waste. By using software to determine sheet cutting paths and layouts sheet usage can be optimised, reducing waste by as much as 30%. By cutting offsite in a factory this waste can more easily be recycled especially if the cutting is done at the end of a plasterboard production plant. This saves a large amount of cost in waste logistics and waste disposal. Furthermore, all of the apparatus used in the method are much cheaper to produce than known apparatus.

6.9. Disclaimer

The foregoing technology may be said broadly to consist in the parts, elements and features referred to or indicated in the specification of the application, individually or collectively, in any or all combinations of two or more of said parts, elements or features.

Aspects of the present technology have been described by way of example only and it should be appreciated that modifications and additions may be made thereto without departing from the scope thereof.

The invention claimed is:

1. A system for processing building materials, comprising:
a measurement device;
a processor in communication with the measurement device; and
a cutting system;
wherein in use the measurement device is configured to locate points of interest on the framing of a building, and communicate the locations of the points of interest to the processor as location information, and
wherein the processor is configured to convert the location information to cutting coordinates and pass the cutting coordinates to the cutting system which is configured to automatically cut the building materials according to the cutting coordinates.

2. The system as claimed in claim 1, wherein the building materials comprise calcium sulphate dihydrate (gypsum).

3. The system as claimed in claim 1, wherein the measurement device is configured to attach to the framing of the building.

4. The system as claimed in claim 1, wherein the points of interest comprise one or more of: a framing edge, an opening, a socket, a pipe or conduit.

5. The system as claimed in claim 1, wherein the cutting system is a computer numerically controlled (CNC) cutting system.

6. The system as claimed in claim 1, wherein the cutting system comprises a lifting frame configured to load the building materials onto the cutting system, and/or unload the building materials from the cutting system.

7. The system as claimed in claim 6, wherein the lifting frame comprises a vacuum lifting system.

8. The system as claimed in claim 1, wherein the cutting system comprises a sliding bed configured to move between a loading area where the building materials are loaded onto the cutting system, and a routing area in which the building materials are cut by the cutting system.

9. The system as claimed in claim 8, wherein the sliding bed comprises a plurality of stops configured to accommodate a range of different building material sizes.

10. The system as claimed in claim 1, wherein the measurement device comprises an arm configured to be positioned against the points of interest, and the measurement device is configured to measure the distance and angle between the measurement device and the arm.

11. The system as claimed in claim 1, wherein the cutting system comprises two cutting heads configured to cut the building material simultaneously.

12. The system as claimed in claim 1, wherein the measurement device is configured to wirelessly communicate with the processor.

13. The system as claimed in claim 1, wherein the cutting system is configured to detect an orientation of the building material, and mirror the cutting coordinates if the building material is placed on the cutting system face down.

14. The system as claimed in claim 1, wherein the cutting system is configured to use one or more of a cutting spindle set to travel at speeds of at least 30 cm per second, and a cutting spindle rotational speed of at least 25,000 RPM.

15. The system as claimed in claim 1, wherein the cutting system is configured to facilitate simultaneous loading or unloading while cutting is taking place.

16. A method of producing cut building materials, the methods comprising the steps of:

A) attaching a measurement device to the framing of a building;

B) measuring the distance from the measurement device to one or more points of interest on the framing;

C) providing the measurements to a processor configured to convert the measurements to cutting coordinates;

D) automatically loading and cutting a building material onto a cutting system; and E) cutting the building material according to the cutting coordinates.

17. The method of claim 16, wherein step D) comprises loading the building material onto a loading area on the cutting system.

18. The method of claim 17, further comprising the step of F) moving the building material from the loading area to a routing area on the cutting system prior to step E).

19. The method of claim 18, further comprising the step of G) moving the building material from the routing area to an unloading area after step E).

20. The method of claim 16, wherein step B) comprises positioning an arm against the one or more points of interest and measuring the distance and angle between the measurement device and the arm.

* * * * *